United States Patent
Koponen et al.

(10) Patent No.: US 11,223,531 B2
(45) Date of Patent: Jan. 11, 2022

(54) METHOD AND APPARATUS FOR INTERACTING WITH A NETWORK INFORMATION BASE IN A DISTRIBUTED NETWORK CONTROL SYSTEM WITH MULTIPLE CONTROLLER INSTANCES

(71) Applicant: Nicira, Inc., Palo Alto, CA (US)

(72) Inventors: Teemu Koponen, San Francisco, CA (US); Martin Casado, Portola Valley, CA (US); Jeremy Stribling, San Francisco, CA (US); Natasha Gude, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 585 days.

(21) Appl. No.: 15/181,685

(22) Filed: Jun. 14, 2016

(65) Prior Publication Data

US 2016/0294627 A1    Oct. 6, 2016

Related U.S. Application Data

(63) Continuation of application No. 13/219,557, filed on Aug. 26, 2011, now Pat. No. 9,391,928, which is a
(Continued)

(51) Int. Cl.
*H04L 12/24* (2006.01)
*H04L 12/933* (2013.01)
(Continued)

(52) U.S. Cl.
CPC .... *H04L 41/0893* (2013.01); *G06F 15/17312* (2013.01); *H04L 12/4633* (2013.01);
(Continued)

(58) Field of Classification Search
None
See application file for complete search history.

(56) References Cited

U.S. PATENT DOCUMENTS

| | | |
|---|---|---|
| 4,750,113 A | 6/1988 | Buggert |
| 4,961,139 A | 10/1990 | Hong et al. |
| | (Continued) | |

FOREIGN PATENT DOCUMENTS

| | | |
|---|---|---|
| EP | 0737921 | 10/1996 |
| EP | 1443423 | 8/2004 |
| | (Continued) | |

OTHER PUBLICATIONS

International Search Report and Written Opinion of PCT/US2008/077950, dated Jun. 24, 2009, Nicira, Inc.
(Continued)

*Primary Examiner* — Hong Shao
(74) *Attorney, Agent, or Firm* — Adeli LLP

(57) ABSTRACT

A control system including several controllers for managing several switching elements. A first controller registers a second controller for receiving a notification when a data tuple changes in a network information base (NIB) storage of the first controller that stores data for managing a set of switching elements. The first controller changes the data tuple in the NIB. The first controller sends the notification to the second controller of the change to the data tuple in the NIB. The first and second controllers operate on two different computing devices. Each controller receives logical control plane data for specifying logical datapath sets and converts the logical control plane data to physical control plane data for enabling the switching elements to implement the logical datapath sets.

20 Claims, 40 Drawing Sheets

Related U.S. Application Data continuation of application No. 13/177,529, filed on Jul. 6, 2011, now Pat. No. 8,743,889, said application No. 13/219,557 is a continuation-in-part of application No. 13/177,538, filed on Jul. 6, 2011, now Pat. No. 8,830,823, said application No. 13/219,557 is a continuation-in-part of application No. 13/177,536, filed on Jul. 6, 2011, now Pat. No. 8,959,215.

(60) Provisional application No. 61/361,912, filed on Jul. 6, 2010, provisional application No. 61/361,913, filed on Jul. 6, 2010, provisional application No. 61/429,753, filed on Jan. 4, 2011, provisional application No. 61/429,754, filed on Jan. 4, 2011, provisional application No. 61/466,453, filed on Mar. 22, 2011, provisional application No. 61/482,205, filed on May 3, 2011, provisional application No. 61/482,615, filed on May 4, 2011, provisional application No. 61/482,616, filed on May 4, 2011, provisional application No. 61/501,743, filed on Jun. 27, 2011, provisional application No. 61/501,785, filed on Jun. 28, 2011, provisional application No. 61/505,100, filed on Jul. 6, 2011, provisional application No. 61/505,102, filed on Jul. 6, 2011, provisional application No. 61/505,103, filed on Jul. 6, 2011.

(51) Int. Cl.
| | |
|---|---|
| *H04L 12/713* | (2013.01) |
| *H04L 12/935* | (2013.01) |
| *G06F 15/173* | (2006.01) |
| *H04L 12/46* | (2006.01) |
| *H04L 12/911* | (2013.01) |
| *H04L 12/701* | (2013.01) |
| *H04L 12/931* | (2013.01) |
| *H04L 29/12* | (2006.01) |
| *G06F 11/07* | (2006.01) |

(52) U.S. Cl.
CPC ...... *H04L 41/0816* (2013.01); *H04L 41/0853* (2013.01); *H04L 41/0896* (2013.01); *H04L 45/00* (2013.01); *H04L 45/586* (2013.01); *H04L 47/783* (2013.01); *H04L 49/00* (2013.01); *H04L 49/1546* (2013.01); *H04L 49/3063* (2013.01); *H04L 49/70* (2013.01); *H04L 61/2007* (2013.01); *H04L 61/6022* (2013.01); *G06F 11/07* (2013.01)

(56) References Cited

U.S. PATENT DOCUMENTS

| | | | |
|---|---|---|---|
| 5,049,873 | A | 9/1991 | Robins et al. |
| 5,265,092 | A | 11/1993 | Soloway et al. |
| 5,504,921 | A | 4/1996 | Dev et al. |
| 5,550,816 | A | 8/1996 | Hardwick et al. |
| 5,729,685 | A | 3/1998 | Chatwani et al. |
| 5,751,967 | A | 5/1998 | Raab et al. |
| 5,774,640 | A | 6/1998 | Kurio |
| 5,796,936 | A | 8/1998 | Watabe et al. |
| 5,805,791 | A | 9/1998 | Grossman et al. |
| 5,832,222 | A | 11/1998 | Dziadosz et al. |
| 5,854,906 | A | 12/1998 | Van Loo |
| 5,926,463 | A | 7/1999 | Ahearn et al. |
| 5,949,754 | A | 9/1999 | Takahashi |
| 6,006,275 | A | 12/1999 | Picazo, Jr. et al. |
| 6,055,243 | A | 4/2000 | Vincent et al. |
| 6,088,694 | A | 7/2000 | Burns et al. |
| 6,092,121 | A | 7/2000 | Bennett et al. |
| 6,104,699 | A | 8/2000 | Holender et al. |
| 6,104,700 | A | 8/2000 | Haddock et al. |
| 6,208,616 | B1 | 3/2001 | Mahalingam et al. |
| 6,219,699 | B1 | 4/2001 | McCloghrie et al. |
| 6,324,275 | B1 | 11/2001 | Yagel et al. |
| 6,363,453 | B1 | 3/2002 | Esposito et al. |
| 6,363,495 | B1 | 3/2002 | MacKenzie et al. |
| 6,366,582 | B1 | 4/2002 | Nishikado et al. |
| 6,366,657 | B1 | 4/2002 | Yagel et al. |
| 6,385,197 | B1 | 5/2002 | Sugihara |
| 6,414,958 | B1 | 7/2002 | Specht |
| 6,512,745 | B1 | 1/2003 | Abe et al. |
| 6,539,432 | B1 | 3/2003 | Taguchi et al. |
| 6,615,223 | B1 | 9/2003 | Shih et al. |
| 6,680,934 | B1 | 1/2004 | Cain |
| 6,697,338 | B1 | 2/2004 | Breitbart et al. |
| 6,735,602 | B2 | 5/2004 | Childress et al. |
| 6,741,552 | B1 | 5/2004 | McCrosky et al. |
| 6,768,740 | B1 | 7/2004 | Perlman et al. |
| 6,785,843 | B1 | 8/2004 | McRae et al. |
| 6,888,792 | B2 | 5/2005 | Gronke |
| 6,894,983 | B1 | 5/2005 | Lederman et al. |
| 6,912,221 | B1 | 6/2005 | Zadikian et al. |
| 6,941,487 | B1 | 9/2005 | Balakrishnan et al. |
| 6,959,002 | B2 | 10/2005 | Wynne et al. |
| 6,963,585 | B1 | 11/2005 | Le Pennec et al. |
| 6,985,447 | B2 | 1/2006 | Gibson et al. |
| 6,996,058 | B2 | 2/2006 | Foster et al. |
| 6,999,454 | B1 | 2/2006 | Crump |
| 7,042,912 | B2 | 5/2006 | Smith et al. |
| 7,046,630 | B2 | 5/2006 | Abe et al. |
| 7,055,171 | B1 | 5/2006 | Martin et al. |
| 7,096,228 | B2 | 8/2006 | Theimer et al. |
| 7,120,690 | B1 | 10/2006 | Krishnan et al. |
| 7,120,728 | B2 | 10/2006 | Krakirian et al. |
| 7,120,819 | B1 | 10/2006 | Gürer et al. |
| 7,126,923 | B1 | 10/2006 | Yang et al. |
| 7,145,866 | B1 | 12/2006 | Ting et al. |
| 7,158,972 | B2 | 1/2007 | Marsland |
| 7,197,561 | B1 | 3/2007 | Lovy et al. |
| 7,197,572 | B2 | 3/2007 | Matters et al. |
| 7,209,439 | B2 | 4/2007 | Rawlins et al. |
| 7,263,290 | B2 | 8/2007 | Fortin et al. |
| 7,266,556 | B1 | 9/2007 | Coates |
| 7,283,473 | B2 | 10/2007 | Arndt et al. |
| 7,286,490 | B2 | 10/2007 | Saleh et al. |
| 7,289,456 | B2 | 10/2007 | Gupta et al. |
| 7,292,575 | B2 | 11/2007 | Lemieux et al. |
| 7,333,491 | B2 | 2/2008 | Chen et al. |
| 7,336,675 | B2 | 2/2008 | Naik et al. |
| 7,342,916 | B2 | 3/2008 | Das et al. |
| 7,343,410 | B2 | 3/2008 | Mercier et al. |
| 7,359,971 | B2 | 4/2008 | Jorgensen |
| 7,370,108 | B1 | 5/2008 | Goldszmidt et al. |
| 7,406,401 | B2 | 7/2008 | Ota et al. |
| 7,450,598 | B2 | 11/2008 | Chen et al. |
| 7,460,482 | B2 | 12/2008 | Pike |
| 7,463,579 | B2 | 12/2008 | Lapuh et al. |
| 7,478,173 | B1 | 1/2009 | Delco |
| 7,480,283 | B1 | 1/2009 | Sylvain et al. |
| 7,483,370 | B1 | 1/2009 | Dayal et al. |
| 7,512,589 | B2 | 3/2009 | Stokkan et al. |
| 7,512,744 | B2 | 3/2009 | Banga et al. |
| 7,545,829 | B2 | 6/2009 | Shimazaki et al. |
| 7,555,002 | B2 | 6/2009 | Arndt et al. |
| 7,587,492 | B2 | 9/2009 | Dyck et al. |
| 7,590,669 | B2 | 9/2009 | Yip et al. |
| 7,593,324 | B2 | 9/2009 | Jain et al. |
| 7,606,260 | B2 | 10/2009 | Oguchi et al. |
| 7,626,979 | B1 | 12/2009 | Bugenhagen et al. |
| 7,627,692 | B2 | 12/2009 | Pessi |
| 7,630,358 | B1 | 12/2009 | Lakhani et al. |
| 7,643,488 | B2 | 1/2010 | Khanna et al. |
| 7,649,851 | B2 | 1/2010 | Takashige et al. |
| 7,707,309 | B2 | 4/2010 | Shanbhag et al. |
| 7,710,874 | B2 | 5/2010 | Balakrishnan et al. |
| 7,764,599 | B2 | 7/2010 | Doi et al. |
| 7,769,037 | B2 | 8/2010 | Booth, III et al. |
| 7,778,996 | B2 | 8/2010 | Burger |
| 7,783,856 | B2 | 8/2010 | Hashimoto et al. |

(56) References Cited

U.S. PATENT DOCUMENTS

| | | |
|---|---|---|
| 7,792,987 B1 | 9/2010 | Vohra et al. |
| 7,801,155 B2 | 9/2010 | Wang |
| 7,802,251 B2 | 9/2010 | Kitamura |
| 7,805,407 B1 | 9/2010 | Verbeke et al. |
| 7,808,929 B2 | 10/2010 | Wong et al. |
| 7,817,541 B2 | 10/2010 | Gray et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,844,733 B2 | 11/2010 | Betts et al. |
| 7,847,801 B2 | 12/2010 | Qi |
| 7,856,549 B2 | 12/2010 | Wheeler |
| 7,881,281 B1 | 2/2011 | Bugenhagen et al. |
| 7,885,276 B1 | 2/2011 | Lin |
| 7,898,383 B2 | 3/2011 | Royalty |
| 7,912,955 B1 | 3/2011 | Machiraju et al. |
| 7,925,661 B2 | 4/2011 | Broussard et al. |
| 7,936,770 B1 | 5/2011 | Frattura et al. |
| 7,937,438 B1 | 5/2011 | Miller et al. |
| 7,944,817 B1 | 5/2011 | Sylvain |
| 7,945,658 B1 | 5/2011 | Nucci et al. |
| 7,948,986 B1 | 5/2011 | Ghosh et al. |
| 7,953,865 B1 | 5/2011 | Miller et al. |
| 7,958,255 B1 | 6/2011 | Karighattam et al. |
| 7,970,917 B2 | 6/2011 | Nakano et al. |
| 7,974,272 B2 | 7/2011 | Chang et al. |
| 7,991,859 B1 | 8/2011 | Miller et al. |
| 7,995,483 B1 | 8/2011 | Bayar et al. |
| 8,004,998 B2 | 8/2011 | Levy et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,032,899 B2 | 10/2011 | Archer et al. |
| 8,046,456 B1 | 10/2011 | Miller et al. |
| 8,054,832 B1 | 11/2011 | Shukla et al. |
| 8,055,745 B2 | 11/2011 | Atluri |
| 8,055,789 B2 | 11/2011 | Richardson et al. |
| 8,060,779 B2 | 11/2011 | Beardsley et al. |
| 8,060,875 B1 | 11/2011 | Lambeth |
| 8,089,871 B2 | 1/2012 | Iloglu et al. |
| 8,090,698 B2 | 1/2012 | Billingsley et al. |
| 8,098,656 B2 | 1/2012 | Lapuh et al. |
| 8,130,648 B2 | 3/2012 | Kwan et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,161,152 B2 | 4/2012 | Ogielski et al. |
| 8,166,201 B2 | 4/2012 | Richardson et al. |
| 8,196,144 B2 | 6/2012 | Kagan et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 * | 8/2012 | Brandwine ......... G06F 9/45558 370/258 |
| 8,239,655 B2 | 8/2012 | Goggin et al. |
| 8,265,071 B2 | 9/2012 | Sindhu et al. |
| 8,265,075 B2 | 9/2012 | Pandey |
| 8,281,067 B2 | 10/2012 | Stolowitz |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,352,941 B1 | 1/2013 | Protopopov et al. |
| 8,413,216 B2 | 4/2013 | Hughes et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,565,597 B2 | 10/2013 | Zheng |
| 8,578,003 B2 | 11/2013 | Brandwine et al. |
| 8,590,033 B2 | 11/2013 | Schleiss et al. |
| 8,612,627 B1 * | 12/2013 | Brandwine ............ H04L 69/14 370/238 |
| 8,621,058 B2 | 12/2013 | Eswaran et al. |
| 8,644,188 B1 | 2/2014 | Brandwine et al. |
| 8,650,618 B2 | 2/2014 | Asati et al. |
| 8,661,216 B2 | 2/2014 | Kavuri et al. |
| 8,705,513 B2 | 4/2014 | Merwe et al. |
| 8,717,895 B2 | 5/2014 | Koponen et al. |
| 8,718,070 B2 | 5/2014 | Koponen et al. |
| 8,743,888 B2 | 6/2014 | Casado et al. |
| 8,743,889 B2 | 6/2014 | Koponen et al. |
| 8,750,119 B2 | 6/2014 | Lambeth et al. |
| 8,750,164 B2 | 6/2014 | Casado et al. |
| 8,761,036 B2 | 6/2014 | Fulton et al. |
| 8,775,594 B2 | 7/2014 | Koponen et al. |
| 8,780,911 B2 | 7/2014 | Narasimhan |
| 8,817,620 B2 | 8/2014 | Koponen et al. |
| 8,817,621 B2 | 8/2014 | Casado et al. |
| 8,830,823 B2 | 9/2014 | Koponen et al. |
| 8,837,493 B2 | 9/2014 | Casado et al. |
| 8,842,679 B2 | 9/2014 | Koponen et al. |
| 8,867,349 B2 | 10/2014 | Martini et al. |
| 8,880,468 B2 | 11/2014 | Koponen et al. |
| 8,913,483 B2 | 12/2014 | Pfaff et al. |
| 8,958,292 B2 | 2/2015 | Fulton et al. |
| 8,959,215 B2 | 2/2015 | Koponen et al. |
| 8,964,528 B2 | 2/2015 | Casado et al. |
| 8,964,598 B2 | 2/2015 | Casado et al. |
| 8,966,035 B2 | 2/2015 | Casado et al. |
| 8,966,040 B2 | 2/2015 | Koponen et al. |
| 9,007,903 B2 | 4/2015 | Koponen et al. |
| 9,008,087 B2 | 4/2015 | Lambeth et al. |
| 9,043,452 B2 | 5/2015 | Fulton |
| 9,043,463 B1 | 5/2015 | Cohn et al. |
| 9,049,153 B2 | 6/2015 | Casado et al. |
| 9,077,664 B2 | 7/2015 | Casado et al. |
| 9,083,609 B2 | 7/2015 | Casado et al. |
| 9,106,587 B2 | 8/2015 | Koponen et al. |
| 9,112,811 B2 | 8/2015 | Casado et al. |
| 9,172,663 B2 | 10/2015 | Martin et al. |
| 9,270,580 B1 | 2/2016 | Abraham et al. |
| 9,363,210 B2 | 6/2016 | Lambeth et al. |
| 9,391,928 B2 | 7/2016 | Koponen et al. |
| 9,525,647 B2 | 12/2016 | Koponen et al. |
| 2001/0043614 A1 | 11/2001 | Viswanadham et al. |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0009552 A1 | 1/2003 | Benfield et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0145086 A1 | 7/2003 | O'Reilly |
| 2003/0204768 A1 | 10/2003 | Fee |
| 2004/0044773 A1 | 3/2004 | Bayus et al. |
| 2004/0047286 A1 | 3/2004 | Larsen et al. |
| 2004/0047300 A1 | 3/2004 | Enomoto et al. |
| 2004/0054680 A1 | 3/2004 | Kelley et al. |
| 2004/0054793 A1 | 3/2004 | Coleman |
| 2004/0073659 A1 | 4/2004 | Rajsic et al. |
| 2004/0098505 A1 | 5/2004 | Clemmensen |
| 2004/0193677 A1 | 9/2004 | Dar et al. |
| 2004/0210889 A1 | 10/2004 | Childress et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0201398 A1 | 9/2005 | Naik et al. |
| 2005/0228952 A1 | 10/2005 | Mayhew et al. |
| 2005/0228971 A1 | 10/2005 | Samra et al. |
| 2005/0232230 A1 | 10/2005 | Nagami et al. |
| 2006/0026225 A1 | 2/2006 | Canali et al. |

(56) References Cited

U.S. PATENT DOCUMENTS

| | | |
|---|---|---|
| 2006/0028999 A1 | 2/2006 | Iakobashvili et al. |
| 2006/0037075 A1 | 2/2006 | Frattura et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0178898 A1 | 8/2006 | Habibi |
| 2006/0182033 A1 | 8/2006 | Chen et al. |
| 2006/0182037 A1 | 8/2006 | Chen et al. |
| 2006/0184653 A1 | 8/2006 | van Riel |
| 2006/0184937 A1 | 8/2006 | Abels et al. |
| 2006/0187908 A1 | 8/2006 | Shimozono et al. |
| 2006/0190243 A1 | 8/2006 | Barkai et al. |
| 2006/0193266 A1 | 8/2006 | Siddha et al. |
| 2006/0221961 A1 | 10/2006 | Basso et al. |
| 2006/0248179 A1 | 11/2006 | Short et al. |
| 2006/0282895 A1 | 12/2006 | Rentzis et al. |
| 2007/0028239 A1 | 2/2007 | Dyck et al. |
| 2007/0043860 A1* | 2/2007 | Pabari .................. G06F 9/5072 709/224 |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0174429 A1 | 7/2007 | Mazzaferri et al. |
| 2007/0192325 A1 | 8/2007 | Morris |
| 2007/0201434 A1 | 8/2007 | Nakamura et al. |
| 2007/0217409 A1 | 9/2007 | Mann |
| 2007/0220059 A1 | 9/2007 | Lu et al. |
| 2007/0220358 A1 | 9/2007 | Goodill et al. |
| 2007/0234302 A1 | 10/2007 | Suzuki et al. |
| 2007/0239987 A1 | 10/2007 | Hoole et al. |
| 2007/0240160 A1 | 10/2007 | Paterson-Jones et al. |
| 2007/0245082 A1 | 10/2007 | Margolus et al. |
| 2007/0250608 A1 | 10/2007 | Watt |
| 2007/0260721 A1 | 11/2007 | Bose et al. |
| 2007/0266433 A1 | 11/2007 | Moore |
| 2007/0286185 A1 | 12/2007 | Eriksson et al. |
| 2007/0294421 A1 | 12/2007 | Octaviano et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0005334 A1 | 1/2008 | Utard et al. |
| 2008/0034249 A1 | 2/2008 | Husain et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0052206 A1 | 2/2008 | Edwards et al. |
| 2008/0059556 A1 | 3/2008 | Greenspan et al. |
| 2008/0071900 A1 | 3/2008 | Hecker et al. |
| 2008/0163207 A1 | 7/2008 | Reumann et al. |
| 2008/0165704 A1 | 7/2008 | Marchetti et al. |
| 2008/0189769 A1* | 8/2008 | Casado ............... G06F 21/6281 726/4 |
| 2008/0196100 A1 | 8/2008 | Madhavan et al. |
| 2008/0212963 A1 | 9/2008 | Fortin et al. |
| 2008/0225780 A1 | 9/2008 | McCormick et al. |
| 2008/0225853 A1 | 9/2008 | Melman et al. |
| 2008/0240122 A1 | 10/2008 | Richardson et al. |
| 2008/0244569 A1 | 10/2008 | Challener et al. |
| 2008/0279196 A1 | 11/2008 | Friskney et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |
| 2009/0043823 A1 | 2/2009 | Iftode et al. |
| 2009/0049241 A1 | 2/2009 | Ohno et al. |
| 2009/0083445 A1 | 3/2009 | Ganga |
| 2009/0089625 A1 | 4/2009 | Kannappan et al. |
| 2009/0097495 A1 | 4/2009 | Palacharla et al. |
| 2009/0113031 A1 | 4/2009 | Ruan et al. |
| 2009/0122710 A1 | 5/2009 | Bar-Tor et al. |
| 2009/0138577 A1 | 5/2009 | Casado et al. |
| 2009/0144220 A1 | 6/2009 | Feng et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0222924 A1 | 9/2009 | Droz et al. |
| 2009/0235325 A1 | 9/2009 | Dimitrakos et al. |
| 2009/0249473 A1 | 10/2009 | Cohn |
| 2009/0276661 A1 | 11/2009 | Deguchi et al. |
| 2009/0279536 A1 | 11/2009 | Unbehagen et al. |
| 2009/0292858 A1 | 11/2009 | Lambeth et al. |
| 2009/0296726 A1 | 12/2009 | Snively et al. |
| 2009/0303880 A1 | 12/2009 | Maltz et al. |
| 2010/0046531 A1 | 2/2010 | Louati et al. |
| 2010/0054260 A1 | 3/2010 | Pandey et al. |
| 2010/0061231 A1 | 3/2010 | Harmatos et al. |
| 2010/0082799 A1 | 4/2010 | DeHaan et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0138830 A1 | 6/2010 | Astete et al. |
| 2010/0138840 A1 | 6/2010 | Kagan et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169452 A1 | 7/2010 | Atluri et al. |
| 2010/0169467 A1 | 7/2010 | Shukla et al. |
| 2010/0169587 A1 | 7/2010 | Atluri et al. |
| 2010/0191612 A1 | 7/2010 | Raleigh |
| 2010/0191846 A1 | 7/2010 | Raleigh |
| 2010/0192207 A1 | 7/2010 | Raleigh |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0250784 A1 | 9/2010 | Henry et al. |
| 2010/0254385 A1 | 10/2010 | Sharma et al. |
| 2010/0257263 A1 | 10/2010 | Casado et al. |
| 2010/0275017 A1 | 10/2010 | Iyer et al. |
| 2010/0275199 A1 | 10/2010 | Smith et al. |
| 2010/0284402 A1 | 11/2010 | Narayanan |
| 2010/0290485 A1 | 11/2010 | Martini et al. |
| 2010/0302935 A1 | 12/2010 | Zhang et al. |
| 2010/0322255 A1 | 12/2010 | Hao et al. |
| 2011/0004878 A1 | 1/2011 | Divoux |
| 2011/0004913 A1 | 1/2011 | Nagarajan et al. |
| 2011/0010578 A1 | 1/2011 | Agúndez Dominguez et al. |
| 2011/0016215 A1 | 1/2011 | Wang |
| 2011/0026521 A1 | 2/2011 | Gamage et al. |
| 2011/0032830 A1 | 2/2011 | Van Der Merwe et al. |
| 2011/0032844 A1 | 2/2011 | Patel et al. |
| 2011/0075552 A1 | 3/2011 | Mitsumor |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Van Der Merwe et al. |
| 2011/0142053 A1 | 6/2011 | Van Der Merwe et al. |
| 2011/0194567 A1 | 8/2011 | Shen |
| 2011/0225167 A1 | 9/2011 | Bhattacharjee et al. |
| 2011/0261825 A1 | 10/2011 | Ichino |
| 2011/0271007 A1 | 11/2011 | Wang et al. |
| 2011/0292949 A1* | 12/2011 | Hayashi ............... H04L 12/5695 370/419 |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317559 A1 | 12/2011 | Kern et al. |
| 2011/0318011 A1 | 12/2011 | Brassil |
| 2012/0014386 A1 | 1/2012 | Xiong et al. |
| 2012/0096192 A1 | 4/2012 | Tanaka et al. |
| 2012/0096211 A1 | 4/2012 | Davis et al. |
| 2012/0120964 A1 | 5/2012 | Koponen et al. |
| 2012/0131643 A1 | 5/2012 | Cheriton |
| 2012/0147894 A1 | 6/2012 | Mulligan et al. |
| 2012/0147898 A1 | 6/2012 | Koponen et al. |
| 2012/0151550 A1 | 6/2012 | Zhang |
| 2012/0185553 A1 | 7/2012 | Nelson |
| 2012/0236734 A1 | 9/2012 | Sampath et al. |
| 2012/0239790 A1 | 9/2012 | Doane et al. |
| 2013/0058208 A1 | 3/2013 | Pfaff et al. |

(56) References Cited

U.S. PATENT DOCUMENTS

| | | |
|---|---|---|
| 2013/0058215 A1 | 3/2013 | Koponen et al. |
| 2013/0058225 A1 | 3/2013 | Casado et al. |
| 2013/0058226 A1 | 3/2013 | Casado et al. |
| 2013/0058228 A1 | 3/2013 | Koponen et al. |
| 2013/0058229 A1 | 3/2013 | Casado et al. |
| 2013/0058250 A1 | 3/2013 | Casado et al. |
| 2013/0058251 A1 | 3/2013 | Koponen et al. |
| 2013/0058252 A1 | 3/2013 | Casado et al. |
| 2013/0058255 A1 | 3/2013 | Casado et al. |
| 2013/0058331 A1 | 3/2013 | Thakkar et al. |
| 2013/0058334 A1 | 3/2013 | Koponen et al. |
| 2013/0058335 A1 | 3/2013 | Koponen et al. |
| 2013/0058339 A1 | 3/2013 | Casado et al. |
| 2013/0058340 A1 | 3/2013 | Lambeth et al. |
| 2013/0058341 A1 | 3/2013 | Fulton et al. |
| 2013/0058342 A1 | 3/2013 | Casado et al. |
| 2013/0058343 A1 | 3/2013 | Casado et al. |
| 2013/0058344 A1 | 3/2013 | Casado et al. |
| 2013/0058348 A1 | 3/2013 | Koponen et al. |
| 2013/0058350 A1 | 3/2013 | Fulton |
| 2013/0058351 A1 | 3/2013 | Casado et al. |
| 2013/0058353 A1 | 3/2013 | Koponen et al. |
| 2013/0058354 A1 | 3/2013 | Casado et al. |
| 2013/0058356 A1 | 3/2013 | Koponen et al. |
| 2013/0058357 A1 | 3/2013 | Koponen et al. |
| 2013/0058358 A1 | 3/2013 | Fulton et al. |
| 2013/0060736 A1 | 3/2013 | Casado et al. |
| 2013/0060737 A1 | 3/2013 | Koponen et al. |
| 2013/0060738 A1 | 3/2013 | Koponen et al. |
| 2013/0060817 A1 | 3/2013 | Koponen et al. |
| 2013/0060818 A1 | 3/2013 | Lambeth et al. |
| 2013/0060819 A1 | 3/2013 | Lambeth et al. |
| 2013/0060922 A1 | 3/2013 | Koponen et al. |
| 2013/0060929 A1 | 3/2013 | Koponen et al. |
| 2013/0060940 A1 | 3/2013 | Koponen et al. |
| 2013/0250958 A1* | 9/2013 | Watanabe ............... H04L 45/54 370/392 |
| 2015/0180801 A1 | 6/2015 | Casado et al. |
| 2016/0127274 A1 | 5/2016 | Casado et al. |

FOREIGN PATENT DOCUMENTS

| | | |
|---|---|---|
| EP | 1443423 A1 | 8/2004 |
| EP | 1653688 | 5/2006 |
| JP | 2002-141905 | 5/2002 |
| JP | 2003069609 A | 3/2003 |
| JP | 2003-124976 | 4/2003 |
| JP | 2003-318949 | 11/2003 |
| JP | 2006229967 A | 8/2006 |
| WO | WO 95/06989 | 3/1995 |
| WO | WO 2005/112390 | 11/2005 |
| WO | WO 2008/095010 | 8/2008 |
| WO | WO 2009/042919 | 4/2009 |
| WO | 2010103909 A1 | 9/2010 |
| WO | WO 2010/115060 | 10/2010 |
| WO | WO 2012/093429 | 7/2012 |

OTHER PUBLICATIONS

International Search Report and Written Opinion of PCT/US2010/029717, dated Sep. 24, 2010, Nicira, Inc.
Anderson, Thomas, et al., "Overcoming the Internet Impasse through Virtualization," Apr. 2005, 8 pages, IEEE Computer Society.
Anhalt, Fabienne, et al., "Analysis and evaluation of a XEN based virtual router," Sep. 18, 2008, 63 pages, Unite de recherché INRA Phone-Alpes, Montbonnot Saint-Ismier, France.
Anwer, Muhammad Bilal, et al., "Building a Fast, Virtualized Data Plane with Programmable Hardware," VISA'09, Aug. 17, 2009, 8 pages, Barcelona, Spain.
Author Unknown, "Cisco VN-Link: Virtualization-Aware Networking," Mar. 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "OpenFlow Switch Specification, Version 0.9.0 (Wire Protocol 0x98)," Jul. 20, 2009, 36 pages, Open Networking Foundation.
Author Unknown, OpenFlow Switch Specification, Version 1.0.0 (Wire Protocol 0x01), Dec. 31, 2009, 42 pages. Open Networking Foundation.
Author Unknown, OpenFlow Switch Specification, Version 1.1.0 Implemented (Wire Protocol 0X02), Feb. 28, 2011, 56 pages, Open Networking Foundation.
Bavier, Andy, et al., "In VINI Veritas: Realistic and Controlled Network Experimentation," SIGCOMM'06, Sep. 2006, 14 pages, Pisa, Italy.
Bhatia, Sapan, et al., "Trellis: A Platform for Building Flexible, Fast Virtual Networks on Commodity Hardware," ROADS'08, Dec. 9, 2008, 6 pages, Madrid, Spain, ACM.
Caesar, Matthew, et al., "Design and Implementation of a Routing Control Platform," NSDI '05: 2nd Symposium on Networked Systems Design & Implementation , Apr. 2005, 14 pages, Usenix Association.
Cai, Zheng, et al., "The Preliminary Design and Implementation of the Maestro Network Control Platform," Oct. 1, 2008, 17 pages, NSF.
Casado, Martin, et al., "Ethane: Taking Control of the Enterprise," Computer Communication SIGCOMM '07, Aug. 27-31, 2007, 12 pages, Kyoto, Japan.
Casado, Martin, et al., "Rethinking Packet Forwarding Hardware," Month Unknown 2008, 6 pages.
Casado, Martin, et al., "SANE: A Protection Architecture for Enterprise Networks," Proceedings of the 15th USENIX Security Symposium, Jul. 31, 2006, 15 pages.
Casado, Martin, et al., "Scaling Out: Network Virtualization Revisited," Month Unknown 2010, 8 pages.
Casado, Martin, et al., "Virtualizing the Network Forwarding Plane," Dec. 2010, 6 pages.
Das, Saurav, et al., "Unifying Packet and Circuit Switched Networks with OpenFlow," Dec. 7, 2009, 10 pages.
Fernandes, Natalia C., et al., "Virtual Networks: Isolation, Performance, and Trends," Annals of Telecommunications, Oct. 7, 2010, 17 pages, vol. 66, Institut Télécom and Springer-Verlag, Paris.
Greenberg, Albert, et al., "VL2: A Scalable and Flexible Data Center Network," SIGCOMM'09, Aug. 17-21, 2009, 12 pages, ACM, Barcelona, Spain.
Greenhalgh, Adam, et al., "Flow Processing and The Rise of Commodity Network Hardware," ACM SIGCOMM Computer Communication Review, Apr. 2009, 6 pages, vol. 39, No. 2.
Gude, Natasha, et al., "NOX: Towards an Operating System for Networks," Jul. 2008, 6 pages, vol. 38, No. 3, ACM SIGCOMM Computer communication Review.
Hamilton, James, et al., "Datacenter Networks Are In My Way," Principals of Amazon Series, Oct. 28, 2010, 14 pages.
Hinrichs, Timothy L., et al., "Practical Declarative Network Management," WREN'09, Aug. 21, 2009, 10 pages, Barcelona, Spain.
Hunt, Patrick, et al., "ZooKeeper: Wait-free Coordination for Internet-Scale Systems," USENIXATC'10 Proc. of the 2010 USENIX Annual Technical Conference, Jun. 23-25, 2010, 14 pages, USENIX Association, Berkeley, USA.
Keller, Eric, et al., "The 'Platform as a Service' Model for Networking," Month Unknown 2010, 6 pages.
Koponen, Teemu, et al., "Onix: A Distributed Control Platform for Large-scale Production Networks," In Proc. OSDI, Oct. 2010, 14 pages.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overlays," In Proc. of SOSP, Oct. 2005, 16 pages, Brighton, UK.
Luo, Jianying, et al., "Prototyping Fast, Simple, Secure Switches for Ethane," Month Unknown 2007, 6 pages.
Mckeown, Nick, et al., "OpenFlow: Enabling Innovation in Campus Networks," ACS SIGCOMM Computer Communication Review, Apr. 2008, 6 pages, vol. 38, No. 2.
Mogul, Jeffrey C., et al., "API Design Challenges for Open Router Platforms on Proprietary Hardware," Oct. 2008, 6 pages.

(56) References Cited

OTHER PUBLICATIONS

Mysore, Radhka Niranjan, et al., "PortLand: A Scalable Fault-Tolerant Layer 2 Data Center Network Fabric," Proc. of SIGCOMM, Aug. 17-21, 2009, 12 pages.
Pettit, Justin, et al., "Virtual Switching in an Era of Advanced Edges," Sep. 2010, 7 pages.
Pfaff, Ben, et al., "Extending Networking into the Virtualization Layer," Proc. of HotNets, Oct. 2009, 6 pages.
Sherwood, Rob, et al., "Can the Production Network Be the Testbed?," Month Unknown 2010, 14 pages.
Sherwood, Rob, et al., "Carving Research Slices Out of Your Production Networks with OpenFlow," ACM SIGCOMM Computer Communications Review, Jan. 2010, 2 pages, vol. 40, No. 1.
Sherwood, Rob, et al., "FloWNVisor: A Network Virtualization Layer," Oct. 14, 2009, 15 pages, OPENFLOW-TR-2009-1.
Tavakoli, Arsalan, et al., "Applying NOX to the Datacenter," Proc. HotNets, Month Unknown 2009, 6 pages.
Wang, Wei-Ming, et al., "Analysis and Implementation of an Open Programmable Router Based on Forwarding and Control Element Separation," Journal of Computer Science and Technology, Sep. 2008, 11 pages, vol. 23, No. 5.
Yang, L., et al., "Forwarding and Control Element Separation (ForCES) Framework," Apr. 2004, 41 pages, The Internet Society.
Yu, Minlan, et al., "Scalable Flow-Based Networking with DIFANE," In Proc. SIGCOMM, Aug. 2010, 16 pages.

\* cited by examiner

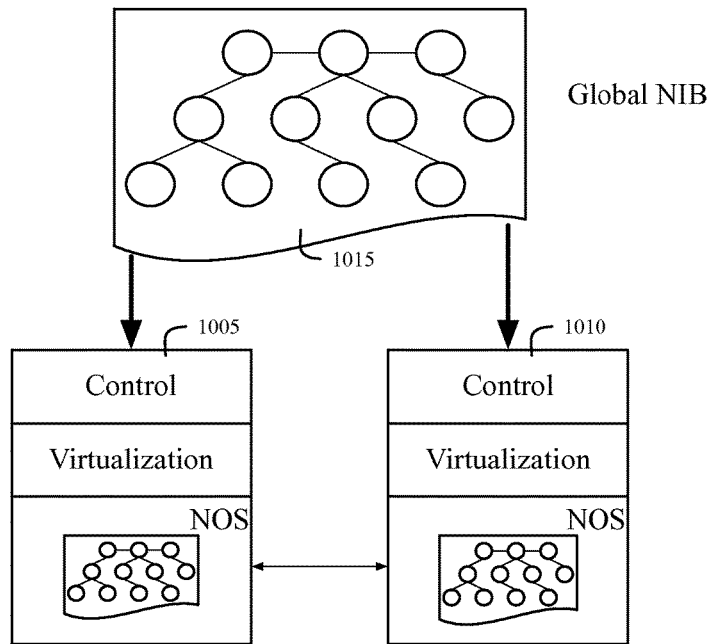
*Figure 10*
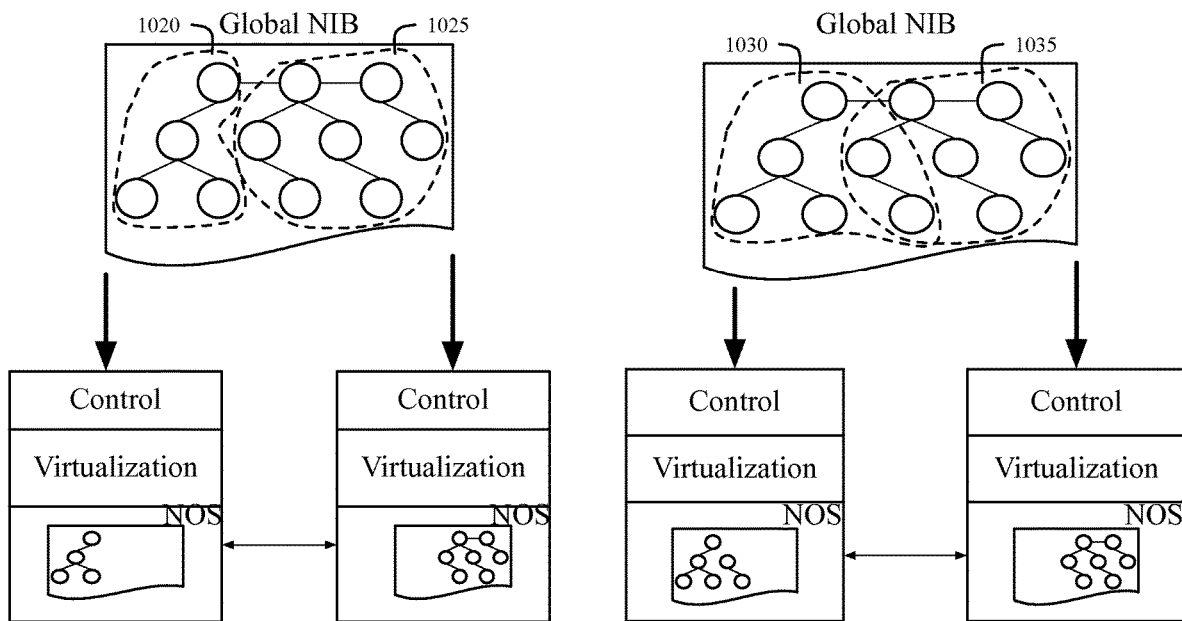
*Figure 11*
*Figure 12*

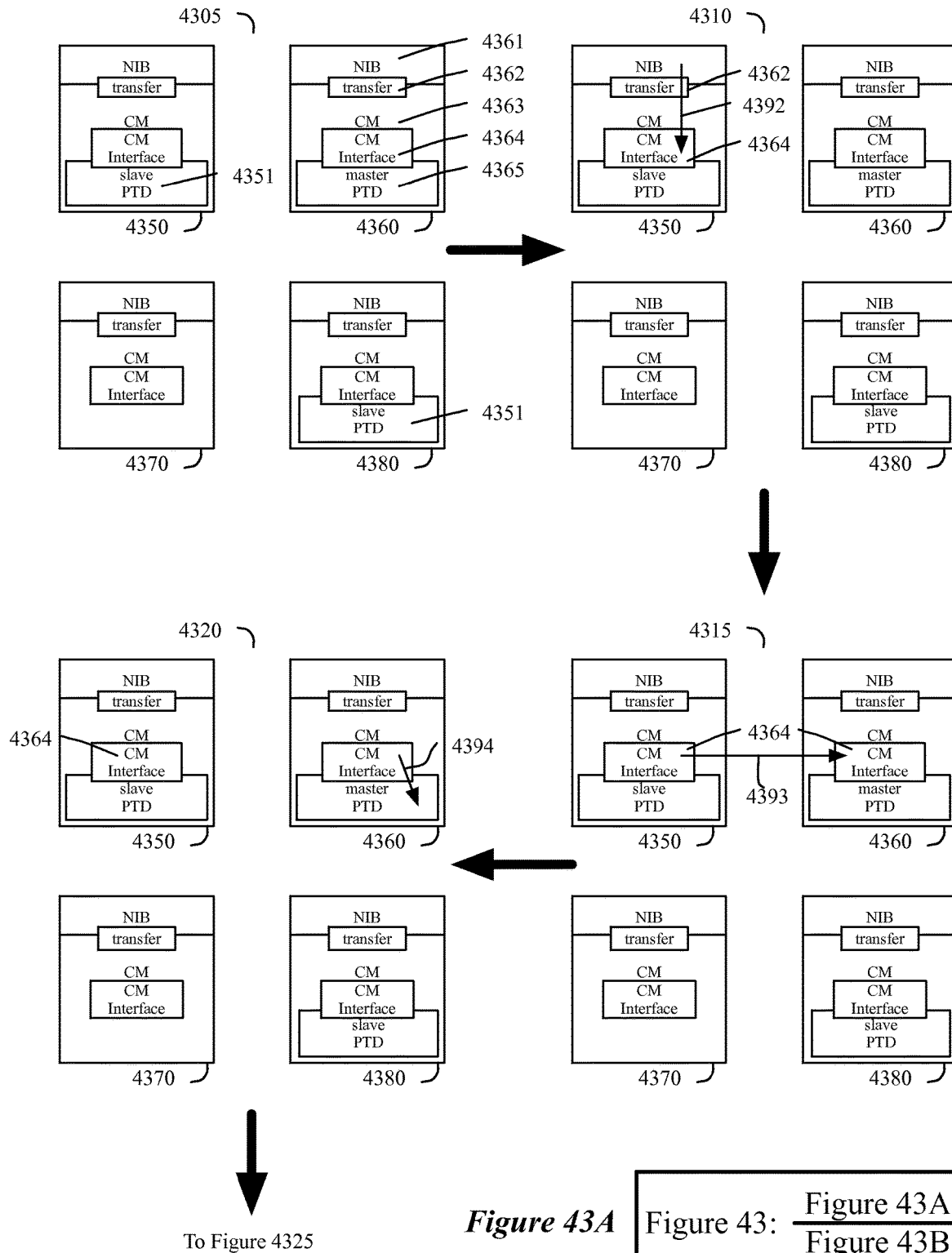

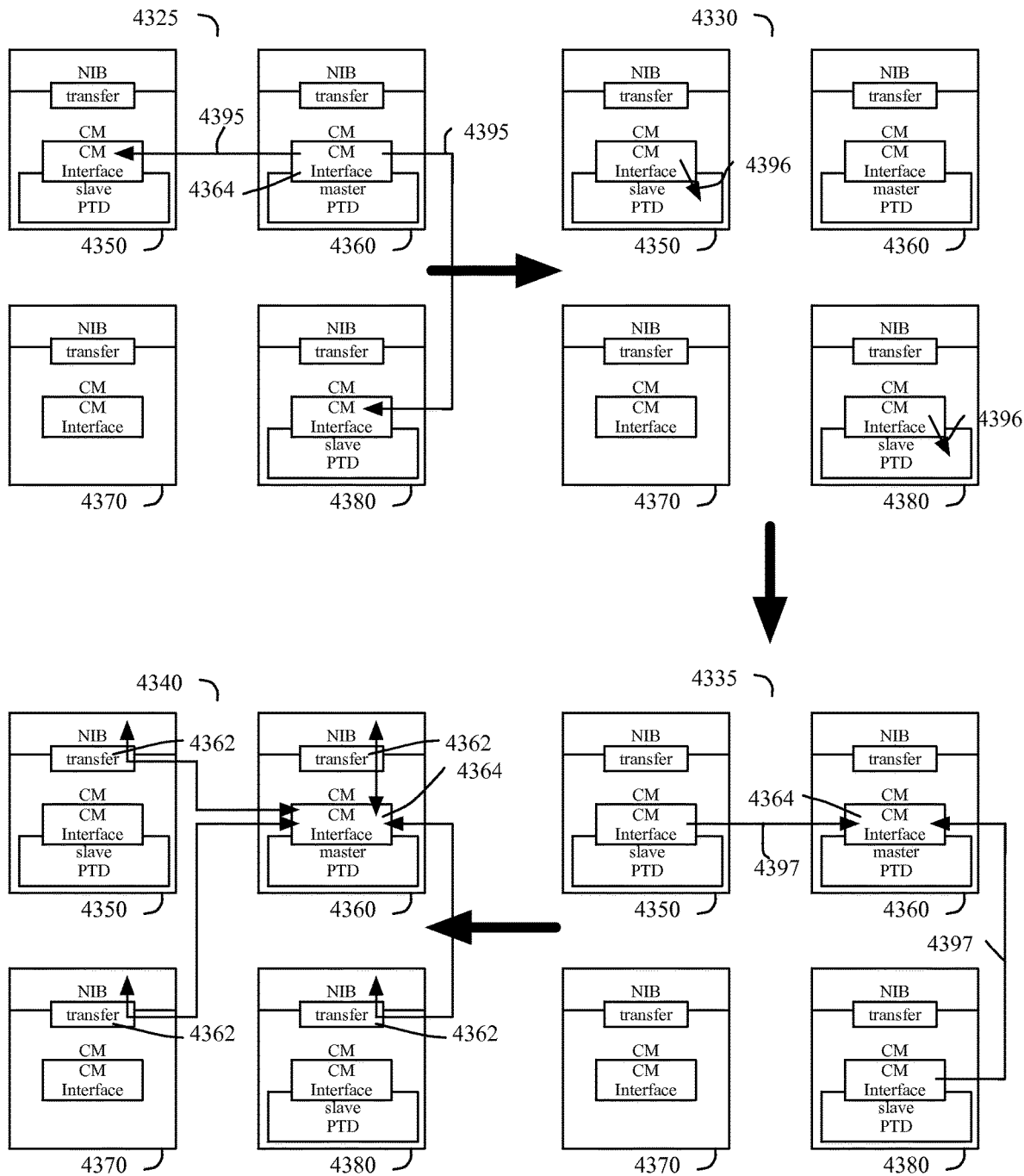
Figure 43: Figure 43A / Figure 43B

METHOD AND APPARATUS FOR INTERACTING WITH A NETWORK INFORMATION BASE IN A DISTRIBUTED NETWORK CONTROL SYSTEM WITH MULTIPLE CONTROLLER INSTANCES

CLAIM OF BENEFIT TO PRIOR APPLICATION

This application is a continuation application of U.S. patent application Ser. No. 13/219,557, filed on Aug. 26, 2011, now issued as U.S. Pat. No. 9,391,928. U.S. patent application Ser. No. 13/219,557 is a continuation application of U.S. patent application Ser. No. 13/177,529, filed on Jul. 6, 2011, now issued as U.S. Pat. No. 8,743,889. U.S. patent application Ser. No. 13/177,529 claims the benefit of U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on May 4, 2011; U.S. Provisional Patent Application 61/501,743, filed on Jun. 27, 2011; and U.S. Provisional Patent Application 61/501,785, filed on Jun. 28, 2011. U.S. patent application Ser. No. 13/219,557 is a continuation-in-part application of U.S. patent application Ser. No. 13/177,538, filed on Jul. 6, 2011, now issued as U.S. Pat. No. 8,830,823. U.S. patent application Ser. No. 13/219,557 is also a continuation-in-part application of U.S. Patent Application 13/177,536, filed on Jul. 6, 2011, now issued as U.S. Pat. No. 8,959,215. U.S. patent application Ser. Nos. 13/177,536 and 13/177,538 claim the benefit of U.S. Provisional Patent Application 61/361,912, filed on Jul. 6, 2010; U.S. Provisional Patent Application 61/361,913, filed on Jul. 6, 2010; U.S. Provisional Patent Application 61/429,753, filed on Jan. 4, 2011; U.S. Provisional Patent Application 61/429,754, filed on Jan. 4, 2011; U.S. Provisional Patent Application 61/466,453, filed on Mar. 22, 2011; U.S. Provisional Patent Application 61/482,205, filed on May 3, 2011; U.S. Provisional Patent Application 61/482,615, filed on May 4, 2011; U.S. Provisional Patent Application 61/482,616, filed on 5/4/2011; U.S. Provisional Patent Application 61/501,743, filed on Jun. 27, 2011; and U.S. Provisional Patent Application 61/501,785, filed on Jun. 28, 2011. U.S. patent application Ser. No. 13/219,557 claims the benefit of U.S. Provisional Patent Application 61/482,205, filed on May 3, 2011; U.S. Provisional Patent Application 61/482,615, filed on 5/4/2011; U.S. Provisional Patent Application 61/482,616, filed on May 4, 2011; U.S. Provisional Patent Application 61/501,743, filed on 6/27/2011; U.S. Provisional Patent Application 61/501,785, filed on Jun. 28, 2011; U.S. Provisional Patent Application 61/505,100, filed on Jul. 6, 2011; U.S. Provisional Patent Application 61/505,103, filed on Jul. 6, 2011; and U.S. Provisional Patent Application 61/505,102, filed on Jul. 6, 2011. U.S. patent application Ser. Nos. 13/219,557, now issued as U.S. Pat. No. 9,391,928; Ser. No. 13/177,529, now issued as U.S. Pat. No. 8,743,889; Ser. No. 13/177,536, now issued as U.S. Pat. No. 8,959,215; Ser. No. 13/177,538, now issued as U.S. Pat. No. 8,830,823; and U.S. Provisional Patent Applications 61/361,912, 61/361,913, 61/429,753, 61/429,754, 61/466,453, 61/482, 205, 61/482,615, 61/482,616, 61/501,743, 61/501,785, 61/505,100, 61/505,102, and 61/505,103 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision making, the network controller creates and maintains a view of the network state and provides an application programming interface upon which management applications may access a view of the network state.

Three of the many challenges of large networks (including datacenters and the enterprise) are scalability, mobility, and multi-tenancy and often the approaches taken to address one hamper the other. For instance, one can easily provide network mobility for virtual machines (VMs) within an L2 domain, but L2 domains cannot scale to large sizes. Also, retaining tenant isolation greatly complicates mobility. Despite the high-level interest in SDN, no existing products have been able to satisfy all of these requirements.

BRIEF SUMMARY

Some embodiments of the invention provide a system that allows several different logical datapath sets to be specified for several different users through one or more shared network infrastructure switching elements (referred to as "switching elements" below). In some embodiments, the system includes a set of software tools that allows the system to accept logical datapath sets from users and to configure the switching elements to implement these logical datapath sets. These software tools allow the system to virtualize control of the shared switching elements and the network that is defined by the connections between these shared switching elements, in a manner that prevents the different users from viewing or controlling each other's logical datapath sets (i.e., each other's switching logic) while sharing the same switching elements.

In some embodiments, one of the software tools that allows the system to virtualize control of a set of switching elements (i.e., to allow several users to share the same switching elements without viewing or controlling each other's logical datapath sets) is an intermediate data storage structure that (1) stores the state of the network, (2) receives and records modifications to different parts of the network from different users, and (3), in some embodiments, provides different views of the state of the network to different users. For instance, in some embodiments, the intermediate data storage structure is a network information base (NIB) data structure that stores the state of the network that is defined by one or more switching elements. The system uses this NIB data structure as an intermediate storage structure for reading the state of the network and writing modifications to the state of the network. In some embodiments, the NIB also stores the logical configuration and the logical state for each user specified logical datapath set. In these embodiments, the information in the NIB that represents the state of the actual switching elements accounts for only a subset of the total information stored in the NIB.

In some embodiments, the system has (1) a network operating system (NOS) to create and maintain the NIB storage structure, and (2) one or more applications that run on top of the NOS to specify logic for reading values from and writing values to the NIB. When the NIB is modified in order to effectuate a change in the switching logic of a switching element, the NOS of some embodiments also propagates the modification to the switching element.

The system of different embodiments uses the NIB differently to virtualize access to the shared switching elements and network. In some embodiments, the system provides different views of the NIB to different users in order to ensure that different users do not have direct view and control over each other's switching logic. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serve as abstractions of the actual switching elements and their attributes. As further described below, some of these higher layer elements are used in some embodiments to show different abstract switching elements and/or switching element attributes to different users in a virtualized control system.

In some embodiments, the definition of different NIB elements at different hierarchical levels in the NIB and the definition of the links between these elements are used by the developers of the applications that run on top of the NOS in order to define the operations of these applications. For instance, in some embodiments, the developer of an application running on top of the NOS uses these definitions to enumerate how the application is to map the logical datapath sets of the user to the physical switching elements of the control system. Under this approach, the developer would have to enumerate all different scenarios that the control system may encounter and the mapping operation of the application for each scenario. This type of network virtualization (in which different views of the NIB are provided to different users) is referred to below as Type I network virtualization.

Another type of network virtualization, which is referred to below as Type II network virtualization, does not require the application developers to have intimate knowledge of the NIB elements and the links (if any) in the NIB between these elements. Instead, this type of virtualization allows the application to simply provide user specified, logical switching element attributes in the form of one or more tables, which are then mapped to NIB records by a table mapping engine. In other words, the Type II virtualized system of some embodiments accepts the logical switching element configurations (e.g., access control list table configurations, L2 table configurations, L3 table configurations, etc.) that the user defines without referencing any operational state of the switching elements in a particular network configuration. It then maps the logical switching element configurations to the switching element configurations stored in the NIB.

To perform this mapping, the system of some embodiments uses a database table mapping engine to map input tables, which are created from (1) logical switching configuration attributes, and (2) a set of properties associated with switching elements used by the system, to output tables. The content of these output tables are then transferred to the NIB elements. In some embodiments, the system uses a variation of the datalog database language, called nLog, to create the table mapping engine that maps input tables containing logical datapath data and switching element attributes to the output tables. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table-mapping rules engine that is referred to below as the nLog engine. In some embodiments, the nLog virtualization engine also provides feedback (e.g., from one or more of the output tables or from NIB records that are updated to reflect values stored in the output tables) to the user in order to provide the user with state information about the logical datapath set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical datapath sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical datapath sets in terms of one or more tables, which are then mapped in an automated manner to output tables and later transferred from the output tables to the NIB. This approach allows the Type II virtualized systems to forego maintaining the data regarding the logical datapath sets in the NIB. However, some embodiments maintain this data in the NIB in order to distribute this data among other NOS instances, as further described below.

As apparent from the above discussion, the applications that run on top of a NOS instance can perform several different sets of operations in several different embodiments of the invention. Examples of such operations include providing an interface to a user to access NIB data regarding the user's switching configuration, providing different layered NIB views to different users, providing control logic for modifying the provided NIB data, providing logic for propagating received modifications to the NIB, etc.

In some embodiments, the system embeds some or all such operations in the NOS instead of including them in an application operating on top of the NOS. Alternatively, in other embodiments, the system separates some or all of these operations into different subsets of operations and then has two or more applications that operate above the NOS perform the different subsets of operations. One such system runs two applications on top of the NOS: a control application and a virtualization application. In some embodiments, the control application allows a user to specify and populate logical datapath sets, while the virtualization application implements the specified logical datapath sets by mapping the logical datapath sets to the physical switching infrastructure. In some embodiments, the virtualization application translates control application input into records that are written into the NIB, and then these records are subsequently transferred from the NIB to the switching infrastructure through the operation of the NOS. In some embodiments, the NIB stores both the logical datapath set input received through the control application and the NIB records that are produced by the virtualization application.

In some embodiments, the control application can receive switching infrastructure data from the NIB. In response to this data, the control application may modify record(s) associated with one or more logical datapath sets (LDPS). Any such modified LDPS record would then be translated to one or more physical switching infrastructure records by the virtualization application, which might then be transferred to the physical switching infrastructure by the NOS.

In some embodiments, the NIB stores data regarding each switching element within the network infrastructure of a system, while in other embodiments, the NIB stores state information about only switching elements at the edge of a network infrastructure. In some embodiments, edge switching elements are switching elements that have direct connections with the computing devices of the users, while non-edge switching elements only connect to edge switching elements and other non-edge switching elements.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward between switching elements. The edge switches forward between computing devices and other network elements. Thus, the system can maintain user isolation simply by controlling the edge switching elements because the edge switching elements are the last switches in line to forward packets to hosts.

Controlling only edge switches also allows the system to be deployed independent of concerns about the hardware vendor of the non-edge switches. Deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system. Edge switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes in this switching architecture and one or more non-edge switches as the non-leaf nodes in this architecture. In some such embodiments, each edge switch connects to one or more of the non-leaf switches, and uses such non-leaf switches to facilitate its communication with other edge switches. Examples of functions that such non-leaf switches provide to facilitate such communications between edge switches in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets for routing to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off-the-shelf switch. In some embodiments, the standalone computer may also be executing a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement logical datapath sets through the managed switches.

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serve a purpose other than backing up the data in the NIB (e.g., for storing data that is not in the NIB).

In some embodiments, the NIB is stored in system memory (e.g., RAM) while the system operates. This allows for fast access of the NIB records. In some embodiments, one or more of the secondary storage structures, on the other hand, are stored on disks, or other non-volatile memories, which can be slower to access. Such non-volatile disks or other non-volatile memories, however, improve the resiliency of the system as they allow the data to be stored in a persistent manner.

The system of some embodiments uses multiple types of storages in its pool of secondary storage structures. These different types of structures store different types of data, store data in different manners, and provide different query interfaces that handle different types of queries. For instance, in some embodiments, the system uses a persistent transactional database (PTD) and a hash table structure. The PTD in some embodiments is a database that is stored on disk or other non-volatile memory. In some embodiments, the PTD is a commonly available database, such as MySQL or SQLite. The PTD of some embodiments can handle complex transactional queries. As a transactional database, the PTD can undo a series of earlier query operations that it has performed as part of a transaction when one of the subsequent query operations of the transaction fails.

Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met. The PTD in some embodiments stores an exact replica of the data that is stored in the NIB, while in other embodiments it stores only a subset of the data that is stored in the NIB. In some embodiments, some or all of the data in the NIB is stored in the PTD in order to ensure that the NIB data will not be lost in the event of a crash of the NOS or the NIB.

While the system is running, the hash table in some embodiments is not stored on a disk or other non-volatile memory. Instead, it is a storage structure that is stored in volatile system memory when the system is running. When the system is powered down, the contents of the hash table are stored on disk. The hash table uses hashed indices that allow it to retrieve records in response to queries. This structure combined with the hash table's placement in the system's volatile memory allows the table to be accessed very quickly. To facilitate this quick access, a simplified query interface is used in some embodiments. For instance, in some embodiments, the hash table has just two queries: a Put query for writing values to the table and a Get query for retrieving values from the table. The system of some embodiments uses the hash table to store data that the NOS needs to retrieve very quickly. Examples of such data include network entity status, statistics, state, uptime, link arrangement, and packet handling information. Furthermore, in some embodiments, the NOS uses the hash tables as a cache to store information that is repeatedly queried, such as flow entries that will be written to multiple nodes.

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of the NOS running on one or more computers, with each instance of the NOS containing one or more of the secondary storage structures described above. Each instance in some embodiments not only includes a NOS instance, but also includes a virtualization application instance and/or a control application instance. In some of these embodiments, the control and/or virtualization applications partition the workload between the different instances in order to reduce each instance's control and/or virtualization workload. Also, in some embodiments, the multiple instances of the NOS communicate the information stored in their secondary storage layers to enable each instance of the NOS to cover for the others in the event of a NOS instance failing. Moreover, some embodiments use the secondary storage layer (i.e., one or more of the secondary storages) as a channel for communicating between the different instances.

The distributed, multi-instance control system of some embodiments maintains the same switch element data records in the NIB of each instance, while in other embodiments, the system allows NIBs of different instances to store different sets of switch element data records. Some embodiments that allow different instances to store different portions of the NIB, divide the NIB into N mutually exclusive portions and store each NIB portion in one NIB of one of N controller instances, where N is an integer value greater than 1. Other embodiments divide the NIB into N portions and store different NIB portions in different controller instances, but allow some or all of the portions to partially (but not completely) overlap with the other NIB portions.

The hash tables in the distributed control system of some embodiments form a distributed hash table (DHT), with each hash table serving as a DHT instance. In some embodiments, the DHT instances of all controller instances collectively store one set of records that is indexed based on hashed indices for quick access. These records are distributed across the different controller instances to minimize the size of the records within each instance and to allow for the size of the DHT to be increased by adding other DHT instances. According to this scheme, each DHT record is not stored in each controller instance. In fact, in some embodiments, each DHT record is stored in at most one controller instance. To improve the system's resiliency, some embodiments, however, allow one DHT record to be stored in more than one controller instance, so that in case one instance fails, the DHT records of that failed instance can be accessed from other instances. Some embodiments do not allow for replication of records across different DHT instances or allow only a small amount of such records to be replicated because these embodiments store in the DHT only the type of data that can be quickly re-generated.

The distributed control system of some embodiments replicates each NIB record in the secondary storage layer (e.g., in each PTD instance and/or in the DHT) in order to maintain the records in the NIB in a persistent manner. For instance, in some embodiments, all the NIB records are stored in the PTD storage layer. In other embodiments, only a portion of the NIB data is replicated in the PTD storage layer. For instance, some embodiments store a subset of the NIB records in another one of the secondary storage records, such as the DHT.

By allowing different NOS instances to store the same or overlapping NIB records, and/or secondary storage structure records, the system improves its overall resiliency by guarding against the loss of data due to the failure of any NOS or secondary storage structure instance. For instance, in some embodiments, the portion of NIB data that is replicated in the PTD (which is all of the NIB data in some embodiments or part of the NIB data in other embodiments) is replicated in the NIBs and PTDs of all controller instances, in order to protect against failures of individual controller instances (e.g., of an entire controller instance or a portion of the controller instance).

In some embodiments, each of the storages of the secondary storage layer uses a different distribution technique to improve the resiliency of a multiple NOS instance system. For instance, as mentioned above, the system of some embodiments replicates the PTD across NOS instances so that every NOS has a full copy of the PTD to enable a failed NOS instance to quickly reload its PTD from another instance. In some embodiments, the system distributes the DHT fully or with minimal overlap across multiple controller instances in order to minimize the size of the DHT instance (e.g., the amount of memory the DHT instance utilizes) within each instance. This approach also allows the size of the DHT to be increased by adding additional DHT instances, and this in turn allows the system to be more scalable.

For some or all of the communications between the distributed instances, the distributed system of some embodiments uses coordination managers (CM) in the controller instances to coordinate activities between the different controllers. Examples of such activities include writing to the NIB, writing to the PTD, writing to the DHT, controlling the switching elements, facilitating intra-controller communication related to fault tolerance of controller instances, etc.

To distribute the workload and to avoid conflicting operations from different controller instances, the distributed control system of some embodiments designates one controller instance within the system as the master of any particular NIB portion (e.g., as the master of a logical datapath set) and one controller instance within the system as the master of any given switching element. Even with one master controller, a different controller instance can request changes to different NIB portions and/or to different switching elements controlled by the master. If allowed, the master instance then effectuates this change and writes to the desired NIB portion and/or switching element. Otherwise, the master rejects the request.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 10 conceptually illustrates an approach of maintaining an entire global NIB data structure in each NOS instance according to some embodiments of the invention.

FIG. 11 conceptually illustrates an alternative approach of dividing a global NIB into separate portions and storing each of these portions in a different NOS instance according to some embodiments of the invention.

FIG. 12 conceptually illustrates another alternative approach of dividing a global NIB into overlapping portions and storing each of these portions in different NOS instances according to some embodiments of the invention.

FIG. 43 conceptually illustrates a data flow diagram that shows a PTD replication process of some embodiments.

DETAILED DESCRIPTION

Figure 1:
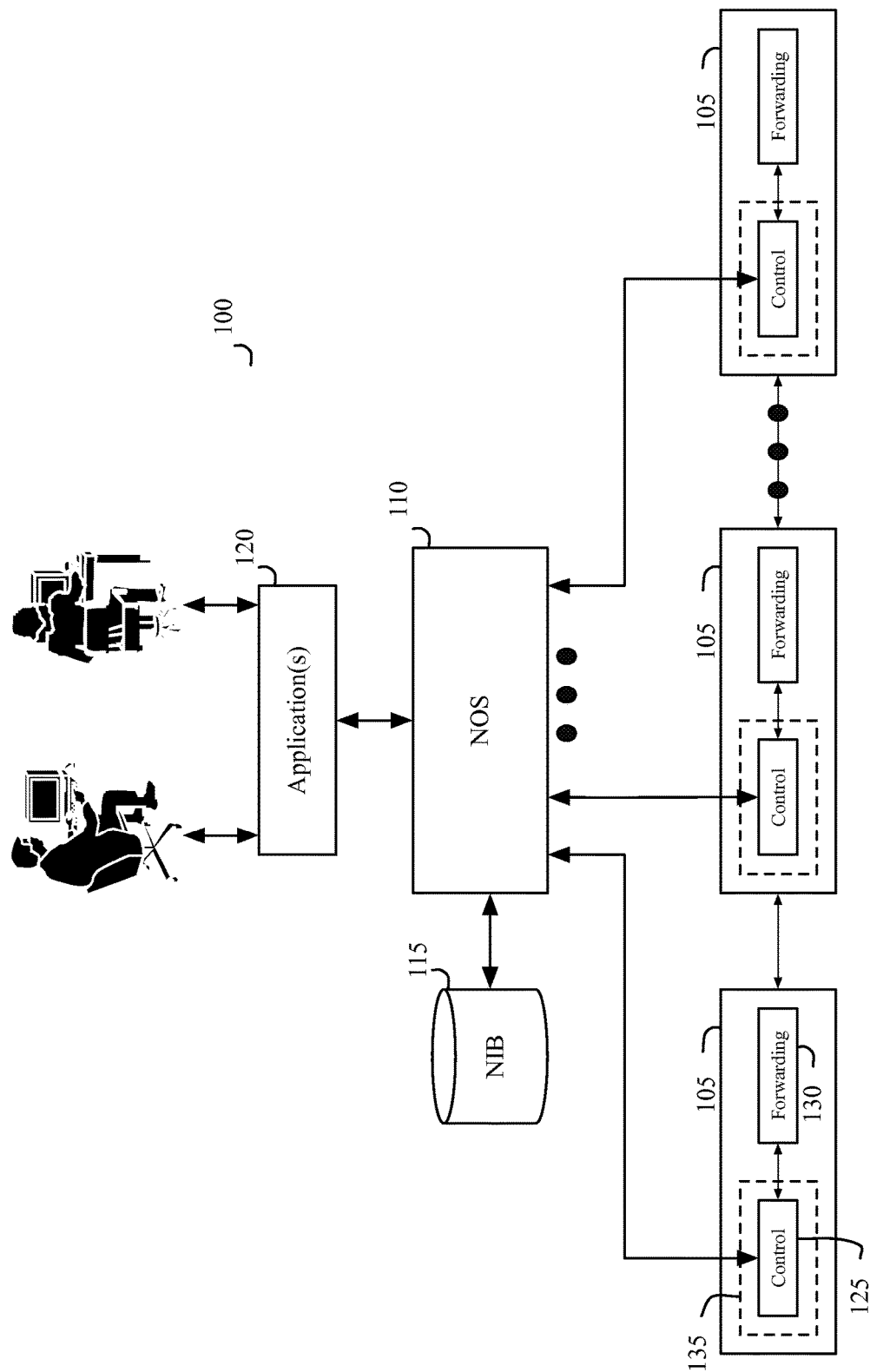
FIG. 1 illustrates a virtualized network system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method that allows several different logical datapath sets to be specified for several different users through one or more shared switching elements without allowing the different users to control or even view each other's switching logic. In some embodiments, the method provides a set of software tools that allows the system to accept logical datapath sets from users and to configure the switching elements to implement these logical datapath sets. These software tools allow the method to virtualize control of the shared switching elements and the network that is defined by the connections between these shared switching elements, in a manner that prevents the different users from viewing or controlling each other's logical datapath sets while sharing the same switching elements.

In some embodiments, one of the software tools that the method provides that allows it to virtualize control of a set of switching elements (i.e., to enable the method to allow several users to share the same switching elements without viewing or controlling each other's logical datapath sets) is an intermediate data storage structure that (1) stores the state of the network, (2) receives modifications to different parts of the network from different users, and (3), in some embodiments, provides different views of the state of the network to different users. For instance, in some embodiments, the intermediate data storage structure is a network information base (NIB) data structure that stores the state of the network that is defined by one or more switching elements. In some embodiments, the NIB also stores the logical configuration and the logical state for each user specified logical datapath set. In these embodiments, the information in the NIB that represents the state of the actual switching elements accounts for only a subset of the total information stored in the NIB.

The method uses the NIB data structure to read the state of the network and to write modifications to the state of the network. When the data structure is modified in order to effectuate a change in the switching logic of a switching element, the method propagates the modification to the switching element.

In some embodiments, the method is employed by a virtualized network control system that (1) allows user to specify different logical datapath sets, (2) maps these logical datapath sets to a set of switching elements managed by the control system. In some embodiments, the switching elements include virtual or physical network switches, software switches (e.g., Open vSwitch), routers, and/or other switching elements, as well as any other network elements (such as load balancers, etc.) that establish connections between these switches, routers, and/or other switching elements. Such switching elements (e.g., physical switching elements, such as physical switches or routers) are implemented as software switches in some embodiments. Software switches are switches that are implemented by storing the switching tables in the memory of a standalone computer instead of an off the shelf switch. In some embodiments, the standalone computer may also be executing in some cases a hypervisor and one or more virtual machines on top of that hypervisor These switches are referred to below as managed switching elements or managed forwarding elements as they are managed by the network control system in order to implement the logical datapath sets. In some embodiments described below, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it a destination device, etc. In some embodiments, the physical control plane data that is pushed to a switching element is converted by the switching element (e.g., by a general purpose processor of the switching element) to physical forwarding plane data that specify how the switching element (e.g., how a specialized switching circuit of the switching element) process data packets that it receives.

The virtualized control system of some embodiments includes (1) a network operating system (NOS) that creates and maintains the NIB storage structure, and (2) one or more applications that run on top of the NOS to specify control logic for reading values from and writing values to the NIB. The NIB of some of these embodiments serves as a communication channel between the different controller instances and, in some embodiments, a communication channel between different processing layers of a controller instance.

Several examples of such systems are described below in Section I. Section II then describes the NIB data structure of some embodiments of the invention. Section III then describes a distributed, multi-instance architecture of some embodiments in which multiple stacks of the NOS and the control applications are used to control the shared switching elements within a network in a scalable and resilient manner. Section IV then provides a more detailed example of the NOS of some embodiments of the invention. Section V then describes several other data storage structures that are used by the NOS of some embodiments of the invention. Finally, Section VI describes the computer systems and processes used to implement some embodiments of the invention.

I. Virtualized Control System

FIG. 1 illustrates a virtualized network system 100 of some embodiments of the invention. This system allows multiple users to create and control multiple different sets of logical datapaths on a shared set of network infrastructure switching elements (referred to below as "switching elements"). In allowing a user to create and control the user's set of logical datapaths (i.e., the user's switching logic), the system does not allow the user to have direct access to another user's set of logical datapaths in order to view or modify the other user's switching logic. However, the system does allow different users to pass packets through their virtualized switching logic to each other if the users desire such communication.

As shown in FIG. 1, the system 100 includes one or more switching elements 105, a network operating system 110, a network information base 115, and one or more applications 120. The switching elements include N switching elements (where N is a number equal to 1 or greater) that form the network infrastructure switching elements of the system 100. In some embodiments, the network infrastructure switching elements include virtual or physical network switches, software switches (e.g., Open vSwitch), routers, and/or other switching elements, as well as any other network elements (such as load balancers, etc.) that establish connections between these switches, routers, and/or other switching elements. All such network infrastructure switching elements are referred to below as switching elements or forwarding elements.

The virtual or physical switching elements 105 typically include control switching logic 125 and forwarding switching logic 130. In some embodiments, a switch's control logic 125 specifies (1) the rules that are to be applied to incoming packets, (2) the packets that will be discarded, and (3) the packet processing methods that will be applied to incoming packets. The virtual or physical switching elements 105 use the control logic 125 to populate tables governing the forwarding logic 130. The forwarding logic 130 performs lookup operations on incoming packets and forwards the incoming packets to destination addresses.

As further shown in FIG. 1, the system 100 includes one or more applications 120 through which switching logic (i.e., sets of logical datapaths) is specified for one or more users (e.g., by one or more administrators or users). The network operating system (NOS) 110 serves as a communication interface between (1) the switching elements 105 that perform the physical switching for any one user, and (2) the applications 120 that are used to specify switching logic for the users. In this manner, the application logic determines the desired network behavior while the NOS merely provides the primitives needed to access the appropriate network state. In some embodiments, the NOS 110 provides a set of Application Programming Interfaces (API) that provides the applications 120 programmatic access to the network switching elements 105 (e.g., access to read and write the configuration of network switching elements). In some embodiments, this API set is data-centric and is designed around a view of the switching infrastructure, allowing control applications to read the state from and write the state to any element in the network.

To provide the applications 120 programmatic access to the switching elements, the NOS 110 itself needs to be able to control the switching elements 105. The NOS uses different techniques in different embodiments to control the switching elements. In some embodiments, the NOS can specify both control and forwarding switching logic 125 and 130 of the switching elements. In other embodiments, the NOS 110 controls only the control switching logic 125 of the switching elements, as shown in FIG. 1. In some of these embodiments, the NOS 110 manages the control switching logic 125 of a switching element through a commonly known switch-access interface that specifies a set of APIs for allowing an external application (such as a network operating system) to control the control plane functionality of a switching element. Two examples of such known switch-access interfaces are the OpenFlow interface and the Open Virtual Switch interface, which are respectively described in the following two papers: McKeown, N. (2008). *OpenFlow: Enabling Innovation in Campus Networks* (which can be retrieved from http://www.openflowswitch.org//documents/openflow-wp-latest.pdf), and Pettit, J. (2010). *Virtual Switching in an Era of Advanced Edges* (which can be retrieved from http://openvswitch.org/papers/dccaves2010.pdf). These two papers are incorporated herein by reference.

FIG. 1 conceptually illustrates the use of switch-access APIs through the depiction of dashed boxes 135 around the control switching logic 125. Through these APIs, the NOS can read and write entries in the control plane flow tables. The NOS' connectivity to the switching elements' control plane resources (e.g., the control plane tables) is implemented in-band (i.e., with the network traffic controlled by NOS) in some embodiments, while it is implemented out-of-band (i.e., over a separate physical network) in other embodiments. There are only minimal requirements for the chosen mechanism beyond convergence on failure and basic connectivity to the NOS, and thus, when using a separate network, standard IGP protocols such as IS-IS or OSPF are sufficient.

In order to define the control switching logic 125 for physical switching elements, the NOS of some embodiments uses the Open Virtual Switch protocol to create one or more control tables within the control plane of a switch element. The control plane is typically created and executed by a general purpose CPU of the switching element. Once the system has created the control table(s), the system then writes flow entries to the control table(s) using the Open-Flow protocol. The general purpose CPU of the physical switching element uses its internal logic to convert entries written to the control table(s) to populate one or more forwarding tables in the forwarding plane of the switch element. The forwarding tables are created and executed typically by a specialized switching chip of the switching element. Through its execution of the flow entries within the forwarding tables, the switching chip of the switching element can process and route packets of data that it receives.

To enable the programmatic access of the applications 120 to the switching elements 105, the NOS also creates the network information base (NIB) 115. The NIB is a data structure in which the NOS stores a copy of the switch-element states tracked by the NOS. The NIB of some embodiments is a graph of all physical or virtual switch elements and their interconnections within a physical network topology and their forwarding tables. For instance, in some embodiments, each switching element within the network infrastructure is represented by one or more data objects in the NIB. However, in other embodiments, the NIB stores state information about only some of the switching elements. For example, as further described below, the NIB in some embodiments only keeps track of switching elements at the edge of a network infrastructure. In yet other embodiments, the NIB stores state information about edge switching elements in a network as well as some non-edge switching elements in the network that facilitate communication between the edge switching elements. In some embodiments, the NIB also stores the logical configuration and the logical state for each user specified logical datapath set. In these embodiments, the information in the NIB that represents the state of the actual switching elements accounts for only a subset of the total information stored in the NIB.

In some embodiments, the NIB 115 is the heart of the NOS control model in the virtualized network system 100. Under one approach, applications control the network by reading from and writing to the NIB. Specifically, in some embodiments, the application control logic can (1) read the current state associated with network entity objects in the NIB, (2) alter the network state by operating on these objects, and (3) register for notifications of state changes to these objects. Under this model, when an application 120 needs to modify a record in a table (e.g., a control plane flow table) of a switching element 105, the application 120 first uses the NOS' APIs to write to one or more objects in the NIB that represent the table in the NIB. The NOS then, acting as the switching element's controller, propagates this change to the switching element's table.

Figure 2:
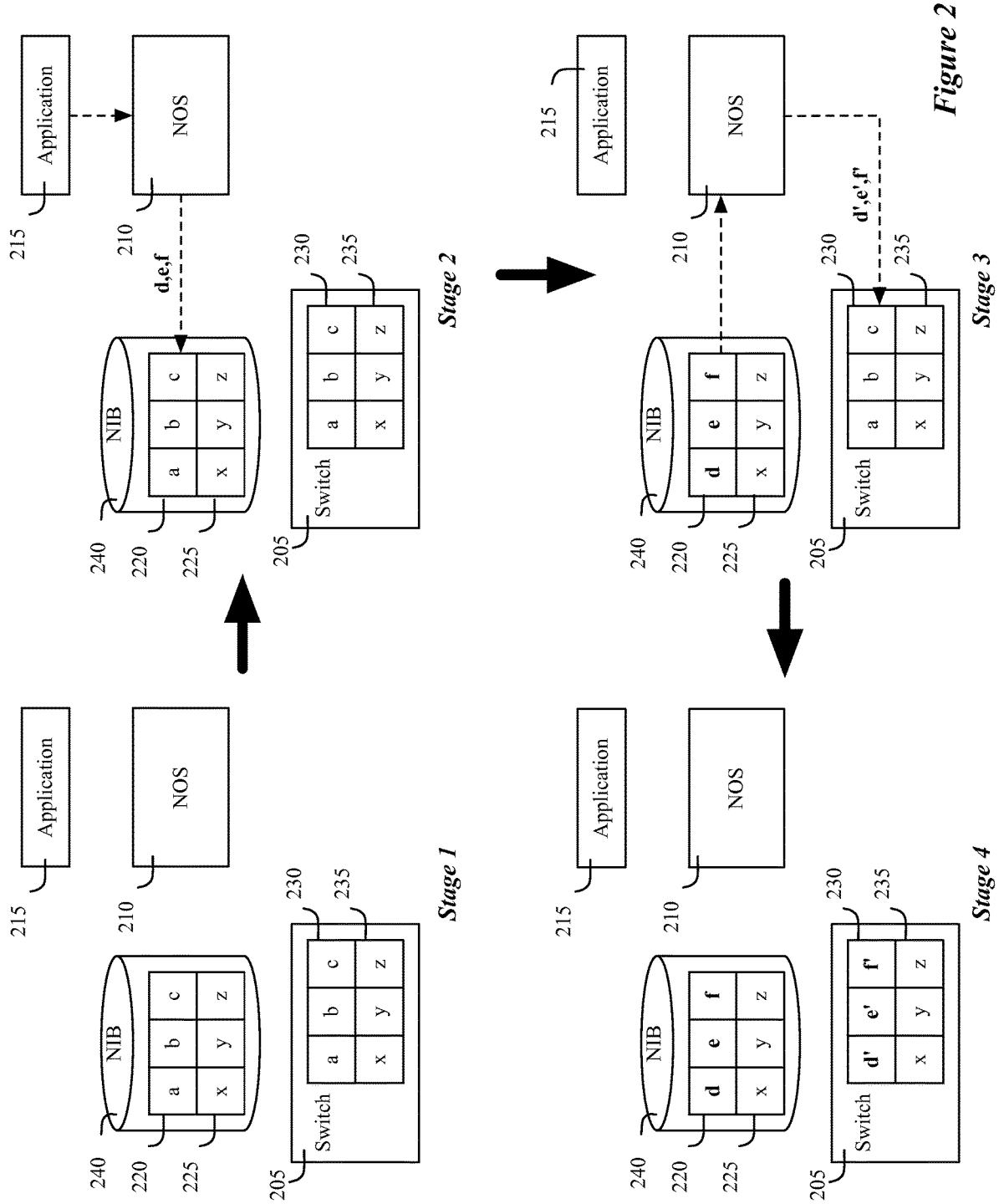
FIG. 2 conceptually illustrates an example of switch controller functionality.

FIG. 2 presents one example that illustrates this switch controller functionality of the NOS 110. In particular, this figure illustrates in four stages the modification of a record (e.g., a flow table record) in a switch 205 by an application 215 and a NOS 210. In this example, the switch 205 has two switch logic records 230 and 235. As shown in stage one of FIG. 2, a NIB 240 stores two records 220 and 225 that correspond to the two switch logic records 230 and 235 of the switch. In the second stage, the application uses the NOS' APIs to write three new values d, e, and f in one of the records 220 in the NIB to replace three previous values a, b, and c.

Next, in the third stage, the NOS uses the set of switch-access APIs to write a new set of values into the switch. In some embodiments, the NIB performs a translation operation that modifies the format of the records before writing these records into the NIB. This operation is pictorially illustrated in FIG. 2 by showing the values d, e, and f translated into d', e', and f', and the writing of these new values into the switch 205. Alternatively, in some embodiments, one or more sets of values are kept identically in the NIB and the switching element, which thereby causes the NOS 210 to write the NIB values directly to the switch 205 unchanged.

In yet other embodiments, the NOS' translation operation might modify the set of values in the NIB (e.g., the values d, e, and f) into a different set of values with fewer values (e.g., values x and y, where x and y might be a subset of d, e, and f, or completely different) or additional values (e.g., the w, x, y, and z, where w, x, y, and z might be a super set of all or some of d, e, and f, or completely different). The NOS in these embodiments would then write this modified set of values (e.g., values x and y, or values w, x, y and z into the switching element).

The fourth stage finally shows the switch 205 after the old values a, b, and c have been replaced in the switch control record 230 with the values d', e', and f'. Again, in the example shown in FIG. 2, the NOS of some embodiments propagates NIB records to the switches as modified versions of the records were written to the NIB. In other embodiments, the NOS applies processing (e.g., data transformation) to the NIB records before the NOS propagates the NIB records to the switches, and such processing changes the format, content and quantity of data written to the switches.

A. Different NIB Views

In some embodiments, the virtualized system 100 of FIG. 1 provides different views of the NIB to different users in order (1) to ensure that different users do not have direct view and control over each other's switching logic and (2) to provide each user with a view of the switching logic at an abstraction level that is desired by the user. For instance, in some embodiments, the NIB is a hierarchical data structure that represents different attributes of different switching elements as elements (e.g., different nodes) in a hierarchy. The NIB in some of these embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serve as abstractions of the actual switching elements and their attributes. As further described below, some of these higher layer elements are used in some embodiments to show different abstract switching elements and/or switching element attributes to different users in a virtualized control system. In other words, the NOS of some embodiments generates the multi-layer, hierarchical NIB data structure, and the NOS or an application that runs on top of the NOS shows different users different views of different parts of the hierarchical levels and/or layers, in order to provide the different users with virtualized access to the shared switching elements and network.

Figure 3:
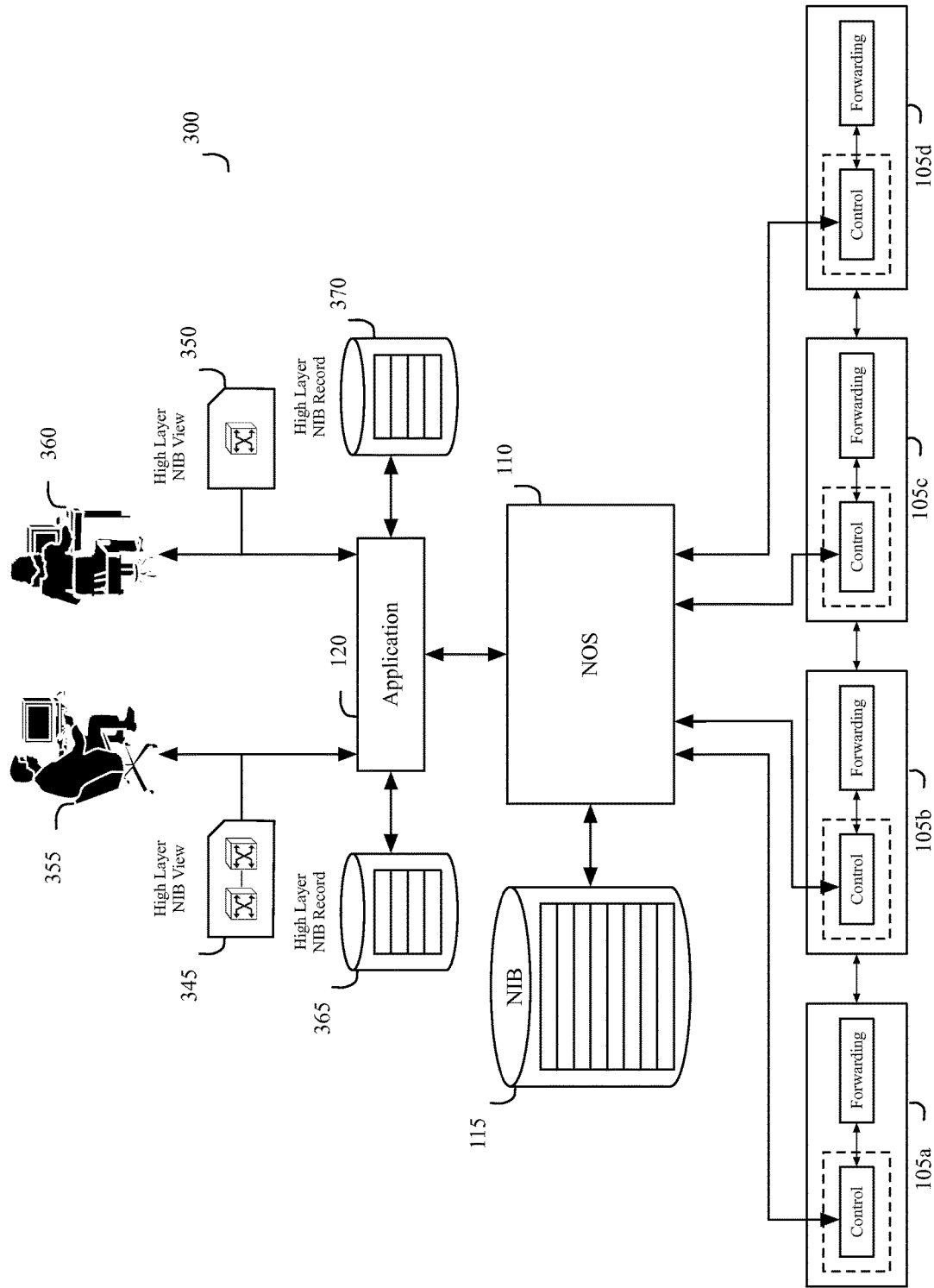
FIG. 3 conceptually illustrates an example of displaying different NIB views to different users.

FIG. 3 illustrates an example of displaying different NIB views to different users. Specifically, this figure illustrates a virtualized switching system 300 that includes several switching elements that are shared by two users. The system 300 is similar to the system 100 of FIG. 1, except that the system 300 is shown to include four switching elements 105a-105d and one application 120, as opposed to the more general case of N switching elements 105 and M (where M is a number greater than or equal to 1) applications in FIG. 1. The number of switching elements and the use of one application are purely exemplary. Other embodiments might use more or fewer switching elements and applications. For instance, instead of having the two users interface with the same application, other embodiments provide two applications to interface with the two users.

In system 300, the NIB 115 stores sets of data records for each of the switching elements 105a-105d. In some embodiments, a system administrator can access these four sets of data through an application 120 that interfaces with the NOS. However, other users that are not system administrators do not have access to all of the four sets of records in the NIB, because some switch logic records in the NIB might relate to the logical switching configuration of other users.

Instead, each non-system-administrator user can only view and modify the switching element records in the NIB that relate to the logical switching configuration of the user. FIG. 3 illustrates this limited view by showing the application 120 providing a first layered NIB view 345 to a first user 355 and a second layered NIB view 350 to a second user 360. The first layered NIB view 345 shows the first user data records regarding the configuration of the shared switching elements 105a-105d for implementing the first user's switching logic and the state of this configuration. The second layered NIB view 350 shows the second user data records regarding the configuration of the shared switching elements 105a-105d for implementing the second user's switching logic and the state of this configuration. In viewing their own logical switching configuration, neither user can view the other user's logical switching configuration.

In some embodiments, each user's NIB view is a higher level NIB view that represents an abstraction of the lowest level NIB view that correlates to the actual network infrastructure that is formed by the switching elements 105a-105d. For instance, as shown in FIG. 3, the first user's layered NIB view 345 shows two switches that implement the first user's logical switching configuration, while the second user's layered NIB view 350 shows one switch that implements the second user's logical switching configuration. This could be the case even if either user's switching configuration uses all four switching elements 105a-105d. However, under this approach, the first user perceives that his computing devices are interconnected by two switching elements, while the second user perceives that her computing devices are interconnected by one switching element.

The first layered NIB view is a reflection of a first set of data records 365 that the application 120 allows the first user to access from the NIB, while the second layered NIB view is a representation of a second set of data records 370 that the application 120 allows the second user to access from the NIB. In some embodiments, the application 120 retrieves the two sets of data records 365 and 370 from the NIB and maintains these records locally, as shown in FIG. 3. In other embodiments, however, the application does not maintain these two sets of data records locally. Instead, in these other embodiments, the application simply provides the users with an interface to access the limited set of first and second data records from the NIB 115. Also, in other embodiments, the system 300 does not provide switching element abstractions in the higher layered NIB views 345 and 350 that it provides to the users. Rather, it simply provides views to the limited first and second set of data records 365 and 370 from the NIB.

Irrespective of whether the application maintains a local copy of the first and second data records or whether the application only provides the switching element abstractions in its higher layered NIB views, the application 120 serves as an interface through which each user can view and modify the user's logical switching configuration, without being able to view or modify the other user's logical switching configuration. Through the set of APIs provided by the NOS 110, the application 120 propagates to the NIB 115 changes that a user makes to the logical switching configuration view that the user receives from the application. The propagation of these changes entails the transferring, and in some cases of some embodiments, the transformation, of the high level data entered by a user for a higher level NIB view to lower level data that is to be written to lower level NIB data that is stored by the NOS.

In the system 300 of FIG. 3, the application 120 can perform several different sets of operations in several different embodiments of the invention, as apparent from the discussion above. Examples of such operations include providing an interface to a user to access NIB data regarding the user's logical switching configuration, providing different layered NIB views to different users, providing control logic for modifying the provided NIB data, providing logic for propagating received modifications to the NIB structure stored by the NOS, etc.

Figure 4:
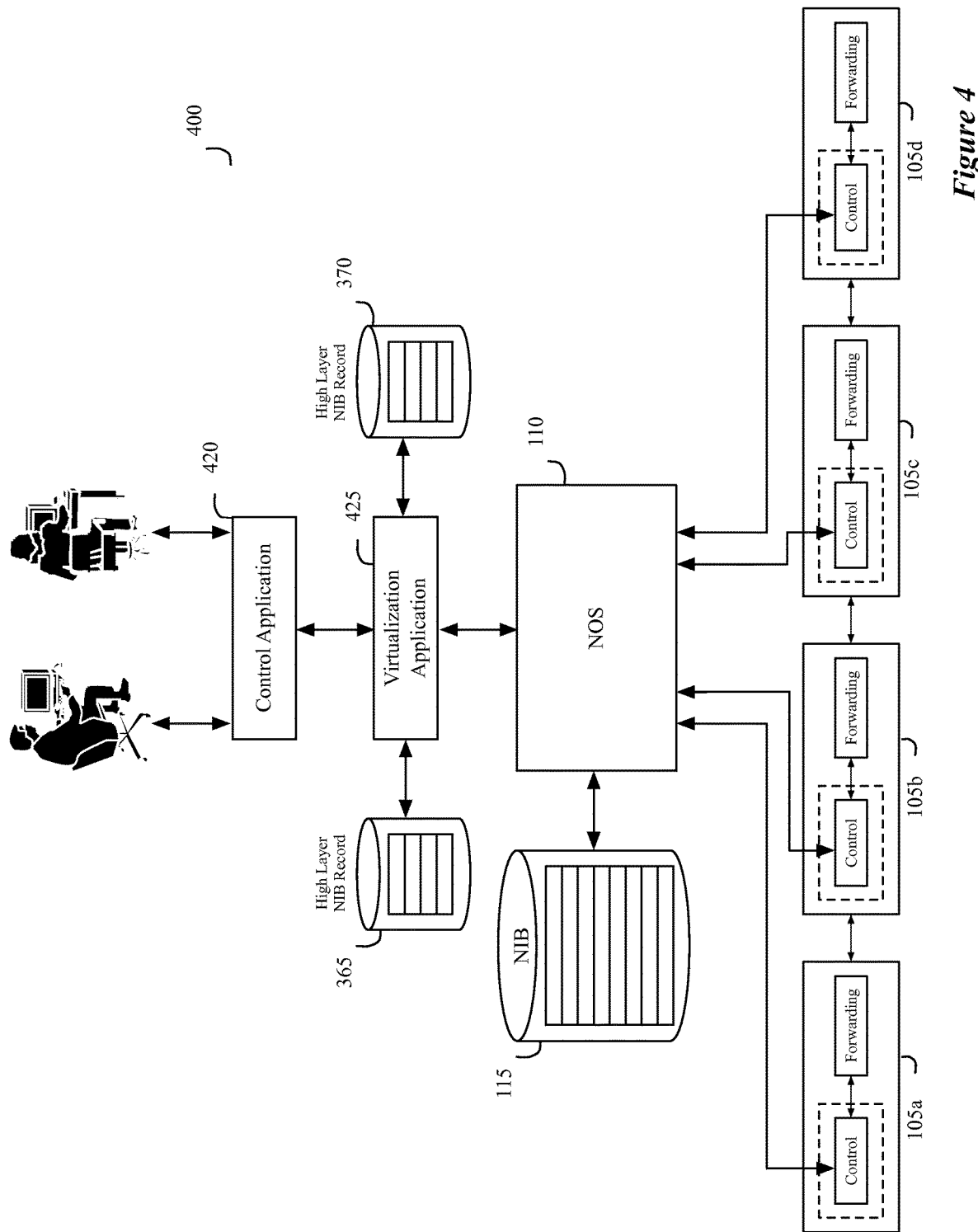
FIG. 4 conceptually illustrates a virtualized system that employs several applications above the NOS of some embodiments.

The system of some embodiments embeds all such operations in the NOS 110 instead of in the application 120 operating on top of the NOS. Alternatively, in other embodiments the system separates these operations into several applications that operate above the NOS. FIG. 4 illustrates a virtualized system that employs several such applications. Specifically, this figure illustrates a virtualized system 400 that is similar to the virtualized system 300 of FIG. 3, except that the operations of the application 120 in the system 300 have been divided into two sets of operations, one that is performed by a control application 420 and one that is performed by a virtualization application 425.

In some embodiments, the virtualization application 425 interfaces with the NOS 110 to provide different views of different NIB records to different users through the control application 420. The control application 420 also provides the control logic for allowing a user to specify different operations with respect to the limited NIB records/views provided by the virtualization application. Examples of such operations can be read operations from the NIB or write operations to the NIB. The virtualization application then translates these operations into operations that access the NIB. In translating these operations, the virtualization application in some embodiments also transfers and/or transforms the data that are expressed in terms of the higher level NIB records/views to data that are expressed in terms of lower level NIB records.

Even though FIG. 4 shows just one control application and one virtualization application being used for the two users, the system 400 in other embodiments employs two control applications and/or two virtualization applications for the two different users. Similarly, even though several of the above-described figures show one or more applications operating on a single NOS instance, other embodiments provide several different NOS instances on top of each of which one or more applications can execute. Several such embodiments will be further described below.

B. Type I Versus Type II Virtualized System

Different embodiments of the invention use different types of virtualization applications. One type of virtualization application exposes the definition of different elements at different hierarchical levels in the NIB and the definition of the links between these elements to the control applications that run on top of the NOS and the virtualization application in order to allow the control application to define its operations by reference to these definitions. For instance, in some embodiments, the developer of the control application running on top of the virtualization application uses these definitions to enumerate how the application is to map the logical datapath sets of the user to the physical switching elements of the control system. Under this approach, the developer would have to enumerate all different scenarios that the control system may encounter and the mapping operation of the application for each scenario. This type of virtualization is referred to below as Type I network virtualization.

Another type of network virtualization, which is referred to below as Type II network virtualization, does not require the application developers to have intimate knowledge of the NIB elements and the links in the NIB between these elements. Instead, this type of virtualization allows the application to simply provide user specified switching element attributes in the form of one or more tables, which are then mapped to NIB records by a table mapping engine. In other words, the Type II virtualized system of some embodiments accepts switching element configurations (e.g., access control list table configurations, L2 table configurations, L3 table configurations, etc.) that the user defines without referencing any operational state of the switching elements in a particular network configuration. It then maps the user-specified switching element configurations to the switching element configurations stored in the NIB.

Figure 5:
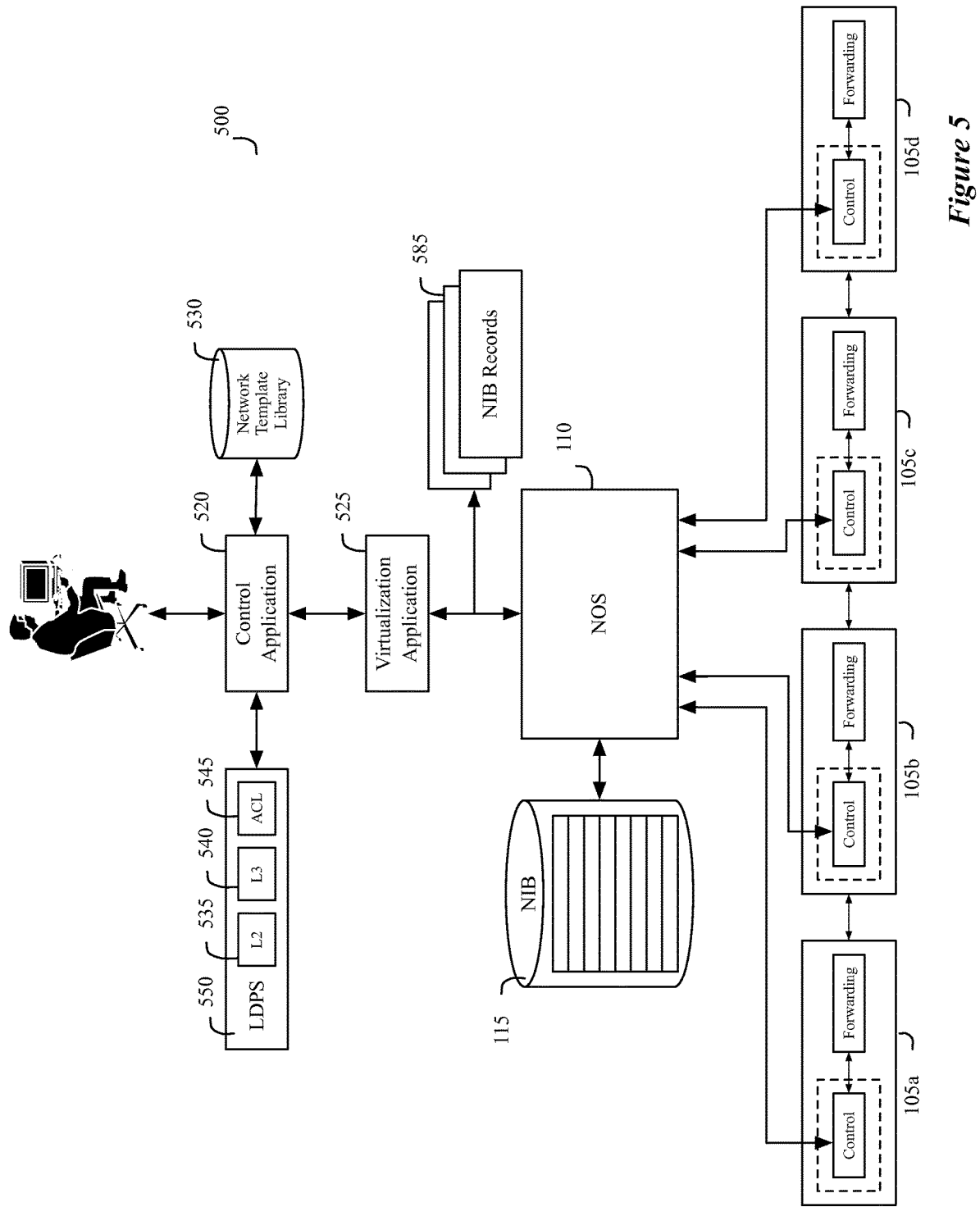
FIG. 5 conceptually illustrates an example of a virtualized system.

FIG. 5 illustrates an example of such a Type II virtualized system. Like the virtualized system 300 of FIG. 3 and the virtualized system 400 of FIG. 4, the virtualized system 500 in this example is shown to include one NOS 110 and four switching elements 105a-105d. Also, like the virtualized system 400, the system 500 includes a control application 520 and a virtualization application 525 that run on top of the NOS 110. In some embodiments, the control application 520 allows a user to specify and populate logical datapath sets, while the virtualization application 525 implements the specified logical datapath sets by mapping the logical datapath sets to the physical switching infrastructure.

More specifically, the control application 520 allows (1) a user to specify abstract switching element configurations, which the virtualization application 525 then maps to the data records in the NIB, and (2) the user to view the state of the abstract switching element configurations. In some embodiments, the control application 520 uses a network template library 530 to allow a user to specify a set of logical datapaths by specifying one or more switch element attributes (i.e., one or more switch element configurations). In the example shown in FIG. 5, the network template library includes several types of tables that a switching element may include. In this example, the user has interfaced with the control application 520 to specify an L2 table 535, an L3 table 540, and an access control list (ACL) table 545. These three table specify a logical datapath set 550 for the user. In some embodiments a logical datapath set defines a logical switching element (also referred to as a logical switch). A logical switch in some embodiments is a simulated/conceptual switch that is defined (e.g., by a user) to conceptually describe a set of switching behaviors for a switch. The control application of some embodiments (such as the control application 520 illustrated in FIG. 5) implements this logical switch across one or more physical switches, which as mentioned above may be hardware switches, software switches, or virtual switches defined on top of other switches.

In specifying these tables, the user simply specifies desired switch configuration records for one or more abstract, logical switching elements. When specifying these records, the user of the system 500 does not have any understanding of the switching elements 105a-105d employed by the system nor any data regarding these switching elements from the NIB 115. The only switch-element specific data that the user of the system 500 receives is the data from the network template library, which specifies the types of network elements that the user can define in the abstract, which the system can then process.

While the example in FIG. 5 shows the user specifying an ACL table, one of ordinary skill in the art will realize that the system of some embodiments does not provide such specific switch table attributes in the library 530. For instance, in some embodiments, the switch-element abstractions provided by the library 530 are generic switch tables and do not relate to any specific switching element table, component and/or architecture. In these embodiments, the control application 520 enables the user to create generic switch configurations for a generic set of one or more tables. Accordingly, the abstraction level of the switch-element attributes that the control application 520 allows the user to create is different in different embodiments.

Irrespective of the abstraction level of the switch-element attributes produced through the control logic application, the virtualization application 525 performs a mapping operation that maps the specified switch-element attributes (e.g., the specific or generic switch table records) to records in the NIB. In some embodiments, the virtualization application translates control application input into one or more NIB records 585 that the virtualization application then writes to the NIB through the API set provided by the NOS. From the NIB, these records are then subsequently transferred to the switching infrastructure through the operation of the NOS. In some embodiments, the NIB stores both the logical datapath set input received through the control application as well as the NIB records that are produced by the virtualization application.

In some embodiments, the control application can receive switching infrastructure data from the NIB. In response to this data, the control application may modify record(s) associated with one or more logical datapath sets (LDPS). Any such modified LDPS record would then be translated to one or more physical switching infrastructure records by the virtualization application, which might then be transferred to the physical switching infrastructure by the NOS.

To map the control application input to physical switching infrastructure attributes for storage in the NIB, the virtualization application of some embodiments uses a database table mapping engine to map input tables, which are created from (1) the control-application specified input tables, and (2) a set of properties associated with switching elements used by the system, to output tables. The content of these output tables are then transferred to the NIB elements.

Some embodiments use a variation of the datalog database language to allow application developers to create the table mapping engine for the virtualization application, and thereby to specify the manner by which the virtualization application maps logical datapath sets to the controlled physical switching infrastructure. This variation of the datalog database language is referred to below as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table-mapping rules engine that is referred to below as the nLog engine. The nLog mapping techniques of some embodiments are further described in U.S. patent application entitled "Network Virtualization Apparatus and Method," filed Jul. 6, 2011, with application Ser. No. 13/177,533, now issued as U.S. Pat. No. 8,817,620.

In some embodiments, the nLog virtualization engine provides feedback (e.g., from one or more of the output tables or from NIB records that are updated to reflect values stored in the output tables) to the user in order to provide the user with state information about the logical datapath set that he or she created. In this manner, the updates that the user gets are expressed in terms of the logical space that the user understands and not in terms of the underlying switching element states, which the user does not understand.

The use of nLog serves as a significant distinction between Type I virtualized control systems and Type II virtualized control systems, even for Type II systems that store user specified logical datapath sets in the NIB. This is because nLog provides a machine-generated rules engine that addresses the mapping between the logical and physical domains in a more robust, comprehensive manner than the hand-coded approach used for Type I virtualized control systems. In the Type I control systems, the application developers need to have a detailed understanding of the NIB structure and need to use this detailed understanding to write code that addresses all possible conditions that the control system would encounter at runtime. On the other hand, in Type II control systems, the application developers only need to produce applications that express the user-specified logical datapath sets in terms of one or more tables, which are then automatically mapped to output tables whose contents are in turn transferred to the NIB. This approach allows the Type II virtualized systems to forego maintaining the data regarding the logical datapath sets in the NIB. However, some embodiments maintain this data in the NIB in order to distribute this data among other NOS instances, as further described below.

In some embodiments, the system 500 propagates instructions to control a set of the switching elements 105a-105d through the control application 520, the virtualization application 525, and the NOS 110. Specifically, in some embodiment, the control application 520, the virtualization application 525, and the NOS 110 collectively translate and propagate control plane data through the three layers to a set of the switching elements 105a-105d.

The control application 520 of some embodiments has two logical planes that can be used to express the input to and output from this application. In some embodiments, the first logical plane is a logical control plane that includes a collection of higher-level constructs that allow the control application 520 and its users to define a logical plane for a logical switching element by specifying one or more logical datapath sets for a user. The second logical plane in some embodiments is the logical forwarding plane, which represents the logical datapath sets of the users in a format that can be processed by the virtualization application 525. In this manner, the two logical planes are logical space analogs of physical control and forwarding planes that are typically found in a typical managed switch.

In some embodiments, the control application 520 defines and exposes the logical control plane constructs with which the application itself or users of the application specifies different logical datapath sets. For instance, in some embodiments, the logical control plane data 520 includes the logical ACL table 545, the logical L2 table 535, and the logical L3 table 540. Some of this data can be specified by the user, while other such data are generated by the control application. In some embodiments, the control application 520 generates and/or specifies such data in response to certain changes to the NIB (which indicate changes to the switching elements 105a-105d and the managed datapath sets) that the control application 520 detects.

In some embodiments, the logical control plane data (i.e., the LDPS data 550 that is expressed in terms of the control plane constructs) can be initially specified without consideration of current operational data from the switching elements 105a-105d and without consideration of the manner by which this control plane data will be translated to physical control plane data. For instance, the logical control plane data might specify control data for one logical switch that connects five computers, even though this control plane data might later be translated to physical control data for three of the switching elements 105a-105d that implement the desired switching between the five computers.

The control application 520 of some embodiments includes a set of modules (not shown) for converting any logical datapath set within the logical control plane to a logical datapath set in the logical forwarding plane of the control application 520. Some embodiments may express the logical datapath set in the logical forwarding plane of the control application 520 as a set of forwarding tables (e.g., the L2 table 535 and L3 table 540). The conversion process of some embodiments includes the control application 520 populating logical datapath tables (e.g., logical forwarding tables) that are created by the virtualization application 525 with logical datapath sets. In some embodiments, the control application 520 uses an nLog table mapping engine to perform this conversion. The control application's use of the nLog table mapping engine to perform this conversion is further described in U.S. patent application entitled "Network Control Apparatus and Method," filed Jul. 6, 2011, with application Ser. No. 13/177,532, now issued as U.S. Pat. No. 8,743,888.

The virtualization application 525 of some embodiments also has two planes of data, a logical forwarding plane and a physical control plane. The logical forwarding plane is identical or similar to the logical forwarding plane produced by the control application 520. In some embodiments, the logical forwarding plane of the virtualization application 525 includes one or more logical datapath sets of one or more users. The logical forwarding plane of the virtualization application 525 in some embodiments includes logical forwarding data for one or more logical datapath sets of one or more users. Some of this data is pushed directly or indirectly to the logical forwarding plane of the virtualization application 525 by the control application 520, while other such data are pushed to the logical forwarding plane of the virtualization application 525 by the virtualization application 525 detecting events in the NIB.

The physical control plane of the virtualization application 525 includes one or more physical datapath sets of one or more users. Some embodiments of the virtualization application 525 include a set of modules (not shown) for converting any LDPS within the logical forwarding plane of the virtualization application 525 to a physical datapath set in the physical control plane of the virtualization application 525. In some embodiments, the virtualization application 525 uses the nLog table mapping engine to perform this conversion. The virtualization application 525 also includes a set of modules (not shown) for pushing the control plane data from the physical control plane of the virtualization application 525 into the NIB of the NOS 110.

From the NIB, the physical control plane data is later pushed into a set of the switching elements 105a-105d (e.g., switching elements 105a and 105c). In some embodiments, the physical control plane data is pushed to each of the set of the switching elements 105a-105d by the controller instance that is the master of the switching element. In some cases, the master controller instance of the switching element is the same controller instance that converted the logical control plane data to the logical forwarding plane data and the logical forwarding plane data to the physical control plane data. In other cases, the master controller instance of the switching element is not the same controller instance that converted the logical control plane data to the logical forwarding plane data and the logical forwarding plane data to the physical control plane data. The set of the switching elements 105a-105d then converts this physical control plane data to physical forwarding plane data that specifies the forwarding behavior of the set of the switching elements 105a-105d.

In some embodiments, the physical control plane data that is propagated to the set of the switching elements 105a-105d allows the set of the switching elements 105a-105d to perform the logical data processing on data packets that it processes in order to effectuate the processing of the logical datapath sets specified by the control application 520. In some such embodiments, physical control planes include control plane data for operating in the physical domain and control plane data for operating in the logical domain. In other words, the physical control planes of these embodiments include control plane data for processing network data (e.g., packets) through switching elements to implement physical switching and control plane data for processing network data through switching elements in order to implement the logical switching. In this manner, the physical control plane facilitates implementing logical switches across the switching elements. The use of the propagated physical control plane to implement logical data processing in the switching elements is further described in U.S. patent application entitled "Hierarchical Managed Switch Architecture," filed Jul. 6, 2011, with application Ser. No. 13/177,535, now issued as U.S. Pat. No. 8,750,164.

In addition to pushing physical control plane data to the NIB 115, the control and virtualization applications 520 and 525 also store logical control plane data and logical forwarding plane data in the NIB 115. These embodiments store such data in the NIB 115 for a variety of reasons. For instance, in some embodiments, the NIB 115 serves as a medium for communications between different controller instances, and the storage of such data in the NIB 115 facilitates the relaying of such data across different controller instances.

The NIB 115 in some embodiments serves as a hub for all communications among the control application 520, the virtualization application 525, and the NOS 110. For instance, the control application 520 may store in the NIB logical datapath sets in the logical forwarding plane that have been converted from logical datapath sets in the logical control plane. The virtualization application 525 may retrieve from the NIB the converted logical datapath sets in the logical forwarding plane and then convert the logical datapath sets to physical datapath sets in the physical control plane of the virtualization application 525. Thus, the NIB of some embodiments serves as a medium for communication between the different processing layers. Also, the NIB 115 in these embodiments stores logical control plane data and logical forwarding plane data as well as physical control plane data.

The above description describes a control data pipeline through three processing layers to a set of the switching elements 105a-105d. However, in some embodiments, the control data pipeline may have two processing layers instead of three with the upper layer being a single application that performs the functionalities of both the control application 520 and the virtualization application 525. For example, a single virtualization application (also called a network hypervisor) may replace these the control application 520 and the virtualization application 525 in some embodiments. In such embodiments, the control application 520 would form the front end of this network hypervisor, and would create and populate the logical datapath sets. The virtualization application 525 in these embodiments would form the back end of the network hypervisor, and would convert the logical datapath sets to physical datapath sets that are defined in the physical control plane.

In some embodiments, the different processing layers are implemented on a single computing device. Referring to FIG. 5 as an example, some such embodiments may execute the control application 520, and virtualization application 525, and the NOS 110 on a single computing device. However, some embodiments may execute the different processing layers on different computing devices. For instance, the control application 520, and virtualization application 525, and the NOS 110 may each be executed on separate computing devices. Other embodiments may execute any number of processing layers on any number of different computing devices.

C. Edge and Non-Edge Switch Controls

Figure 6:
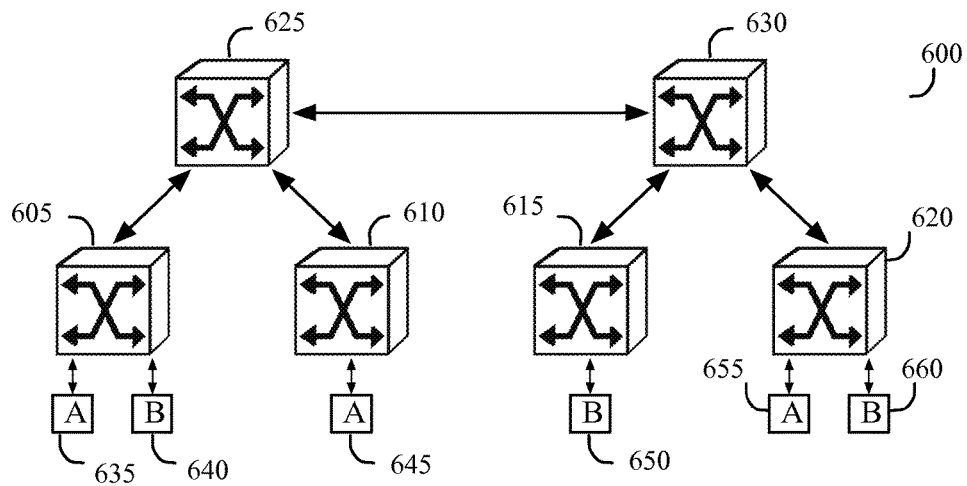
FIG. 6 conceptually illustrates the switch infrastructure of a multi-tenant server hosting system.
Figure 7:
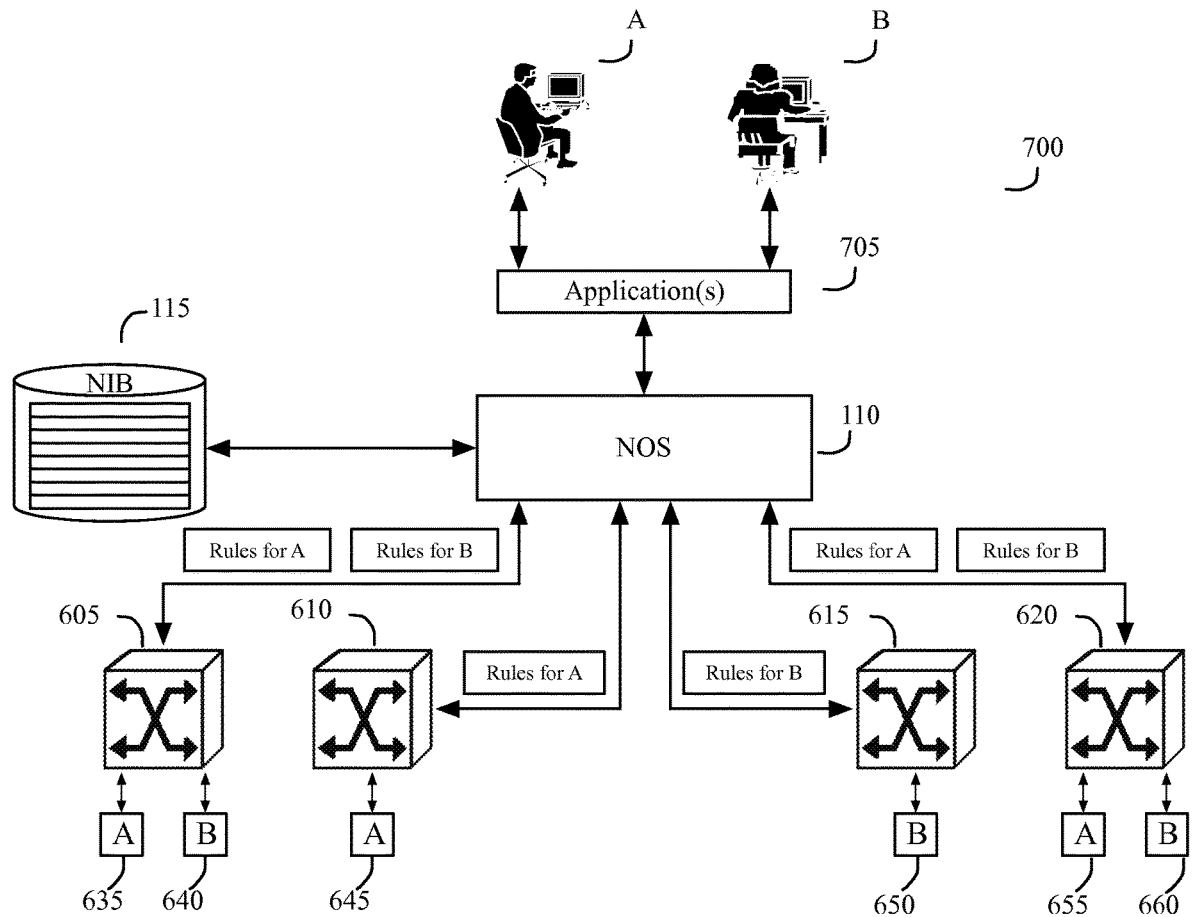
FIG. 7 conceptually illustrates a virtualized network control system of some embodiments that manages the edge switches.

As mentioned above, the NIB in some embodiments stores data regarding each switching element within the network infrastructure of a system, while in other embodiments, the NIB stores state information about only switching elements at the edge of a network infrastructure. FIGS. 6 and 7 illustrate an example that differentiates the two differing approaches. Specifically, FIG. 6 illustrates the switch infrastructure of a multi-tenant server hosting system. In this system, six switching elements are employed to interconnect six computing devices of two users A and B. Four of these switches 605-620 are edge switches that have direct connections with the computing devices 635-660 of the users A and B, while two of the switches 625 and 630 are interior switches (i.e., non-edge switches) that interconnect the edge switches and connect to each other.

FIG. 7 illustrates a virtualized network control system 700 that manages the edge switches 605-620. As shown in this figure, the system 700 includes a NOS 110 that creates and maintains a NIB 115, which contains data records regarding only the four edge switching elements 605-620. In addition, the applications 705 running on top of the NOS 110 allow the users A and B to modify their switch element configurations for the edge switches that they use. The NOS then propagates these modifications if needed to the edge switching elements. Specifically, in this example, two edge switches 605 and 620 are used by computing devices of both users A and B, while edge switch 610 is only used by the computing device 645 of the user A and edge switch 615 is only used by the computing device 650 of the user B. Accordingly, FIG. 7 illustrates the NOS modifying user A and user B records in switches 605 and 620, but only updating user A records in switch element 610 and user B records in switch element 615.

The system of some embodiments only controls edge switches (i.e., only maintains data in the NIB regarding edge switches) for several reasons. Controlling edge switches provides the system with a sufficient mechanism for maintaining isolation between computing devices, which is needed, as opposed to maintaining isolation between all switch elements, which is not needed. The interior switches forward between switching elements. The edge switches forward between computing devices and other network elements. Thus, the system can maintain user isolation simply by controlling the edge switch because the edge switch is the last switch in line to forward packets to a host.

Controlling only edge switches also allows the system to be deployed independent of concerns about the hardware vendor of the non-edge switches, because deploying at the edge allows the edge switches to treat the internal nodes of the network as simply a collection of elements that moves packets without considering the hardware makeup of these internal nodes. Also, controlling only edge switches makes distributing switching logic computationally easier. Controlling only edge switches also enables non-disruptive deployment of the system because edge-switching solutions can be added as top of rack switches without disrupting the configuration of the non-edge switches.

In addition to controlling edge switches, the network control system of some embodiments also utilizes and controls non-edge switches that are inserted in the switch network hierarchy to simplify and/or facilitate the operation of the controlled edge switches. For instance, in some embodiments, the control system requires the switches that it controls to be interconnected in a hierarchical switching architecture that has several edge switches as the leaf nodes in this switching architecture and one or more non-edge switches as the non-leaf nodes in this architecture. In some such embodiments, each edge switch connects to one or more of the non-leaf switches, and uses such non-leaf switches to facilitate its communication with other edge switches. Examples of functions that a non-leaf switch of some embodiments may provide to facilitate such communications between edge switches in some embodiments include (1) routing of a packet with an unknown destination address (e.g., unknown MAC address) to the non-leaf switch so that this switch can route this packet to the appropriate edge switch, (2) routing a multicast or broadcast packet to the non-leaf switch so that this switch can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switches that connect to edge switches and in some cases to other non-leaf switches. Other embodiments, on the other hand, employ multiple levels of non-leaf switches, with each level of non-leaf switch after the first level serving as a mechanism to facilitate communication between lower level non-leaf switches and leaf switches. In some embodiments, the non-leaf switches are software switches that are implemented by storing the switching tables in the memory of a standalone computer instead of an off-the-shelf switch. In some embodiments, the standalone computer may also be executing in some cases a hypervisor and one or more virtual machines on top of that hypervisor. Irrespective of the manner by which the leaf and non-leaf switches are implemented, the NIB of the control system of some embodiments stores switching state information regarding the leaf and non-leaf switches.

The above discussion relates to the control of edge switches and non-edge switches by a network control system of some embodiments. In some embodiments, edge switches and non-edge switches (leaf and non-leaf nodes) may be referred to as managed switches. This is because these switches are managed by the network control system (as opposed to unmanaged switches, which are not managed by the network control system, in the network) in order to implement logical datapath sets through the managed switches.

D. Secondary Storage Structure

In addition to using the NIB to store switching-element data, the virtualized network-control system of some embodiments also stores other storage structures to store data regarding the switching elements of the network. These other storage structures are secondary storage structures that supplement the storage functions of the NIB, which is the primary storage structure of the system while the system operates. In some embodiments, the primary purpose for one or more of the secondary storage structures is to back up the data in the NIB. In these or other embodiments, one or more of the secondary storage structures serves a purpose other than backing up the data in the NIB (e.g., for storing data that are not in the NIB).

In some embodiments, the NIB is stored in system memory (e.g., RAM) while the system operates. This allows for fast access of the NIB records. In some embodiments, one or more of the secondary storage structures, on the other hand, are stored on disk or other non-volatile memories that are slower to access. Such non-volatile disk or other storages, however, improve the resiliency of the system as they allow the data to be stored in a persistent manner.

Figure 8:
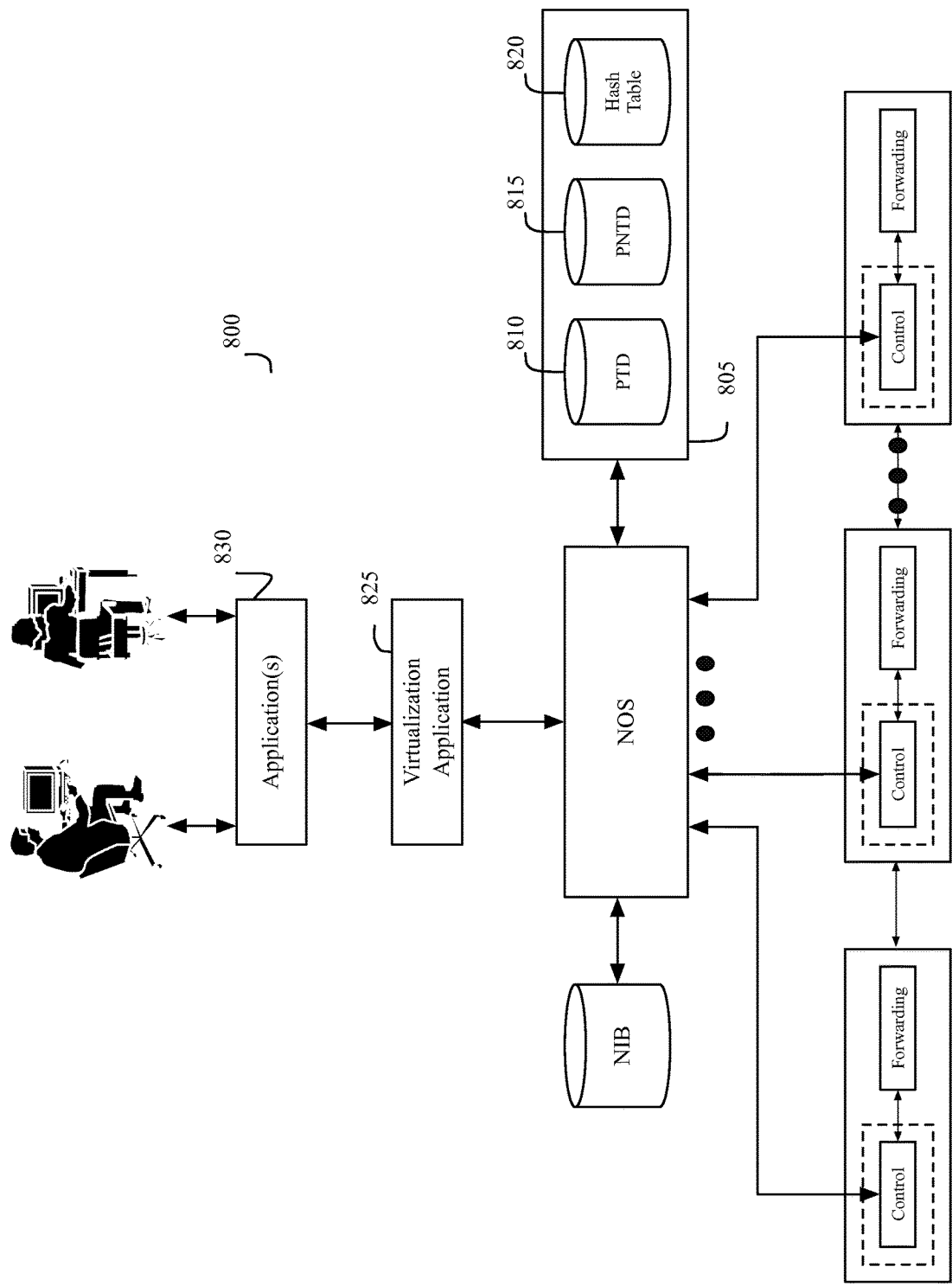
FIG. 8 conceptually illustrates a virtualized system of some embodiments that employs secondary storage structures that supplement storage operations of a NIB.

FIG. 8 illustrates an example of a virtualized system 800 that employs secondary storage structures that supplement the NIB's storage operations. This system is similar to the systems 400 and 500 of FIGS. 4 and 5, except that it also includes secondary storage structures 805. In this example, these structures include a persistent transactional database (PTD) 810, a persistent non-transactional database (PNTD) 815, and a hash table 820. In some embodiments, these three types of secondary storage structures store different types of data, store data in different manners, and/or provide different query interfaces that handle different types of queries.

In some embodiments, the PTD 810 is a database that is stored on disk or other non-volatile memory. In some embodiments, the PTD is a commonly available database, such as MySQL or SQLite. The PTD of some embodiments can handle complex transactional queries. As a transactional database, the PTD can undo a series of prior query operations that it has performed as part of a transaction when one of the subsequent query operations of the transaction fails. Moreover, some embodiments define a transactional guard processing (TGP) layer before the PTD in order to allow the PTD to execute conditional sets of database transactions. The TGP layer allows the PTD to avoid unnecessary later database operations when conditions of earlier operations are not met.

The PTD in some embodiments stores an exact replica of the data that is stored in the NIB, while in other embodiments it stores only a subset of the data that is stored in the NIB. Some or all of the data in the NIB is stored in the PTD in order to ensure that the NIB data will not be lost in the event of a crash of the NOS or the NIB.

The PNTD 815 is another persistent database that is stored on disk or other non-volatile memory. Some embodiments use this database to store data (e.g., statistics, computations, etc.) regarding one or more switch element attributes or operations. For instance, this database is used in some embodiments to store the number of packets routed through a particular port of a particular switching element. Other examples of types of data stored in the database 815 include error messages, log files, warning messages, and billing data. Also, in some embodiments, the PNTD stores the results of operations performed by the application(s) 830 running on top of the NOS, while the PTD and hash table store only values generated by the NOS.

The PNTD in some embodiments has a database query manager that can process database queries, but as it is not a transactional database, this query manager cannot handle complex conditional transactional queries. In some embodiments, accesses to the PNTD are faster than accesses to the PTD but slower than accesses to the hash table 820.

Unlike the databases 810 and 815, the hash table 820 is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that changes quickly. Examples of such quick-changing data include network entity status, statistics, state, uptime, link arrangement, and packet handling information. Furthermore, in some embodiments, the NOS uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table 820 is part of the NIB data structure.

The PTD and the PNTD improve the resiliency of the NOS system by preserving network data on hard disks. If a NOS system fails, network configuration data will be preserved on disk in the PTD and log file information will be preserved on disk in the PNTD.

E. Multi-Instance Control System

Using a single NOS instance to control a network can lead to scaling and reliability issues. As the number of network elements increases, the processing power and/or memory capacity that are required by those elements will saturate a single node. Some embodiments further improve the resiliency of the control system by having multiple instances of the NOS running on one or more computers, with each instance of the NOS containing one or more of the secondary storage structures described above. The control applications in some embodiments partition the workload between the different instances in order to reduce each instance's workload. Also, in some embodiments, the multiple instances of the NOS communicate the information stored in their storage layers to enable each instance of the NOS to cover for the others in the event of a NOS instance failing.

Figure 9:
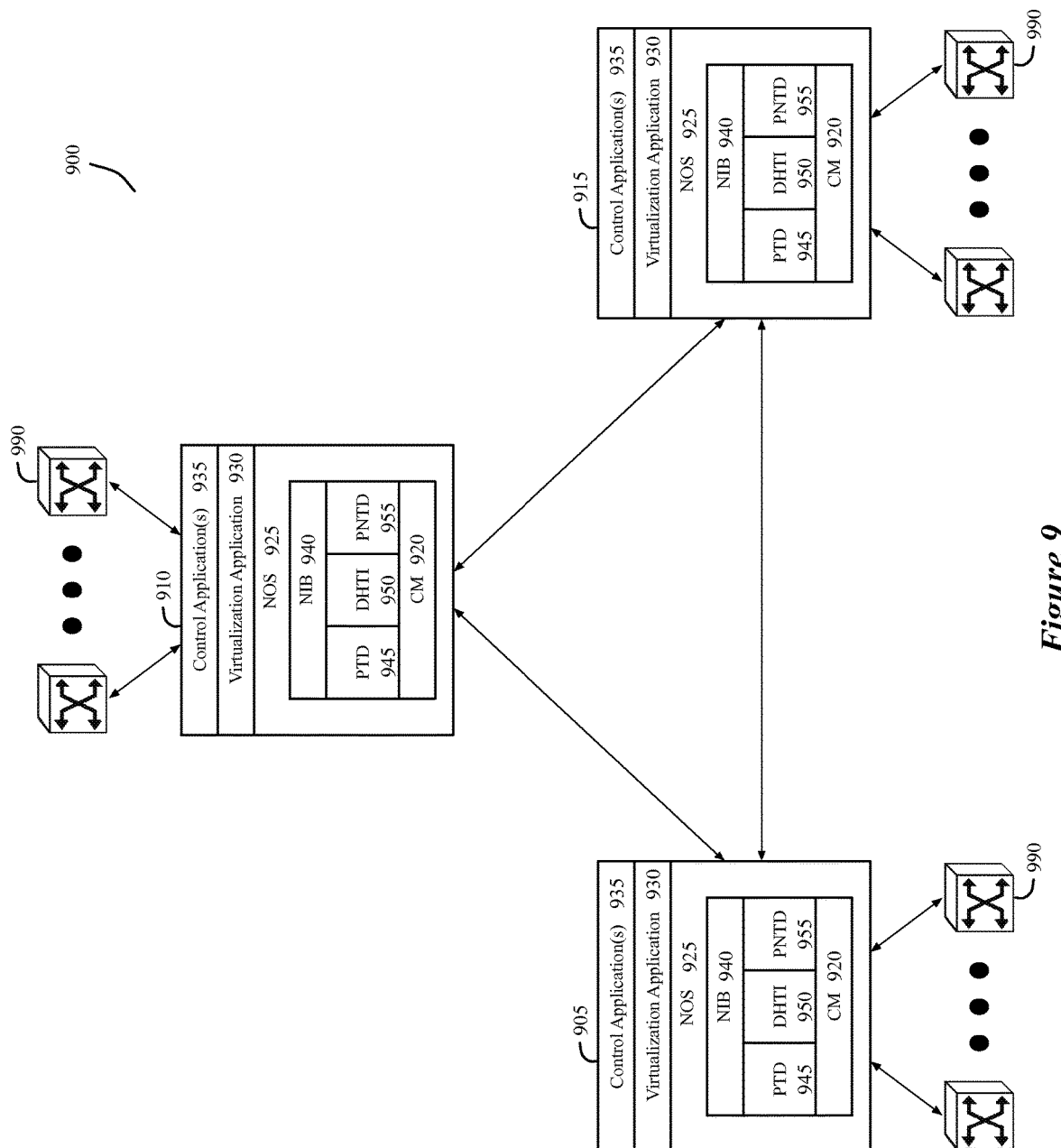
FIG. 9 conceptually illustrates a multi-instance, distributed network control system of some embodiments.

FIG. 9 illustrates a multi-instance, distributed network control system 900 of some embodiments. This distributed system controls multiple switching elements 990 with three instances 905, 910, and 915. In some embodiments, the distributed system 900 allows different controller instances to control the operations of the same switch or different switches.

As shown in FIG. 9, each instance includes a NOS 925, a virtualization application 930, one or more control applications 935, and a coordination manager (CM) 920. For the embodiments illustrated in this figure, each NOS in the system 900 is shown to include a NIB 940 and three secondary storage structures, i.e., a PTD 945, a distributed hash table (DHT) instance 950, and a persistent non-transaction database (PNTD) 955. Other embodiments may not tightly couple the NIB and/or each of the secondary storage structures within the NOS. Also, other embodiments might not include each of the three secondary storage structures (i.e., the PTD, DHT instance, and PNTD) in each instance 905, 910, or 915. For example, one NOS instance 905 may have all three data structures whereas another NOS instance may only have the DHT instance.

In some embodiments, the system 900 maintains the same switch element data records in the NIB of each instance, while in other embodiments, the system 900 allows NIBs of different instances to store different sets of switch element data records. FIGS. 10-12 illustrate three different approaches that different embodiments employ to maintain the NIB records. In each of these three examples, two instances 1005 and 1010 are used to manage several switching elements having numerous attributes that are stored collectively in the NIB instances. This collection of the switch element data in the NIB instances is referred to as the global NIB data structure 1015 in FIGS. 10-12.

FIG. 10 illustrates the approach of maintaining the entire global NIB data structure 1015 in each NOS instance 1005 and 1010. FIG. 11 illustrates an alternative approach of dividing the global NIB 1015 into two separate portions 1020 and 1025, and storing each of these portions in a different NOS instance (e.g., storing portion 1020 in controller instance 1005 while storing portion 1025 in controller instance 1010). FIG. 12 illustrates yet another alternative approach. In this example, the global NIB 1015 is divided into two separate, but overlapping portions 1030 and 1035, which are then stored separately by the two different instances (e.g., storing portion 1030 in controller instance 1005 while storing portion 1035 in controller instance 1010). In the systems of some embodiments that store different portions of the NIB in different instances, one controller instance is allowed to query another controller instance to obtain a NIB record. Other systems of such embodiments, however, do not allow one controller instance to query another controller instance for a portion of the NIB data that is not maintained by the controller itself. Still others allow such queries to be made, but allow restrictions to be specified that would restrict access to some or all portions of the NIB.

The system 900 of some embodiments also replicates each NIB record in each instance in the PTD 945 of that instance in order to maintain the records of the NIB in a persistent manner. Also, in some embodiments, the system 900 replicates each NIB record in the PTDs of all the controller instances 905, 910, or 915, in order to protect against failures of individual controller instances (e.g., of an entire controller instance or a portion of the controller instance). Other embodiments, however, do not replicate each NIB record in each PTD and/or do not replicate the PTD records across all the PTDs. For instance, some embodiments replicate only a part but not all of the NIB data records of one controller instance in the PTD storage layer of that controller instance, and then replicate only this replicated portion of the NIB in all of the NIBs and PTDs of all other controller instances. Some embodiments also store a subset of the NIB records in another one of the secondary storage records, such as the DHT instance 950.

In some embodiments, the DHT instances (DHTI) 950 of all controller instances collectively store one set of records that are indexed based on hashed indices for quick access. These records are distributed across the different controller instances to minimize the size of the records within each instance and to allow the size of the DHT to be increased by adding additional DHT instances. According to this scheme, one DHT record is not stored in each controller instance. In fact, in some embodiments, each DHT record is stored in at most one controller instance. To improve the system's resiliency, some embodiments, however, allow one DHT record to be stored in more than one controller instance, so that in case one DHT record is no longer accessible because of one instance failure, that DHT record can be accessed from another instance. Some embodiments store in the DHT only the type of data that can be quickly re-generated, and therefore do not allow for replication of records across different DHT instances or allow only a small amount of such records to be replicated.

The PNTD 955 is another distributed data structure of the system 900 of some embodiments. For example, in some embodiments, each instance's PNTD stores the records generated by the NOS 925 or applications 930 or 935 of that instance or another instance. Each instance's PNTD records can be locally accessed or remotely accessed by other controller instances whenever the controller instances need these records. This distributed nature of the PNTD allows the PNTD to be scalable as additional controller instances are added to the control system 900. In other words, addition of other controller instances increases the overall size of the PNTD storage layer.

The PNTD in some embodiments is replicated partially across different instances. In other embodiments, the PNTD is replicated fully across different instances. Also, in some embodiments, the PNTD 955 within each instance is accessible only by the application(s) that run on top of the NOS of that instance. In other embodiments, the NOS can also access (e.g., read and/or write) the PNTD 955. In yet other embodiments, the PNTD 955 of one instance is only accessible by the NOS of that instance.

By allowing different NOS instances to store the same or overlapping NIB records, and/or secondary storage structure records, the system improves its overall resiliency by guarding against the loss of data due to the failure of any NOS or secondary storage structure instance. In some embodiments, each of the three storages of the secondary storage layer uses a different distribution technique to improve the resiliency of a multiple NOS instance system. For instance, as mentioned above, the system 900 of some embodiments replicates the PTD across NOS instances so that every NOS has a full copy of the PTD to enable a failed NOS instance to quickly reload its PTD from another instance. In some embodiments, the system 900 distributes the PNTD with overlapping distributions of data across the NOS instances to reduce the damage of a failure. The system 900 in some embodiments also distributes the DHT fully or with minimal overlap across multiple controller instances in order to maintain the DHT instance within each instance small and to allow the size of the DHT to be increased by adding additional DHT instances.

For some or all of the communications between the distributed instances, the system 900 uses the CMs 920. The CM 920 in each instance allows the instance to coordinate certain activities with the other instances. Different embodiments use the CM to coordinate the different sets of activities between the instances. Examples of such activities include writing to the NIB, writing to the PTD, writing to the DHT, controlling the switching elements, facilitating intra-controller communication related to fault tolerance of controller instances, etc. Several more detailed examples of the operations of the CMs in some embodiments are further described below in Section III.B.

As mentioned above, different controller instances of the system 900 can control the operations of the same switching elements or different switching elements. By distributing the control of these operations over several instances, the system can more easily scale up to handle additional switching elements. Specifically, the system can distribute the management of different switching elements and/or different portions of the NIB to different NOS instances in order to enjoy the benefit of processing efficiencies that can be realized by using multiple NOS instances. In such a distributed system, each NOS instance can have a reduced number of switches or a reduce portion of the NIB under management, thereby reducing the number of computations each controller needs to perform to distribute flow entries across the switches and/or to manage the NIB. In other embodiments, the use of multiple NOS instances enables the creation of a scale-out network management system. The computation of how best to distribute network flow tables in large networks is a CPU intensive task. By splitting the processing over NOS instances, the system 900 can use a set of more numerous but less powerful computer systems to create a scale-out network management system capable of handling large networks.

As noted above, some embodiments use multiple NOS instance in order to scale a network control system. Different embodiments may utilize different methods to improve the scalability of a network control system. Three example of such methods include (1) partitioning, (2) aggregation, and (3) consistency and durability. For a first method, the network control system of some embodiments configures the NOS instances so that a particular controller instance maintains only a subset of the NIB in memory and up-to-date. Further, in some of these embodiments, a particular NOS instance has connections to only a subset of the network elements, and subsequently, can have less network events to process.

A second method for improving scalability of a network control system is referred to as aggregation. In some embodiments, aggregation involves the controller instances grouping NOS instances together into sets. All the NOS instances within a set have complete access to the NIB entities representing network entities connected to those NOS instances. The set of NOS instances then exports aggregated information about its subset of the NIB to other NOS instances (which are not included in the set of NOS instances)

Consistency and durability is a third method for improving scalability of a network control system. For this method, the controller instances of some embodiments are able to dictate the consistency requirements for the network state that they manage. In some embodiments, distributed locking and consistency algorithms are implemented for network state that requires strong consistency, and conflict detection and resolution algorithms are implemented for network state that does not require strong consistency (e.g., network state that is not guaranteed to be consistent). As mentioned above, the NOS of some embodiments provides two data stores that an application can use for network state with differing preferences for durability and consistency. The NOS of some embodiments provides a replicated transactional database for network state that favors durability and strong consistency, and provides a memory-based one-hop DHT for volatile network state that can sustain inconsistencies.

In some embodiments, the above methods for improving scalability can be used alone or in combination. They can also be used to manage networks too large to be controlled by a single NOS instance. These methods are described in further detail in U.S. patent application entitled "A Distributed Control Platform for Large-scale Production Networks," filed Jul. 6, 2011, with application Ser. No. 13/177,538, now issued as U.S. Pat. No. 8,830,823.

To distribute the workload and to avoid conflicting operations from different controller instances, the system 900 of some embodiments designates one controller instance (e.g., 905) within the system 900 as the master of any particular NIB portion and/or any given switching element (e.g., 990). Even with one master controller, different controller instance (e.g., 910 and 915) can request changes to different NIB portions and/or to different switching elements (e.g., 990) controlled by the master (e.g., 905). If allowed, the master instance then effectuates this change and writes to the desired NIB portion and/or switching element. Otherwise, the master rejects the request. More detailed examples of processing such requests are described below.

Figure 13:
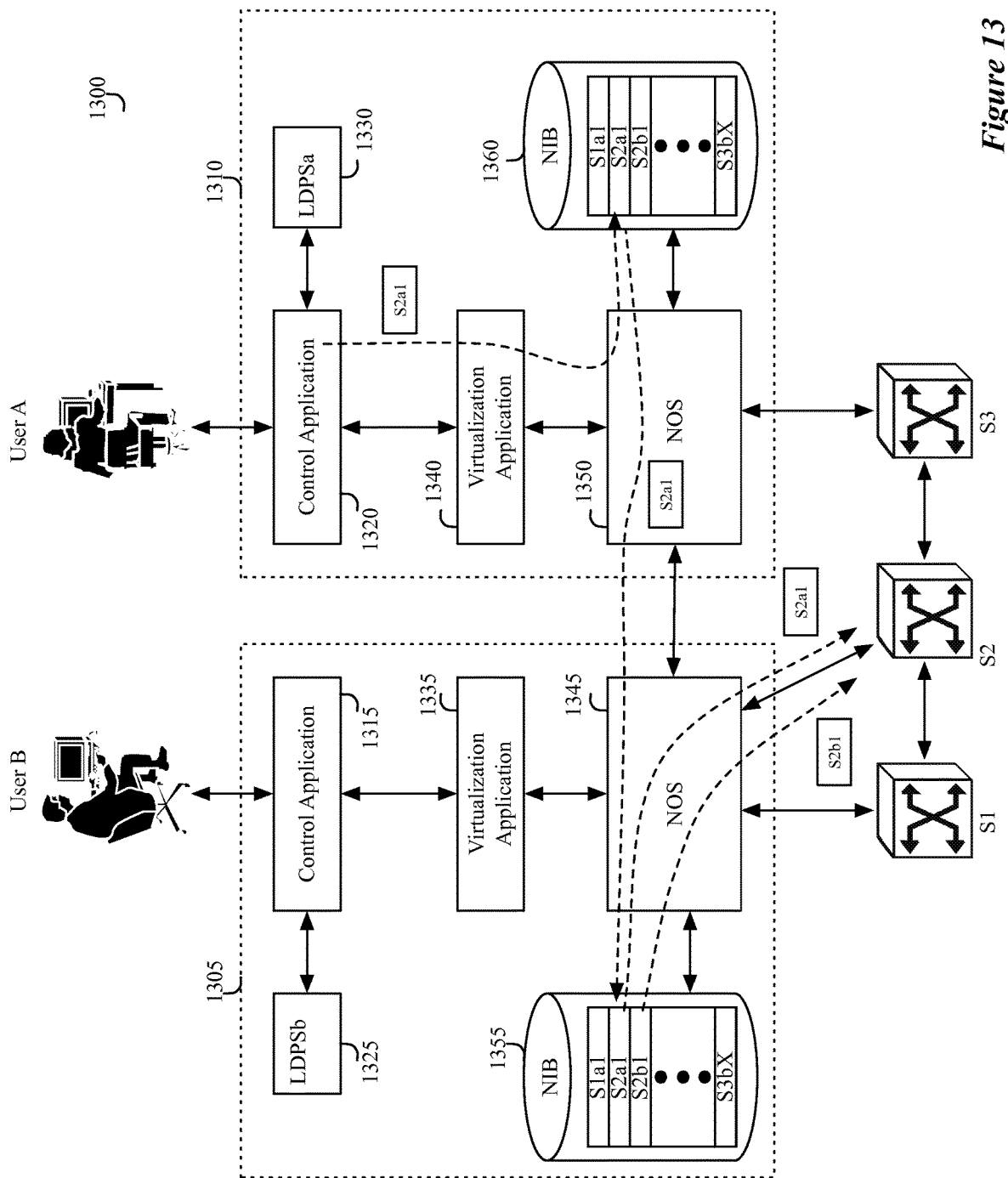
FIG. 13 illustrates an example of specifying a master controller instance for a switch in a distributed system according to some embodiments of the invention.

FIG. 13 illustrates an example of specifying a master controller instance for a switch in a distributed system 1300 that is similar to the system 900 of FIG. 9. In this example, two controllers 1305 and 1310 control three switching elements S1, S2 and S3, for two different users A and B. Through two control applications 1315 and 1320, the two users specify two different sets of logical datapaths 1325 and 1330, which are translated into numerous records that are identically stored in two NIBs 1355 and 1360 of the two controller instances 1305 and 1310 by NOS instances 1345 and 1350 of the controllers.

In the example illustrated in FIG. 13, both control applications 1315 and 1320 of both controllers 1305 and 1310 can modify records of the switching element S2 for both users A and B, but only controller 1305 is the master of this switching element. This example illustrates two cases. The first case involves the controller 1305 updating the record S2b1 in switching element S2 for the user B. The second case involves the controller 1305 updating the records S2a1 in switching element S2 after the control application 1320 updates a NIB record S2a1 for switching element S2 and user A in NIB 1360. In the example illustrated in FIG. 13, this update is routed from NIB 1360 of the controller 1310 to the NIB 1355 of the controller 1305, and then subsequently routed to switching element S2.

Different embodiments use different techniques to propagate changes from the NIB 1360 of controller instance 1310 to NIB 1355 of the controller instance 1305. For instance, to propagate changes, the system 1300 in some embodiments uses the secondary storage structures (not shown) of the controller instances 1305 and 1310. More generally, the distributed control system of some embodiments uses the secondary storage structures as communication channels between the different controller instances. Because of the differing properties of the secondary storage structures, these structures provide the controller instances with different mechanisms for communicating with each other. For instance, in some embodiments, different DHT instances can be different, and each DHT instance is used as a bulletin board for one or more instances to store data so that they or other instances can retrieve this data later. In some of these embodiments, the PTDs are replicated across all instances, and some or all of the NIB changes are pushed from one controller instance to another through the PTD storage layer. Accordingly, in the example illustrated in FIG. 13, the change to the NIB 1360 could be replicated to the PTD of the controller 1310, and from there it could be replicated in the PTD of the controller 1305 and the NIB 1355. Several examples of such DHT and PTD operations will be described below.

Instead of propagating the NIB changes through the secondary storages, the system 1300 uses other techniques to change the record S2a1 in the switch S2 in response to the request from control application 1320. For instance, to propagate this update, the NOS 1350 of the controller 1310 in some embodiments sends an update command to the NOS 1345 of the controller 1305 (with the requisite NIB update parameters that identify the record and one or more new values for the record) to direct the NOS 1345 to modify the record in the NIB 1355 or in the switch S2. In response, the NOS 1345 would make the changes to the NIB 1355 and the switch S2 (if such a change is allowed). After this change, the controller instance 1310 would change the corresponding record in its NIB 1360 once it receives notification (from controller 1305 or from another notification mechanism) that the record in the NIB 1355 and/or switch S2 has changed.

Other variations to the sequence of operations shown in FIG. 13 could exist because some embodiments designate one controller instance as a master of a portion of the NIB, in addition to designating a controller instance as a master of a switching element. In some embodiments, different controller instances can be masters of a switch and a corresponding record for that switch in the NIB, while other embodiments require the controller instance to be master of the switch and all records for that switch in the NIB.

In the embodiments where the system 1300 allows for the designation of masters for switching elements and NIB records, the example illustrated in FIG. 13 illustrates a case where the controller instance 1310 is the master of the NIB record S2a1, while the controller instance 1305 is the master for the switch S2. If a controller instance other than the controller instance 1305 and 1310 was the master of the NIB record S2a1, then the request for the NIB record modification from the control application 1320 would have to be propagated to this other controller instance. This other controller instance would then modify the NIB record and this modification would then cause the NIB 1355, the NIB 1360 and the switch S2 to update their records once the controller instances 1305 and 1310 are notified of this modification through any number of mechanisms that would propagate this modification to the controller instances 1305 and 1310.

In other embodiments, the controller instance 1305 might be the master of the NIB record S2a1, or the controller instance 1305 is the master of switch S2 and all the records for this NIB. In these embodiments, the request for the NIB record modification from the control application 1320 would have to be propagated the controller instance 1305, which would then modify the records in the NIB 1355 and the switch S2. Once this modification is made, the NIB 1360 would modify its record S2a1 once the controller instance 1310 is notified of this modification through any number of mechanisms that would propagate this modification to the controller instance 1310.

As mentioned above, different embodiments employ different techniques to facilitate communication between different controller instances. In addition, different embodiments implement the controller instances differently. For instance, in some embodiments, the stack of the control application(s) (e.g., 935 or 1315 in FIGS. 9 and 13), the virtualization application (e.g., 930 or 1335), and the NOS (e.g., 925 or 1345) are installed and run on a single computer. Also, in some embodiments, multiple controller instances can be installed and run in parallel on a single computer. In some embodiments, a controller instance can also have its stack of components divided amongst several computers. For example, within one instance, the control application (e.g., 935 or 1315) can be on a first physical or virtual computer, the virtualization application (e.g., 930 or 1335) can be on a second physical or virtual computer, and the NOS (e.g., 925 or 1345) can be on a third physical or virtual computer.

II. NIB

Figure 14:
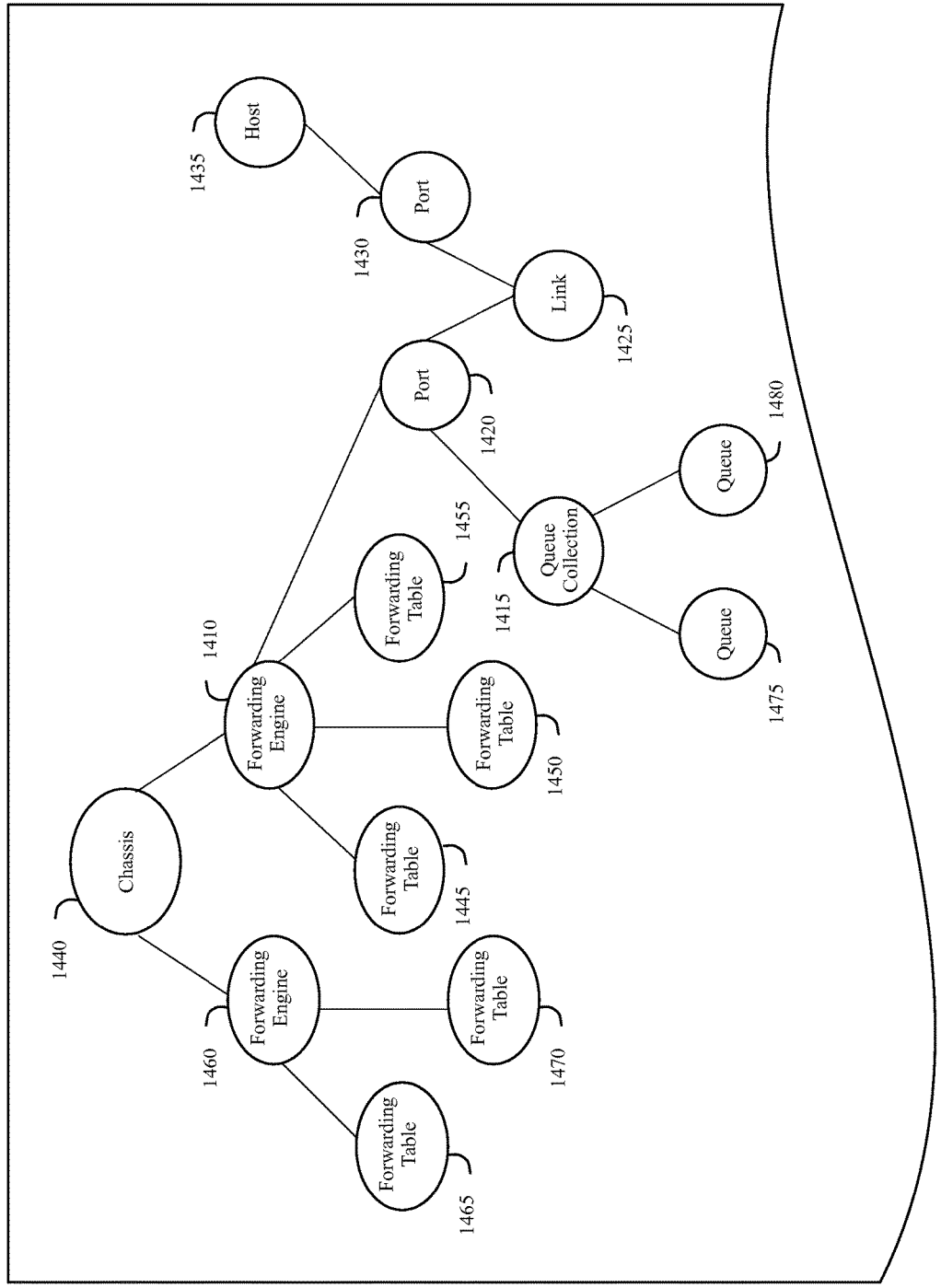
FIG. 14 conceptually illustrates a NIB storage structure of some embodiments.

FIG. 14 presents a conceptual illustration of a NIB storage structure of some embodiments of the invention. The control systems of some embodiments use a NIB 1400 in each controller instance to store network configuration data. The NIB 1400 stores the physical network configuration state (e.g. physical control plane data), and in some embodiments, the logical network configuration state (e.g., logical control plane data and logical forwarding plane data). The NIB 1400 stores this information in a hierarchical graph that corresponds to the network topology of the network under NOS management. NOS instances update the NIB data structure to reflect changes in the network under NOS management. In some embodiments, the NIB 1400 presents an API to higher-level applications or users that enables higher level applications or users to change NIB data. The NOS instance propagates changes to the NIB data structure made through the API to the network elements represented in the NIB 1400. The NIB serves as the heart of the NOS by reflecting current network state and allowing software-level control of that network state.

FIG. 14 conceptually illustrates an example NIB 1400 as a hierarchical tree structure. The NIB 1400 stores network data in object-oriented entity classes. The NIB 1400 illustration contains several circular objects and lines. The circular objects, such as Chassis 1440, represent entity objects stored in the NIB. The lines connecting the entity objects represent one object containing a pointer to another, signaling membership. The NIB entity objects shown in FIG. 14 comprise a chassis object 1440, two forwarding engine objects 1410 and 1460, five forwarding table objects 1465, 1470, 1445, 1450, and 1455, two port objects 1420 and 1430, a link object 1425, a queue collection object 1415, two queue objects 1475 and 1480, and a host object 1435. The entity objects are objects of network entity classes that correspond to physical network element types to be managed by network controller instances. The entity classes contain a plurality of attributes that store network data. In some embodiments, the attributes are network data such as status, addresses, statistics, and link state. The network entity classes will be described in more detail in conjunction with FIGS. 17, 18, and 19.

The NIB 1400 performs functions that compose the heart of the NOS for several reasons. First, the NIB functions as a data storage structure for storing network configuration state information. In some embodiments, the NIB contains only physical network configuration state information while in other embodiments the NIB contains logical network configuration state information as well.

Second, in some embodiments, the NIB functions as a communication medium between NOS instances. The NOS instances replicate the NIB to some degree, with different embodiments of the invention replicating the NIB to varying degrees. This degree of replication allows the NIB to serve as a communication medium between NOS instances. For example, changes to the forwarding engine object 1460 and the forwarding table objects 1465 and 1470 may be replicated amongst all NOS instances, thereby sharing that information between NOS instances.

Third, in some embodiments, the NIB functions as an interface to allow higher-level applications to configure the underlying network. The NOS propagates changes made to the NIB to the underlying network, thus allowing higher-level applications to control underlying network state using the NIB. For example, if a higher-level application changes the configuration of forwarding engine 1410, then the NOS instance with authority over the physical switch corresponding to forwarding engine 1410 will propagate any changes made to forwarding engine 1410 down to the physical switch represented by forwarding engine 1410.

Fourth, in some embodiments, the NIB functions as a view of the network topology that the NOS can present to higher-level applications, and in some embodiments, application users. The conceptualization of NIB 1400 shown in FIG. 14 can be presented as a view of the network to higher-level applications in some embodiments. For example, a first hop switch with a port that is linked to a port on a host can be represented in a NIB by the forwarding engine object 1410, the port object 1420, the link object 1425, the port object 1430, and the host object 1435.

For sake of simplicity, FIG. 14 presents the NIB 1400 as a single hierarchical tree structure. However, in some embodiments, the NIB 1400 has a more complicated structure than that. For instance, the NIB in some embodiments is a multi-layer hierarchical data structure, with each layer having a hierarchical structure and one or more elements (e.g., nodes) on each layer linked to one or more elements (e.g., nodes) on another layer. In some embodiments, the lowest layer elements correspond to the actual switching elements and their attributes, while each of the higher layer elements serve as abstractions of the actual switching elements and their attributes. As further described below, some of these higher layer elements are used in some embodiments to show different abstract switching elements and/or switching element attributes to different users in a virtualized control system. In other words, the NOS of some embodiments generates the multi-layer, hierarchical NIB data structure, and the NOS or an application that runs on top of the NOS shows different users different views of different parts of the hierarchical levels and/or layers, in order to provide the different users with virtualized access to the shared switching elements and network.

Figure 15:
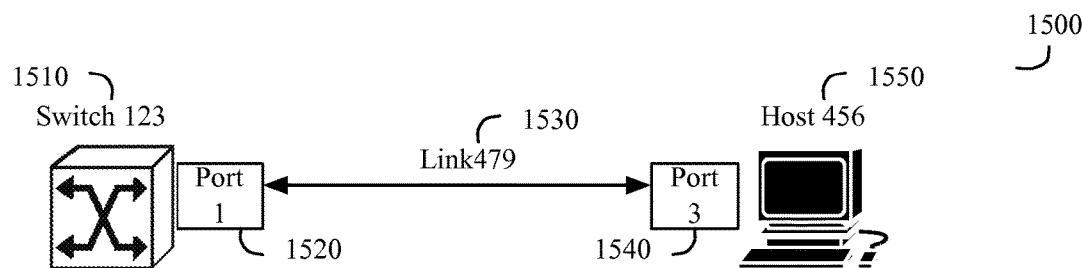
FIG. 15 conceptually illustrates a portion of a physical network that a NIB of some embodiments represents.

The operation of the NIB 1400 will now be discussed in conjunction with FIGS. 15 and 16. FIG. 15 illustrates a portion of a physical network 1500 that the NIB 1400 represents. The physical network 1500 comprises switch123 1510 that has port1 1520 connected to link479 1530 that connects to port3 1540 on host456 1550. The network elements of the network 1500 correspond to NIB objects in NIB 1400. Switch123 1510 corresponds to the forwarding engine 1410 in NIB 1400. Port1 1520 corresponds to the Port 1420 in NIB 1400. Link479 1530 corresponds to the Link 1425 in NIB 1400. Port3 1540 corresponds to the Port 1430 in NIB 1400. Host456 1550 corresponds to the host 1435 in NIB 1400. In this manner, the NIB 1400 can serve as a topology of the physical network 1500.

Figure 16:
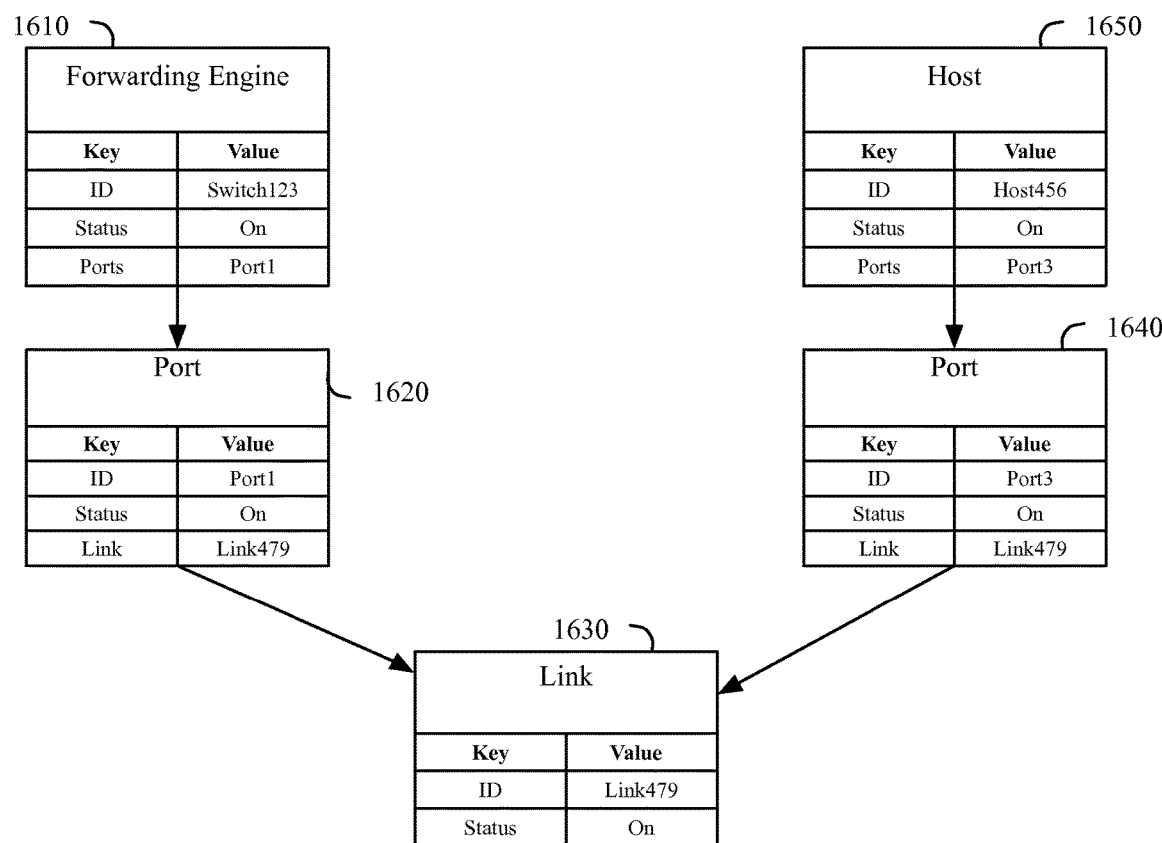
FIG. 16 conceptually illustrates attribute data that entity objects of a NIB contain according to some embodiments of the invention.

FIG. 16 illustrates a simplified example of the attribute data that the entity objects of the NIB 1400 can contain in some embodiments of the invention. The objects shown in FIG. 16 correspond to the physical elements illustrated in FIG. 15 and some of the entity objects of FIG. 14. FIG. 16 shows a forwarding engine 1610, a port 1620, a link 1630, a port 1640, and a host 1650. The NIB objects of FIG. 16 store information as key and value pairs where the keys are types of attributes and the values are network entity data. For example, forwarding engine 1610 contains the key "ID" that has the value "switch123" to identify the name of the forwarding engine. In this case, forwarding engine 1610 corresponds to switch123 1510. Some of the objects can contain pointers to other objects, as shown by the key "ports" and value "port1" of forwarding engine 1610. The value "port1" of forwarding engine 1610 corresponds to port1 1520 of the physical network 1500 and port 1420 of the NIB 1400. The port class may have more attributes, as will be shown in FIG. 18. In this simplified example, the forwarding engine 1610 has only 1 port; however, a forwarding engine may have many more ports.

Figure 17:
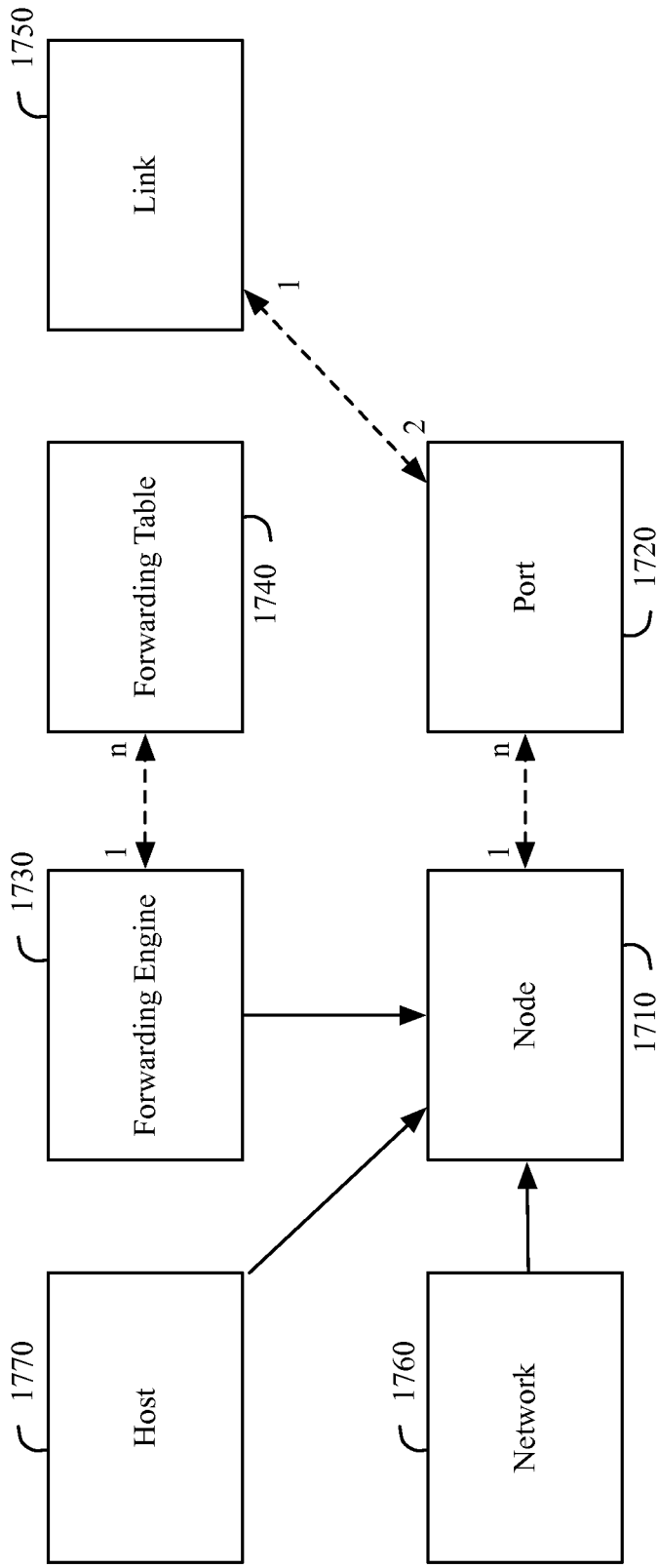
FIG. 17 conceptually illustrates relationships of several NIB entity classes of some embodiments.

FIG. 17 conceptually illustrates some of the relationships of some of the NIB entity classes of some embodiments. FIG. 17 illustrates the numerical relationships between several NIB entity classes for some embodiments of the invention. As shown in FIG. 17 by the dashed lines, one node 1710 may have N (where N is equal to or greater than 1) number of ports 1720. Two or more ports 1720 may share one link 1750.

FIG. 17 also illustrates how entity classes can inherit from other entity classes. As shown in FIG. 17 by the solid lined arrows, the host 1770, forwarding engine 1730, and network 1760 classes inherit from the node 1710 class. Classes that inherit from another class contain the attributes of the parent class, and may contain additional attributes in some embodiments.

Figure 18:
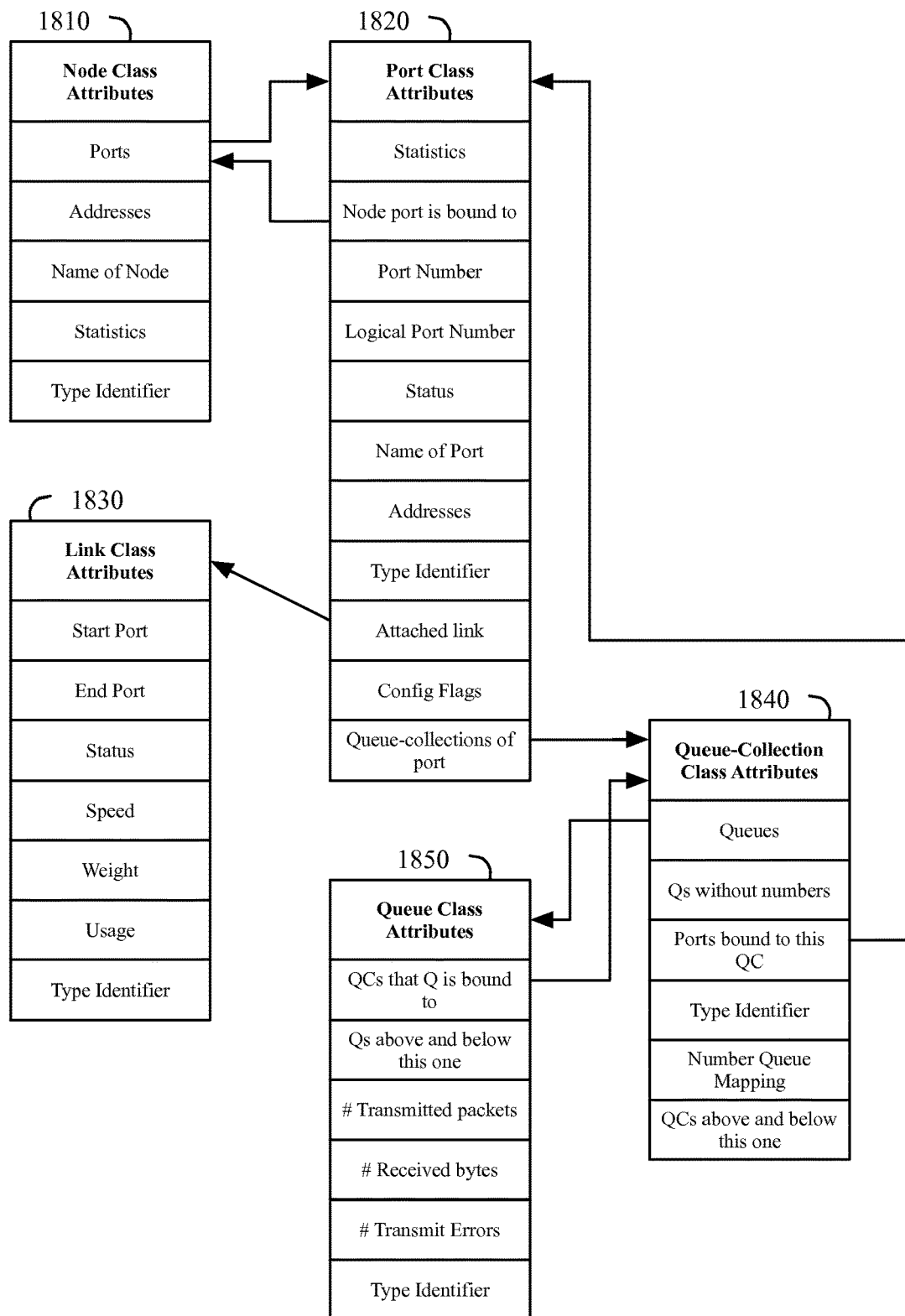
FIG. 18 conceptually illustrates a set of NIB entity classes of some embodiments and some of the attributes associated with those NIB entity classes.
Figure 19:
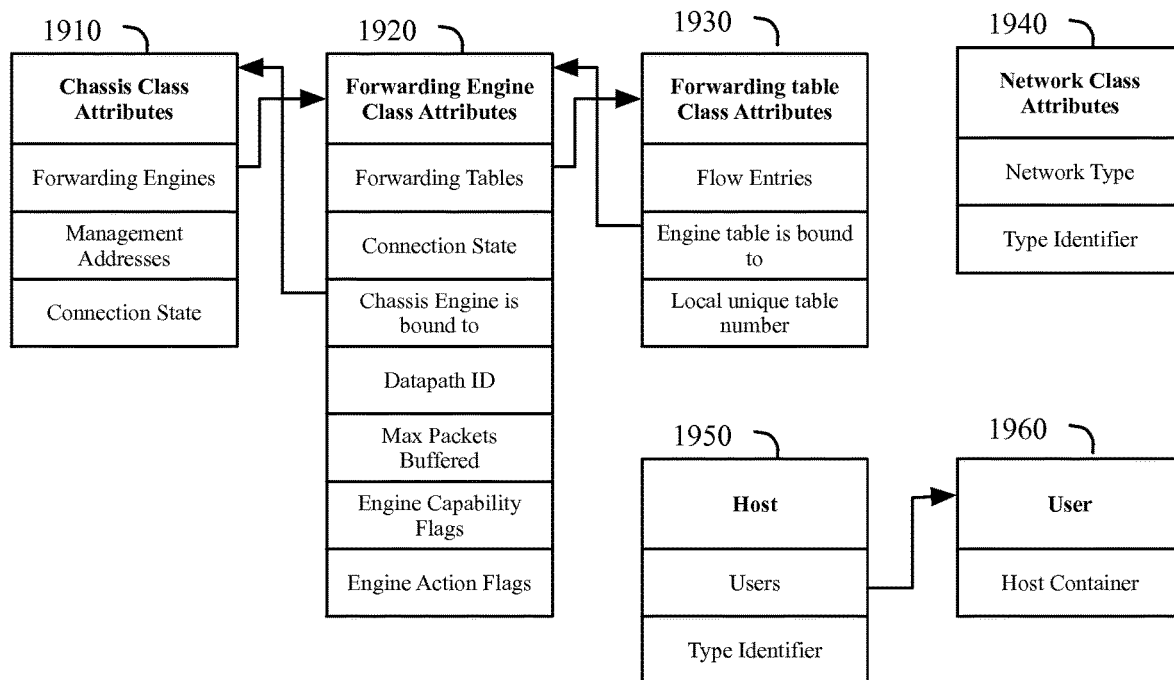
FIG. 19 conceptually illustrates another portion of the same set of NIB entity classes illustrated in FIG. 18 according to some embodiments of the invention.

FIG. 18 illustrates a set of NIB entity classes and some of the attributes associated with those NIB entity classes for some embodiments of the invention. FIG. 19 illustrates a second portion of the same set of NIB entity classes as FIG. 18. Together, the entity classes described in FIG. 18 and FIG. 19 enable a NOS instance to store a network's physical and logical configuration state in a NIB storage structure. FIG. 18 shows the node 1810, port 1820, link 1830, queue-collection 1840, and queue 1850 classes. The solid arrows between classes show that one class contains pointers to another class as an attribute. FIG. 19 shows the chassis 1910, forwarding engine 1920, forwarding table 1930, network 1940, host 1950, and user 1960 classes.

The attributes shown in FIGS. 18 and 19 are not the only attributes supportable by the invention. NOS users and NOS developers may extend this base set of network classes to support additional types of network elements. The NIB entity classes of some embodiments support inheritance and can be extended into new classes. For example, a virtual interface class representing a port between a hypervisor and a virtual machine can be inherited from the port class.

The node class 1810 represents a point on the network that network data can move between. Examples are physical or virtual switches and hosts. As described in FIG. 17, the forwarding engine 1920 (i.e., 1730), network 1940 (i.e., 1760), and host 1950 (i.e., 1770) classes are inherited from the node 1810 (i.e., 1710) class. Nodes can contain ports through which network data can enter and exit the node. Nodes also have addresses to represent their location on the network. While no node class is shown in NIB 1400, the host 1435 is inherited from the node class and can have a pointer to a port 1430 even though no ports are shown on the host class 1950 in FIG. 19.

The port class 1820 is the NIB analog to a port on a node. Ports are bound to nodes 1810. Ports have many statistics that are not shown in FIG. 18. The port statistics include the number of transmitted packets and bytes, the number of received packets and bytes, and the number and type of transmit errors. Ports may have one attached outgoing link and one attached incoming link acting as a start and an end port, respectively. Ports may be bound to queue-collections to enable quality of service functionality. As shown in NIB 1400, port 1430 has link 1425 attached and is a port of host 1435.

The link class 1830 is the NIB analog to links between ports. Network data moves across links. Links have statistics describing their speed, weight, and usage. A link may have one start port and one end port. Typically, a port's incoming and outgoing link are bound to the same link object, to enable a link to serve as a bi-directional communication point. This is shown by the a solid arrow going from the attached link of port class 1820 to the link class 1830.

The queue-collection class 1840 is the NIB analog to the set of 8 queues associated with the egress ports of industry standard top of rack switches. Queue-collections are groups of queues that can have ports bound to them. The queue-collection class enables network administrators to select one queue-collection to manage many ports, thereby placing a consistent quality of service policy across many ports. The queue class 1850 is the NIB analog to the queues attached to egress ports that schedule packets for processing. The queue class contains statistics and information regarding which queue-collection the queue is bound to. Additionally, the queue class has an attribute to describe the identity of the queues above and below the queue.

FIG. 19 illustrates another portion of the set of NIB entity classes described in FIG. 18. In addition, FIG. 19 illustrates the attributes associated with those NIB entity classes for some embodiments of the invention. FIG. 19 illustrates the following NIB entity classes: the chassis class 1910, the forwarding engine class 1920, the forwarding table class 1930, the network class 1940, the host class 1950, and the user class 1960. The solid arrows between classes show that one class contains pointers to another class as an attribute.

The chassis class 1910 is the NIB analog to a physical rack of switches. The chassis class contains a plurality of forwarding engines and addresses the chassis manages. The NIB 1400 has a chassis 1440 with pointers to forwarding engines 1460 and 1410. The forwarding engine class 1920 is the NIB analog to a network switch. The forwarding engine contains a set of forwarding tables that can define the forwarding behavior of a switch on the network. The NIB 1400 has a forwarding engine 1460 with two pointers to two forwarding tables 1465 and 1470. The forwarding engine also contains the datapath ID that a controller uses to communicate with the forwarding engine.

The forwarding table class 1930 is the NIB analog of the forwarding tables within switches that contain rules governing how packets will be forwarded. The forwarding table class 1930 contains flow entries to be propagated by NOS instances to the forwarding tables of network switches. The flow entries contained in the forwarding table class are the basic unit of network management. A flow entry contains a rule for deciding what to do with a unit of network information when that unit arrives in a node on the network. The forwarding table class further supports search functions to find matching flow entries on a forwarding table object.

The host class 1950 is the NIB analog to the physical computers of the network. Typical hosts often have many virtual machines contained within them. A host's virtual machines may belong to different users. The host class 1950 supports a list of users. The user class 1960 is the NIB analog to the owner of virtual machines on a host. The network class 1940 serves as a black box of network elements that behave in a similar fashion to a node. Packets enter a network and exit a network, but the NOS instances are not concerned with the internal workings of a network class object.

Figure 20:
FIG. 20 conceptually illustrates a set of common NIB class functions of some embodiments.

FIG. 20 shows a set of common NIB class functions 2000 for some embodiments of the invention. Applications, NOS instances, transfer modules, or in some embodiments, users can control the NIB through these common entity class functions. The common functions include: query, create, destroy, access attributes, register for notifications, synchronize, configure, and pull entity into the NIB. Below is a list of potential uses of these common functions by various actors. Different embodiments of the invention could have different actors using the common NIB functions on different NIB entity classes.

An application can query a NIB object to learn its status. A NOS instance can create a NIB entity to reflect a new element being added to the physical network. A user can destroy a logical datapath in some embodiments. A NOS instance can access the attributes of another NOS instance's NIB entities. A transfer module may register for notification for changes to the data of a NIB entity object. A NOS instance can issue a synchronize command to synchronize NIB entity object data with data gathered from the physical network. An application can issue a "pull entity into the NIB" command to compel a NOS instance to add a new entity object to the NIB.

III. Multi-Instance Architecture

Figure 21:
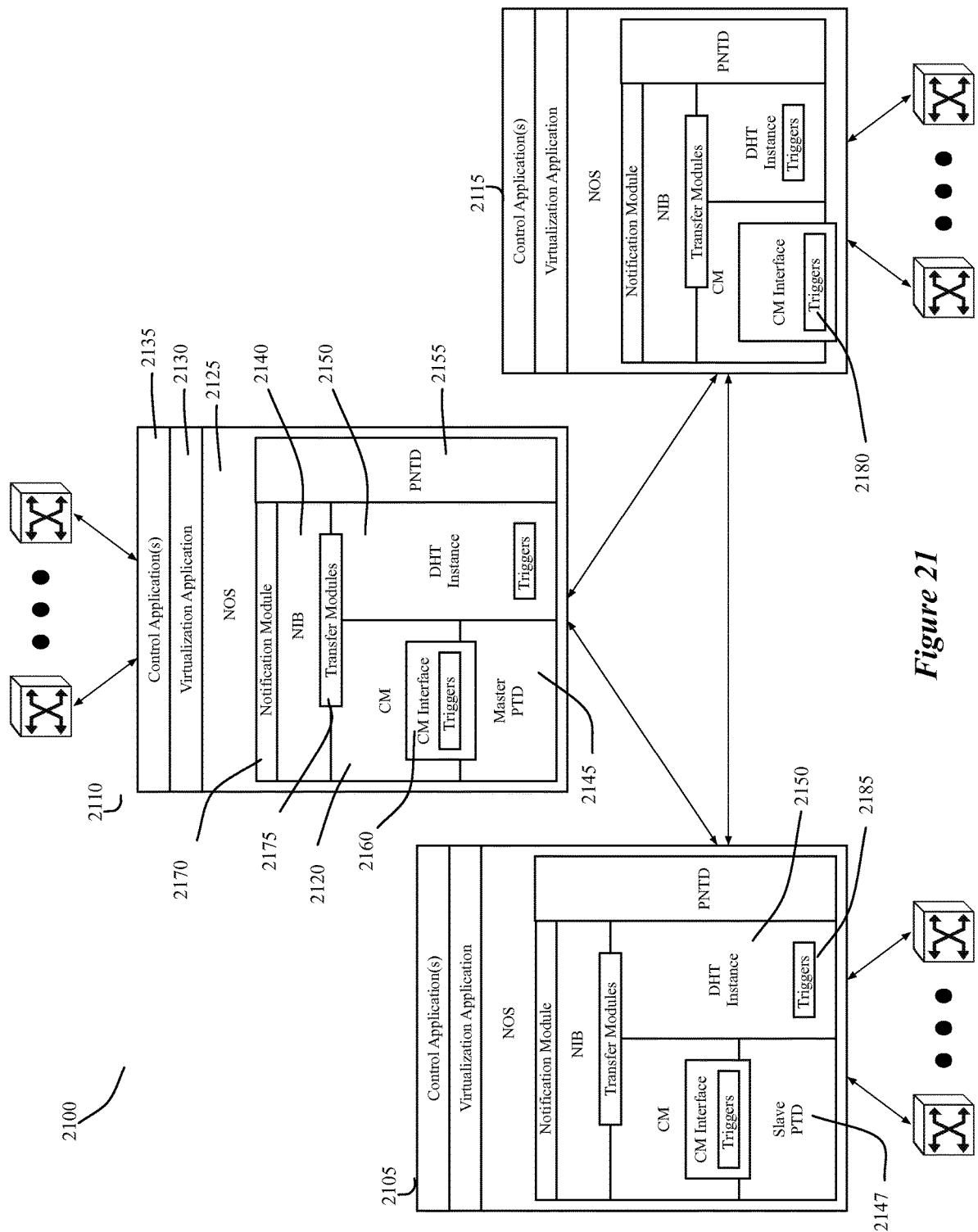
FIG. 21 conceptually illustrates a distributed network control system of some embodiments.

FIG. 21 illustrates a particular distributed network control system 2100 of some embodiments of the invention. In several manners, this control system 2100 is similar to the control system 900 of FIG. 9. For instance, it uses several different controller instances to control the operations of the same switching elements or different switching elements. In the example illustrated in FIG. 21, three instances 2105, 2110 and 2115 are illustrated. However, one of ordinary skill in the art will understand that the control system 2100 can have any number of controller instances.

Also, like the control system 900, each controller instance includes a NOS 2125, a virtualization application 2130, one or more control applications 2135, and a coordination manager (CM) 2120. Each NOS in the system 2100 includes a NIB 2140 and at least two secondary storage structures, e.g., a distributed hash table (DHT) 2150 and a PNTD 2155.

However, as illustrated in FIG. 21, the control system 2100 has several additional and/or different features than the control system 900. These features include a NIB notification module 2170, NIB transfer modules 2175, a CM interface 2160, PTD triggers 2180, DHT triggers 2185, and master/slave PTDs 2145/2147.

In some embodiments, the notification module 2170 in each controller instance allows applications (e.g., a control application) that run on top of the NOS to register for callbacks when changes occur within the NIB. This module in some embodiments has two components, which include a notification processor and a notification registry. The notification registry stores the list of applications that need to be notified for each NIB record that the module 2170 tracks, while the notification processor reviews the registry and processes the notifications upon detecting a change in a NIB record that it tracks. The notification module as well as its notification registry and notification processor are a conceptual representation of the NIB-application layer notification components of some embodiments, as the system of these embodiments provides a separate notification function and registry within each NIB object that can be tracked by the application layer.

The transfer modules 2175 include one or more modules that allow data to be exchanged between the NIB 2140 on one hand, and the PTD or DHT storage layers in each controller instance on the other hand. In some embodiments, the transfer modules 2175 include an import module for importing changes from the PTD/DHT storage layers into the NIB, and an export module for exporting changes in the NIB to the PTD/DHT storage layers. The use of these modules to propagate data between the NIB and PTD/DHT storage layers will be further described below.

Unlike the control system 900 that has the same type of PTD in each instance, the control system 2100 only has PTDs in some of the NOS instances, and of these PTDs, one of them serves as master PTD 2145, while the rest serve as slave PTDs 2147. In some embodiments, NIB changes within a controller instance that has a slave PTD are first propagated to the master PTD 2145, which then directs the controller instance's slave PTD to record the NIB changes. The master PTD 2145 similarly receives NIB changes from controller instances that do not have either master or slave PTDs. The use of the master PTDs in processing NIB changes will be further described below.

In the control system 2100, the coordination manager 2120 includes the CM interface 2160 to facilitate communication between the NIB storage layer and the PTD storage layer. The CM interface also maintains the PTD trigger list 2180, which identifies the modules of the system 2100 to call back whenever the CM interface 2160 is notified of a PTD record change. A similar trigger list 2185 for handling DHT callbacks is maintained by the DHT instance 2150. The CM 2120 also has a DHT range identifier (not shown) that allows the DHT instances of different controller instances to store different DHT records in different DHT instances. The operations that are performed through the CM, the CM interface, the PTD trigger list, and the DHT trigger list will be further described below.

Also, in the control system 2100, the PNTD is not placed underneath the NIB storage layer. This placement is to signify that the PNTD in the control system 2100 does not exchange data directly with the NIB storage layer, but rather is accessible solely by the application(s) (e.g., the control application) running on top of the NOS 2125 as well as other applications of other controller instances. This placement is in contrast to the placement of the PTD storage layer 2145/2147 and DHT storage layers 2150, which are shown to be underneath the NIB storage layer because the PTD and DHT are not directly accessible by the application(s) running on top of the NOS 2125. Rather, in the control system 2100, data are exchanged between the NIB storage layer and the PTD/DHT storage layers of the same or different instances.

The control system 2100 uses the PTD, DHT and PNTD storage layers to facilitate communication between the different controller instances. In some embodiments, each of the three storages of the secondary storage layer uses a different storage and distribution technique to improve the resiliency of the distributed, multi-instance system 2100. For instance, as further described below, the system 2100 of some embodiments replicates the PTD across NOS instances so that every NOS has a full copy of the PTD to enable a failed NOS instance to quickly reload its PTD from another instance. On the other hand, the system 2100 in some embodiments distributes the PNTD with partial overlapping distributions of data across the NOS instances to reduce the damage of a failure. Similarly, the system 2100 in some embodiments distributes the DHT fully or with minimal overlap across multiple controller instances in order to minimize the size of the DHT instance (e.g., the amount of memory the DHT instance utilizes) within each instance. Also, using this approach allows the system to increase the size of the DHT by adding additional DHT instances in order to make the system more scalable.

One of the advantages of this system is that it can be configured in any number of ways. In some embodiments, this system provides great flexibility to specify the configurations for the components of the system in order to customize its storage and data distribution scheme to achieve the best tradeoff of scalability and speed on one hand, and reliability and consistency on the other hand. Attributes of the storage structures that affect scalability, speed, reliability and consistency considerations include the speed of the storage (e.g., RAM versus disk access speed), the reliability of the storage (e.g., persistent non-volatile storage of disk versus volatile storage of RAM), the query interface of the storage (e.g., simple Put/Get query interface of DHT versus more robust transactional database queries of PTD in some embodiments), and the number of points of failure in the system (e.g., a single point of failure for a DHT record versus multiple points of failure for a PTD record in some embodiments).

Through the configurations of its components, the system can be configured to (1) distribute the data records between the NIB and the secondary storage structures within one instance (e.g., which secondary storage should store which NIB record), (2) distribute the data records between the NIBs of different instances (e.g., which NIB records should be replicated across different controller instances), (3) distribute the data records between the secondary storage structures within one instance (e.g., which secondary storage records contain which records), (4) distribute the data records between the secondary storage structures of different instances (e.g., which secondary storage records are replicated across different controller instances), (5) distribute secondary storage instances across controller instances (e.g., whether to put a PTD, a DHT, or a Stats database instance within each controller or whether to put different subsets of these storages within different instances), and (6) replicate data records in the distributed secondary storage structures (e.g., whether to replicated PTD fully across all instances, whether to replicate some or all DHT records across more than one instance, etc.). The system also allows the coordination between the different controller instances as to the master control over different switching elements or different portions of the NIB to be configured differently. In some embodiments, some or all of these configurations can be specified by applications (e.g., a control application or a virtualization application) that run on top of the NOS.

In some embodiments, as noted above, the CMs facilitate intra-controller communication related to fault tolerance of controller instances. For instance, the CMs implement the intra-controller communication through the secondary storage layers described above. A controller instance in the control system may fail due to any number of reasons (e.g., hardware failure, software failure, network failure, etc.). Different embodiments may use different techniques for determining whether a controller instance has failed. In some embodiments, Paxos protocol is used to determine whether a controller instance in the control system has failed. While some of these embodiments may use Apache Zookeeper to implement the Paxos protocol, other of these embodiments may implement Paxos protocol in other ways.

Some embodiments of the CM 2120 may utilize defined timeouts to determine whether a controller instance has failed. For instance, if a CM of a controller instance does not respond to a communication (e.g., sent from another CM of another controller instance in the control system) within an amount of time (i.e., a defined timeout amount), the non-responsive controller instance is determined to have failed. Other techniques may be utilized to determine whether a controller instance has failed in other embodiments.

When a controller instance fails, a new master for the logical datapath sets and the switching elements, of which the failed controller instance was a master, needs to be determined. Some embodiments of the CM 2120 make such determination by performing a master election process that elects a master controller instance (e.g., for partitioning management of logical datapath sets and/or partitioning management of switching elements). The CM 2120 of some embodiments may perform a master election process for electing a new master controller instance for both the logical datapath sets and the switching elements of which the failed controller instance was a master. However, the CM 2120 of other embodiments may perform (1) a master election process for electing a new master controller instance for the logical datapath sets of which the failed controller instance was a master and (2) another master election process for electing a new master controller instance for the switching elements of which the failed controller instance was a master. In these cases, the CM 2120 may determine two different controller instances as new controller instances: one for the logical datapath sets of which the failed controller instance was a master and another for the switching elements of which the failed controller instance was a master.

In some embodiments, the master election process is further for partitioning management of logical datapath sets and/or management of switching elements when a controller instance is added to the control system. In particular, some embodiments of the CM 2120 perform the master election process when the control system 2100 detects a change in membership of the controller instances in the control system 2100. For instance, the CM 2120 may perform the master election process to redistribute a portion of the management of the logical datapath sets and/or the management of the switching elements from the existing controller instances to the new controller instance when the control system 2100 detects that a new network controller has been added to the control system 2100. However, in other embodiments, redistribution of a portion of the management of the logical datapath sets and/or the management of the switching elements from the existing controller instances to the new controller instance does not occur when the control system 2100 detects that a new network controller has been added to the control system 2100. Instead, the control system 2100 in these embodiments assigns unassigned logical datapath sets and/or switching elements (e.g., new logical datapath sets and/or switching elements or logical datapath sets and/or switching elements from a failed network controller) to the new controller instance when the control system 2100 detects the unassigned logical datapath sets and/or switching elements have been added.

The control system's use of the PTD, DHT and PNTD storage layers to facilitate communication between the different controller instances will be described further in sub-section III.A below. This discussion will then be followed by a discussion of the operations of the CM 2120 in sub-section III.B. Section IV then describes the architecture of a single controller instance of the system 2100 in some embodiments.

A. Facilitating Communication in Distributed System

The distributed control system 2100 of some embodiments uses the secondary storage structures as communication channels between the different controller instances 2105, 2110, and 2115. The distributed control system of some embodiments makes such a use of the secondary storage structures because it provides a robust distributed logic, where often the rules for distributing a data record reside in the storage layer adjacent to the data record. This scheme is also advantageous as it modularizes the design of the different components of the distributed system. It also simplifies the addition of new controller instances in the system. It further allows some or all of the applications running on top of the NOS (e.g., the control application(s) and/or the virtualization application) within each instance to operate as an independent logical silo from the other controller instances, as the application does not need to know how the system distributes control over the switching elements.

Because of the differing properties of the secondary storage structures, the secondary storage structures provide the controller instances with different mechanisms for communicating with each other. For instance, the control system 2100 uses the PTD storage layer to push data between different controller instances, while it uses the DHT storage layer to enable different controller instances to post data and pull data from the DHT storages.

Specifically, in some embodiments, different DHT instances can be different, and each DHT instance is used as a bulletin board for one or more instances to store data so that they or other instances can retrieve this data later. In some embodiments, the DHT is a one-hop, eventually-consistent, memory-only DHT. A one-hop DHT, in some embodiments, is configured in a full mesh such that each DHT instance is connected to each other DHT instance. In this way, if a particular DHT instance does not have piece of data, the particular DHT instance can retrieve the piece of data from another DHT instance that is "one-hop" away instead of having to traverse multiple DHT instances in order to retrieve the piece of data. However, the system 2100 in some embodiments maintains the same switch element data records in the NIB of each instance, and replicates some or all of the NIB records in the PTDs 2145 and 2147 of the controller instances 2105 and 2110. By replicating the PTDs across all instances, the system 2100 pushes NIB changes from one controller instance to another through the PTD storage layer. Pushing the NIB changes through the PTD storage layer involves the use of the master PTD 2145.

While maintaining some of the NIB records in the PTD, the system 2100 in some embodiments maintains a portion of the NIB data in the DHT instance 2150. The DHT instance in some embodiments is a distributed storage structure that is stored in the volatile system memory with minimal replications to enable greater scalability. As discussed above, applications can configure the distribution of NIB data records between the PTD and the DHT. In some embodiments, the typical configuration distributes fast changing information (e.g., link state, statistics, entity status) to the DHT and slow changing information (e.g., existence node and port entities) to the PTD.

Performing NIB and PTD replication through the master PTD will be described in sub-section III.A.1 below. Sub-section III.A.2 will then describe distributing data among the controller instances through the DHT storage layer. Sub-section III.A.3 then describes distributing data among controller instances through the PNTD storage layer.

1. PTD Replication

In some embodiments, the system 2100 maintains the same switch element data records in the NIB of each instance. In the NIBs, the system 2100 stores physical network data and in some embodiments logical network data. The system 2100 of some embodiments stores some or all of the records of each instance's NIB in that instance's PTD. For instance, in some embodiments, the system 2100 stores in the PTDs slow changing network state data (e.g., network policy declarations, switching element inventories, other physical network element inventories, etc.) that needs to be stored in a more durable manner but does not need to be frequently updated.

Figure 22:
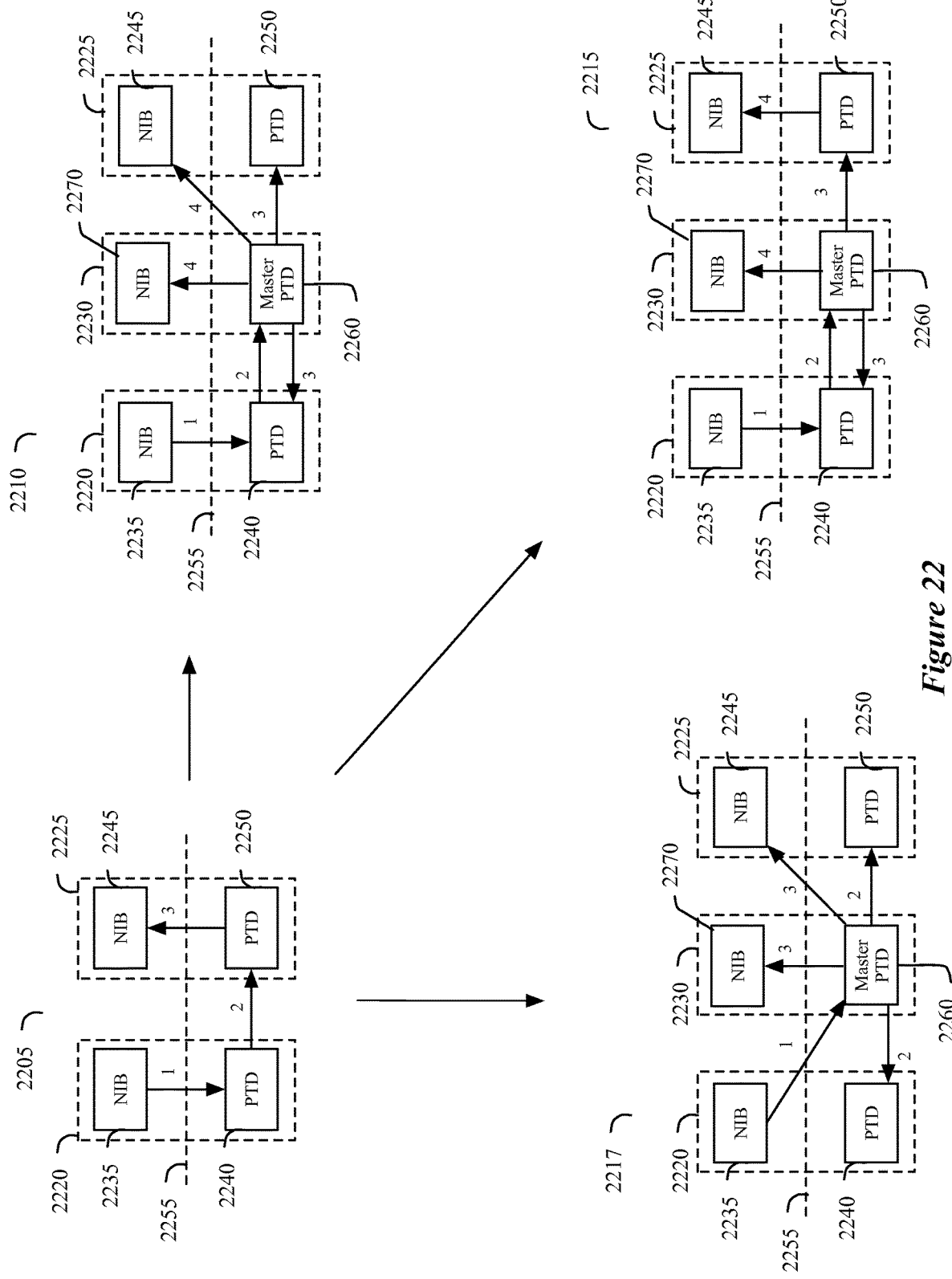
FIG. 22 conceptually illustrates pushing a NIB change through a PTD storage layer according to some embodiments of the invention.

By replicating the PTDs across all instances, the system 2100 pushes some or all of the NIB changes from one controller instance to another through the PTD storage layer. FIG. 22 illustrates pushing a NIB change through the PTD storage layer. Specifically, it shows four data flow diagrams, with (1) one diagram 2205 conceptually illustrating the propagation of a NIB change from a first controller 2220 to a second controller 2225 through the PTD storage layers of the two controllers, and (2) three diagrams 2210, 2215, and 2217 illustrating alternative uses of a master PTD 2260 of a third controller 2230 in performing this propagation. In this figure, the use of the CM 2120 and CM interface 2160 is ignored to simplify the description of this figure. However, the use of the CM 2120 and CM interface 2160 in performing the PTD replication will be further described below.

The flow diagram 2205 conceptually illustrates the propagation of a change in a NIB 2235 of the first controller 2220 to a NIB 2245 of the second controller 2225, through the PTDs 2240 and 2250 of these two controllers 2220 and 2225. In this diagram as well as the other three diagrams, the NIBs 2235 and 2245 are shown above a dashed line 2255 and the PTDs 2240 and 2250 are shown below the dashed line 2255 in order to convey that the NIBs are part of a NIB storage layer across all of the controller instances, while the PTDs are part of a PTD storage layer across all of the controller instances.

In the flow diagram 2205 as well as the other three diagrams, the flow of data between components is indicated by way of arrows and numbers, with each number indicating an order of an operation in the flow of data between the layers. Accordingly, the flow diagram 2205 shows that the change in the NIB 2235 is initially transferred to the PTD 2240 within the same controller instance 2220. This change is then pushed to the PTD 2250 of the second controller instance 2225. From there, the change is propagated to the NIB 2245 of the second controller instance 2225.

The flow diagram 2205 is illustrative of the sequence of operations that are performed to propagate a NIB change through the PTD storage layer. However, for the control system 2100 of some embodiments, the flow diagram 2205 simply illustrates the concept of propagating a NIB change through the PTD storage layer. It is not an illustration of the actual sequence of operations for propagating a NIB change in such a system, because the control system 2100 uses a master PTD 2145 as a single point of replication to ensure consistency across the PTD layers 2240, 2260, and 2250.

While ignoring the operations of the CM and CM interface, the flow diagram 2210 provides a more representative diagram of the sequence of operations for propagating a NIB change in the system 2100 for some embodiments of the invention. This diagram shows that in the system 2100 of some embodiments, the first controller's PTD 2240 pushes a NIB change that it receives from its NIB 2235 to a master PTD 2260, which may reside in another controller instance 2230, as illustrated in diagram 2210. The master PTD 2260 then directs each slave PTD 2240 and 2250 to update their records based on the received NIB change. In the embodiment illustrated in flow diagram 2210, the master PTD 2260 even notifies the PTD 2240 to update its records. In other words, the system of some embodiments does not make a NIB change in the PTD of the instance that originated the NIB change, without the direction of the master PTD 2260. In some embodiments, instead of the master PTD sending the changed PTD record to each slave PTD, the master PTD notifies the slave instances of the PTD change, and then the slave instances query the master PTD to pull the changed PTD record.

Once the slave PTDs 2240 and 2250 notify the master PTD 2260 that they have updated their records based on the NIB change, the master PTD directs all the NIBs (including the NIB 2245 of the second controller instance 2225 as well as a NIB 2270 of the third controller instance 2230) to modify their records in view of the NIB change that originated from controller instance 2220. The master PTD 2260 in some embodiments effectuates this modification through the CM interface and a NIB import module that interfaces with the CMI. This NIB import module is part of the NIB transfer module 2175 that also includes a NIB export module, which is the module used to propagate the NIB change from the NIB 2235 to the PTD 2240. In some embodiments, the master PTD notifies the NIB import module of the changed PTD record, and in response the NIB import module queries the master PTD for the changed record. In other embodiments, the master PTD sends to the NIB import module the changed PTD record along with its notification regarding the change to its record. The use of the CM interface, the NIB export module, and the NIB import module to effectuate NIB-to-NIB replication will be further described below.

The flow diagram 2215 presents an alternative data flow to the diagram 2210 for the NIB-to-NIB replication operations that involve the master PTD in some embodiments. The flow 2215 is identical to the flow 2210 except that in the flow 2215, the master PTD is only responsible for notifying its own NIB 2270 of the NIB change as it is not responsible for directing the NIB 2245 of the instance 2225 (or the NIB of any other slave instance) to make the desired NIB change. The NIB change is propagated in the diagram 2215 to the NIB 2245 through the PTD 2250 of the second instance. In different embodiments, the PTD 2250 uses different techniques to cause the NIB 2245 to change a record. In some embodiments, the PTD 2250 notifies the import module of NIB 2245 of the changed PTD record, and in response the NIB import module queries the PTD 2250 for the changed record. In other embodiments, the PTD 2250 sends to the import module of the NIB 2245 the changed PTD record along with its notification regarding the change to its record.

The flow diagram 2217 presents yet another alternative data flow to the diagrams 2210 and 2215 for the NIB-to-NIB replication operations that involve the master PTD in some embodiments. The flow 2217 is identical to the flow 2210 except that in the flow 2217, the slave NIB 2235 directly notifies the master PTD 2260 of the change to its NIB. In other words, the notification regarding the change in the NIB 2235 is not relayed through slave PTD 2240. Instead, the export module of the slave NIB 2235 directly notifies the master PTD 2260 (through the CM interface (not shown)). After being notified of this change, the master PTD 2260 in the flow 2217 first notifies the slave PTDs 2240 and 2250, and then notifies the slave NIB 2245 and its own NIB 2270, as in the flow diagram 2210.

The control systems of other embodiments use still other alternative flows to those illustrated in diagrams 2210, 2215 and 2217. For instance, another flow involves the same sequence of operations as illustrated in diagrams 2210 and 2215, except that the PTD 2240 of the instance 2220 records the NIB change before the master PTD is notified of this change. In this approach, the master PTD would not have to direct the PTD 2240 to modify its records based on the received NIB change. The master PTD would only have to notify the other slave PTDs of the change under this approach.

Other control systems of other embodiments use still other flows to those illustrated in diagrams 2210, 2215, and 2217. For instance, in some systems that do not use master PTDs, the flow illustrated in diagram 2205 is used to replicate a NIB change across instances. Yet another flow that such systems use in some embodiments would be similar to the flow illustrated in the diagram 2205, except that the PTD 2240 would be the component that notifies the NIB 2245 of the NIB change after the PTD 2240 notifies the PTD 2250 of the NIB change.

2. DHT Access

In the control system 2100 of some embodiments, the DHT instances 2150 of all controller instances collectively store one set of records that are indexed based on hashed indices for quick access. These records are distributed across the different controller instances to minimize the size of the records within each instance and to allow for the size of the DHT to be increased by adding additional DHT instances. According to this scheme, one DHT record is not stored in each controller instance. In fact, in some embodiments, each DHT record is stored in at most one controller instance. To improve the system's resiliency, some embodiments, however, allow one DHT record to be stored in more than one controller instance, so that in case one DHT record is no longer accessible because of one instance failure, that DHT record can be accessed from another instance. The system of some embodiments stores in the DHT rapidly changing network state that is more transient in nature. This type of data often can be quickly re-generated. Accordingly, some of these embodiments do not allow for replication of records across different DHT instances or only allow a small amount of such records to be replicated. In some embodiments, rapidly changing NIB data is stored in the DHT to take advantage of the DHT's aforementioned properties.

Because the system of these embodiments does not replicate DHT records across all DHT instances, it needs to have a mechanism for identifying the location (or the primary location in case of a DHT record that is stored within more than one DHT) of a DHT record. The CM 2120 provides such a mechanism in some embodiments of the invention. Specifically, as further described below, the CM 2120 of some embodiments maintains a hash value range list that allows the DHT instances of different controller instances to store different DHT records in different DHT instances.

Figure 23:
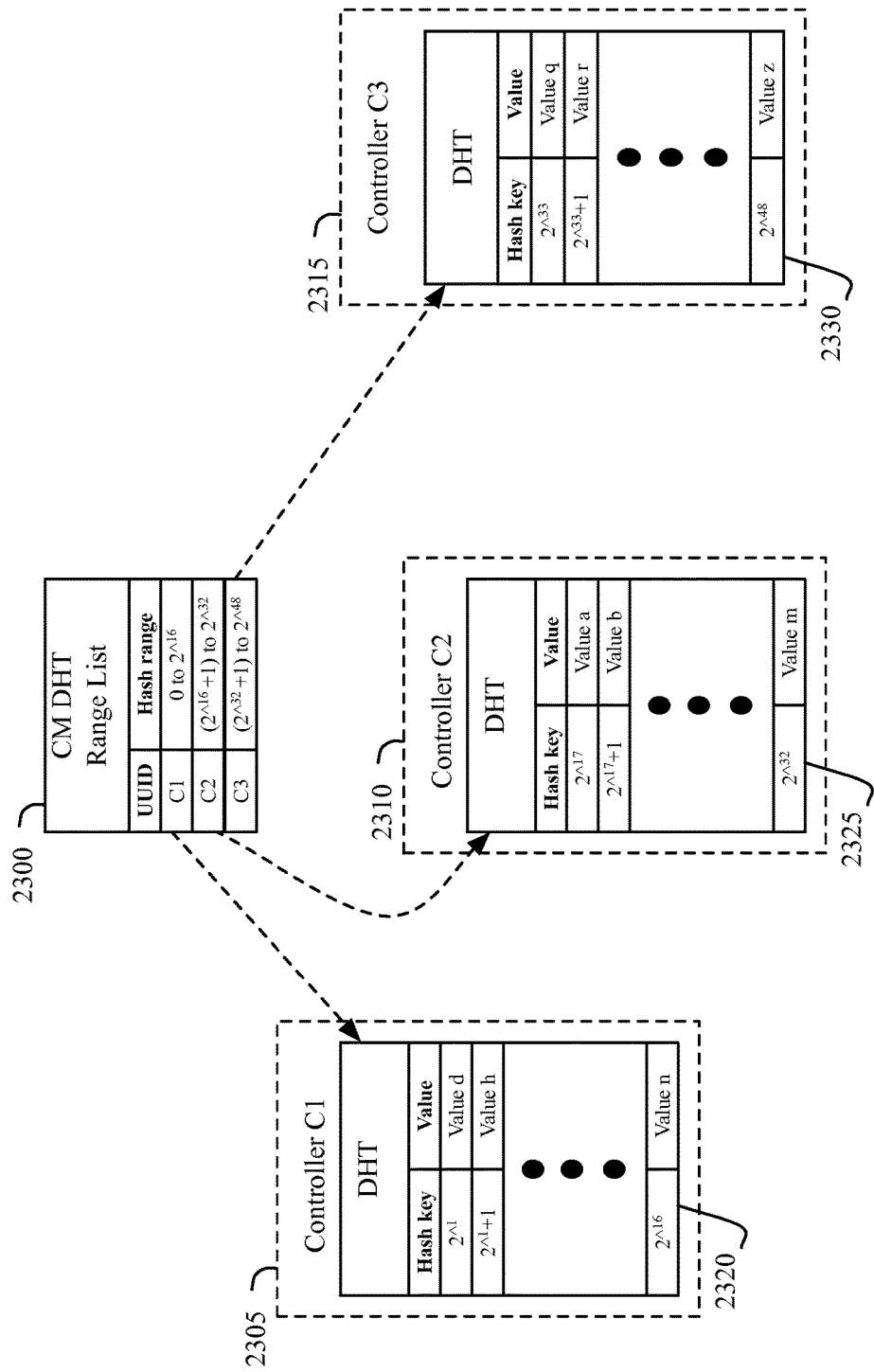
FIG. 23 illustrates a range list that is maintained by a CM of some embodiments.

FIG. 23 illustrates an example of such a range list 2300 that is maintained by the CM in some embodiments. In this example, three DHT instances 2320, 2325, and 2330 operate within three controller instances 2305, 2310, and 2315. Each DHT instance in this example includes $2^{16}$ records. Each DHT record can store one or more values, although FIG. 23 only shows one value being stored in each record. Also, each DHT record is identifiable by a particular hash index. The hash indices in this example start from 0 and end with $2^{48}$.

FIG. 23 further illustrates that the range list 2300 identifies the range of hash values associated with each controller instance (by the universal unique identifier (UUID) of that controller). In some embodiments, this list is generated and maintained by one or more CMs of one or more controller instances. In each controller, the DHT instance then accesses the CM of that instance to identify the appropriate DHT instance for a particular DHT record. That instance's CM can maintain the range list locally or might access another CM to obtain the identification from the range list. Alternatively, in some embodiments, the range list is maintained by each DHT instance or by a non-CM module within each controller instance.

Figure 24:
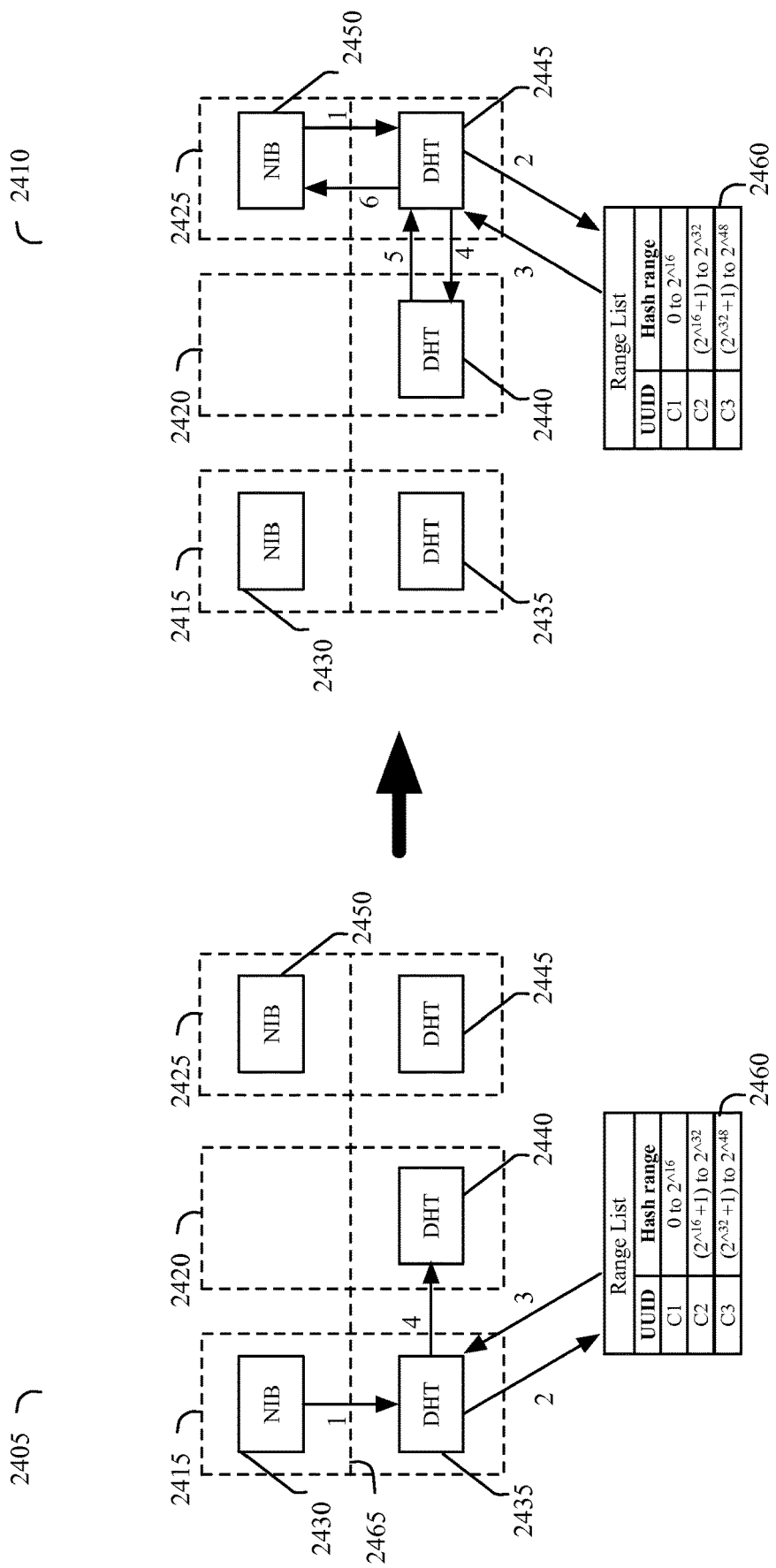
FIG. 24 conceptually illustrates a DHT-identification operation of a CM of some embodiments.

FIG. 24 presents an example that conceptually illustrates the DHT-identification operation of the CM 2120 in some embodiments of the invention. To illustrate this example, it shows two data flow diagrams, with (1) one diagram 2405 conceptually illustrating the use of a CM 2120 by one DHT instance 2435 of a first controller 2415 to modify a record in another DHT instance 2440 of a second controller 2420, and (2) the other diagram 2410 conceptually illustrating the use of the CM 2120 by another DHT instance 2445 of a third controller 2425 to read the modified record in the DHT instance 2440 of the second controller 2420. In this figure, the use of the CM 2120 in generating, maintaining, and propagating the DHT record range list is ignored to simplify the description of this figure. The use of the CM 2120 in performing these operations will be further described below.

In FIG. 24, the flow diagram 2405 conceptually illustrates the propagation of a change in a NIB 2430 of the first controller 2415 to the DHT instance 2440 of the second controller 2420, through the DHT instance 2435 of first controller 2415. In this diagram as well as the other diagram 2410, the NIBs 2430 and 2450 are shown above a dashed line 2465 and the DHT instances 2435, 2440, and 2445 are shown below the dashed line 2465 in order to convey that the NIBs are part of a NIB storage layer across all of the controller instances, while the DHT instances are part of a DHT storage layer across all of the controller instances. Also, in the flow diagram 2405 as well as the other diagram 2410, the flow of data between components is indicated by way of arrows and numbers, with each number indicating an order of operation in the flow of data between the layers.

The flow diagram 2405 shows that the change in the NIB 2430 is initially transferred to the DHT instance 2435 within the same controller instance 2415. The DHT instance does not necessarily change the records that it keeps because the DHT instance 2435 might not store a DHT record that corresponds to the changed NIB record for which it receives the notification from NIB 2430. Hence, in response to the NIB change notification that it receives, the DHT instance checks the hash value range list 2460 to identify the DHT instance that stores the DHT-layer record that corresponds to the modified NIB record. To identify this DHT instance, the DHT instance 2435 uses a hash index for the DHT record that it needs to locate. In some embodiments, the DHT instance 2435 generates this hash value when it receives the NIB change notification from the NIB 2430.

Based on the hash index, the DHT instance 2435 obtains the identity of DHT instance 2440 from the DHT range list 2460. The DHT instance 2435 then directs the DHT instance 2440 to modify its DHT record to reflect the received NIB change. In some embodiments, the DHT instance 2435 directs the DHT instance 2440 to modify its records, by supplying the DHT instance 2440 with a Put command, which supplies the DHT instance 2440 with a key, a hash value based on the key, and a value to store along with the hash value. The DHT instance 2440 then modifies its DHT records based on the request that it receives from the DHT instance 2435.

The flow diagram 2410 shows the NIB 2450 of the third controller instance 2425 pulling from DHT instance 2440 the record that was created at the end of the flow illustrated in diagram 2405. Specifically, it shows the DHT instance 2445 of the third controller instance 2425 receiving a DHT record request from its corresponding NIB 2450. The NIB 2450 might need to pull a DHT record for a variety of reasons. For instance, when the NIB creates a new node for a new port, it might need to obtain some statistics regarding the port to populate its NIB records.

In response to the received DHT record request, the DHT instance 2445 checks the hash value range list 2460 to identify the DHT instance that stores the requested DHT record. To identify this DHT instance, the DHT instance 2445 uses a hash index for the DHT record that it needs to locate. In some embodiments, the DHT instance 2445 generates this hash value when it receives the request from the NIB 2450.

Based on the hash index, the DHT instance 2445 obtains the identity of DHT instance 2440 from the DHT range list 2460. The DHT instance 2445 then directs the DHT instance 2440 to provide the requested DHT record. In some embodiments, the DHT instance 2445 directs the DHT instance 2440 for the requested record, by supplying the DHT instance 2440 with a Get command, which supplies the DHT instance 2440 with a key and/or a hash value based on the key. The DHT instance 2440 then supplies the value stored in the specified DHT record to the DHT instance 2445, which, in turn, supplies this value to the NIB 2450.

3. PNTD

Figure 26:
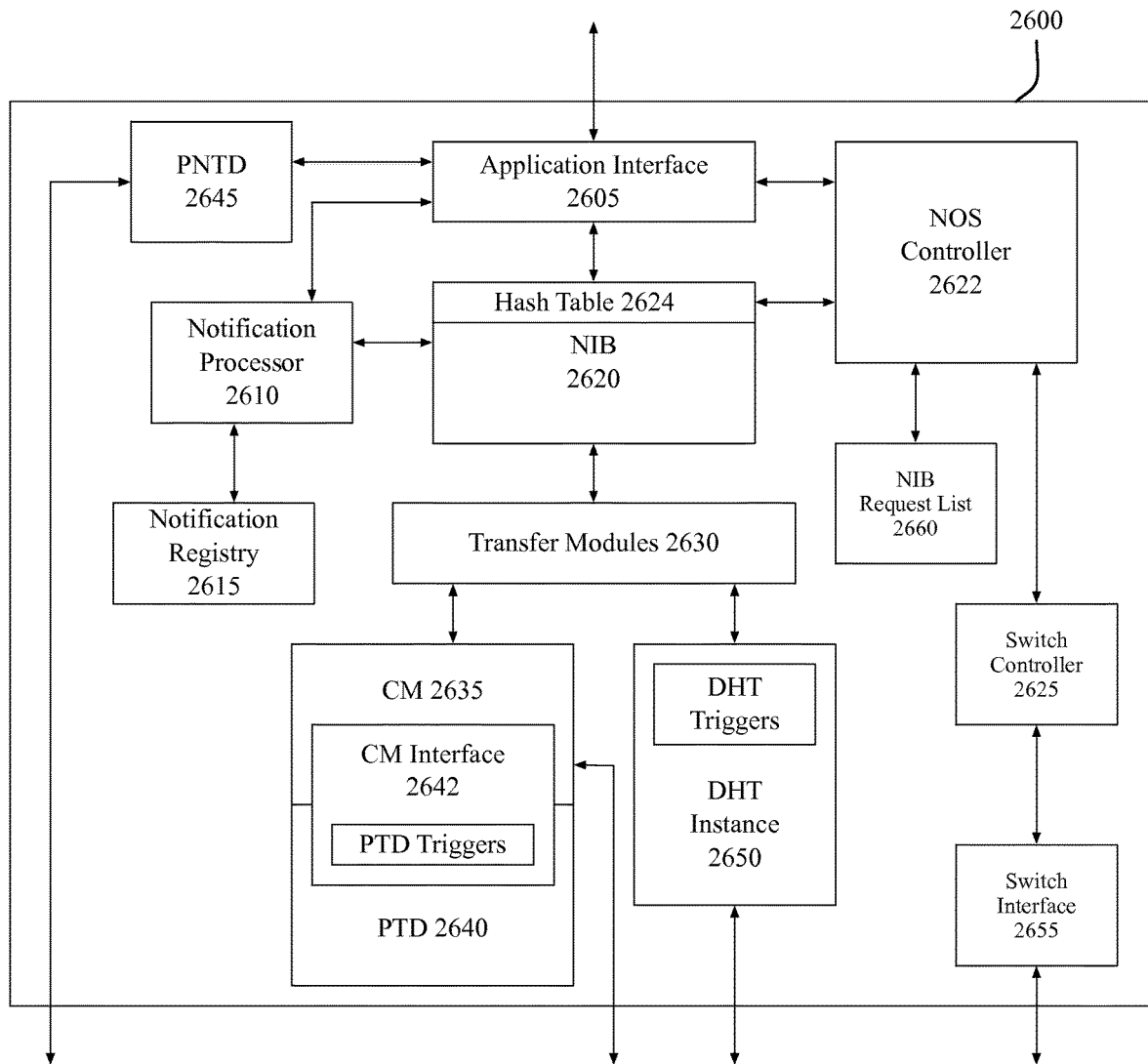
FIG. 26 conceptually illustrates a single NOS instance of some embodiments.

As described above, the system 2100 includes a PNTD 2155 in some embodiments of the invention. The PNTD stores information for a user or application to review. Examples of such information include error messages, log files, and billing information. The PNTD can receive push or pull commands from the application layer above the NOS, as illustrated in FIG. 26 by the arrow linking the PNTD 2645 to the application interface 2605. FIG. 26 will be described in detail further below.

In some embodiments, the PNTD is a distributed software database, such as Cassandra. For example, in some embodiments, each instance's PNTD stores the records generated by that instance's applications or by other applications of other instances. Each instance's PNTD records can be locally accessed or remotely accessed by the other controller instances whenever these instances need these records. This distributed nature of the PNTD allows the PNTD to be scalable as additional controller instances are added to the control system. In other words, addition of other controller instances increases the overall size of the PNTD storage layer.

The system 2100 uses the PNTD to store information in a durable manner that does not require the same degree of replication as the PTD 2145. In some embodiments, the PNTD is stored on a non-volatile storage medium, such as a hard disk.

The PNTD 2155 is a distributed storage structure similar to the DHT instance 2150. Similar to the DHT, data records in the PNTD are distributed across each NOS controller instance that has a PNTD. However, unlike the DHT or the PTD, the PNTD 2155 has no support for any trigger or notification functionality. Similar to the DHT instance 2150, the PNTD 2155 has a configurable level of replication. In some embodiments, data records are stored only once across the entire system, in other embodiments the data records are replicated across a configurable portion of the controller instances running a PNTD to improve the resiliency of the data records. In other words, the PNTD in some embodiments is not replicated across different instances or is only partially replicated across different instances, while in other embodiments, the PNTD is replicated fully across different instances.

B. Coordination Manager

In some embodiments, the different controller instances of the system 2100 communicate with each other through the secondary storage structures, as described above. Also, as described above, the system 2100 in some embodiments uses the CMs 2120 to facilitate much of the communication between the secondary storages of the different controller instances. The CM 2120 in each instance is also configured in some embodiments to specify control of different controller instances over different switching elements.

Figure 25:
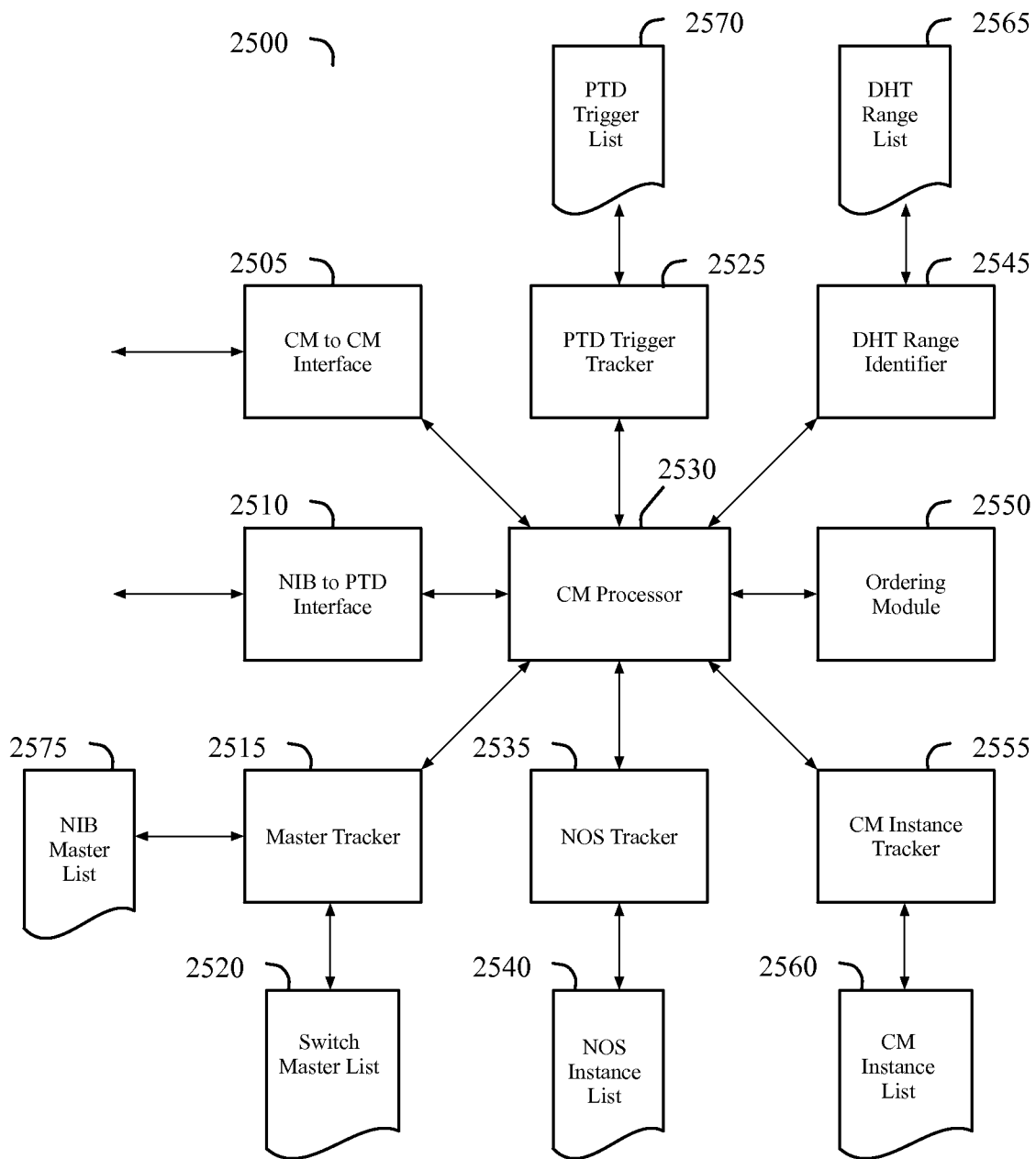
FIG. 25 conceptually illustrates a CM of a controller instance of some embodiments.

FIG. 25 illustrates the CM 2500 of one controller instance of some embodiments. The CM 2500 provides several service operations that allow it to coordinate different sets of activities between its controller instance and other controller instances. Examples of such services include (1) maintaining order of all inter-instance requests, (2) maintaining lists of NOS instances, CM instances, NIB masters, and switching element masters, (3) maintaining DHT range identifiers, (4) maintaining a list of triggered callbacks for PTD storage access, (5) providing an interface between the NIB and PTD storage layers, and (6) providing an interface to other CMs of other instances.

As shown in FIG. 25, the CM 2500 includes a CM-to-CM interface 2505, a NIB-to-PTD interface 2510, a master tracker 2515, a PTD trigger tracker 2525, a CM processor 2530, a NOS tracker 2535, a DHT range identifier 2545, an ordering module 2550, and a CM instance tracker 2555. The CM-to-CM interface 2505 serves as the interface for passing communication between the different CMs of the different controller instances. Such communication is at times needed when distributing data needed for secondary storage layer communication between the different instances. For instance, such communication is needed to route one NIB change from one controller that has a slave PTD to another controller that has a master PTD.

The NIB-to-PTD interface 2510 serves as the interface to facilitate communications between NIB and PTD storage layers. On the NIB side, the interface 2510 communicates with transfer modules that import and export data to and from the NIB. On the PTD side, the interface 2510 in some embodiments communicates (1) with the CM-to-CM interface 2505 (through the CM processor 2530) to facilitate communication between master and slave PTDs, (2) with the query manager of the PTD to effectuate a PTD access (e.g., a PTD write), and (3) with the query manager of the PTD to receive PTD layer callbacks when records change in the PTD. In some embodiments, the interface 2510 converts NIB queries to the PTD into a query format that is suitable for the PTD. In other embodiments, however, the NIB transfer modules provide the PTD queries in a format suitable for the PTD.

The CM processor 2530 receives communications from each interface 2505 or 2510. It routes such communications to the other interface, if needed, or to the other modules of the CM 2500, if needed. One example of a communication that the CM processor routes to the appropriate CM module is a PTD trigger call back that it receives from the PTD of its controller instance. As further described below, the PTD can be configured on a record-by-record basis to call back the CM when a particular record has changed. The CM uses the PTD trigger tracker 2525 to maintain a PTD trigger list 2570 that allows the CM to identify for different PTD records, different sets of modules within the same controller instance or within other controller instances that the CM needs to notify of the particular record's change in its associated PTD. Maintaining the PTD trigger list outside of the PTD is beneficial for several reasons, including keeping the size of the PTD small, avoiding replication of such lists across PTDs, etc.

The CM processor 2530 also uses the ordering module 2550 to maintain the ordering of the inter-instance communications and/or tasks. To maintain such ordering, the ordering modules of different embodiments use different processes and ordering schemes. Some of these ordering processes maintain total ordering among packets exchanged between the different controller instances. Examples of such ordering processes include the Paxos protocols and processes.

In some embodiments, the ordering module includes a time stamper to timestamp each communication that it receives that needs inter-instance coordination. The timestamps allow the CM 2500 to process communications in an appropriate sequential manner to ensure data consistency and reliability across the instances for the communications (e.g., PTD storage layer communications) that need such consistency and reliability. Instead of a time stamper, the CM processor 2530 uses other techniques or modules in other embodiments to ensure that the communications that it receives are processed in the appropriate sequential manner to facilitate the proper coordination of activities between the different controller instances, as mentioned above.

The CM processor 2530 also directs the DHT range identifier 2545 to generate and update the DHT range list 2565. In some embodiments, the CM processor directs the range identifier to update the range list 2565 periodically or upon receiving a communication through one of the interfaces 2505 or 2510. As discussed above, the DHT instances use the range list 2565 to identify the location of each DHT record in the DHT instances. In some embodiments, the DHT instances access the DHT range list directly, while in other embodiments the DHT instances access this list through the CM, which they access through a DHT-to-CM interface (not shown).

In addition to the DHT range list and the PTD trigger list, the CM 2500 maintains four other lists, which are the CM instance list 2560, the NOS instance list 2540, the switching element master list 2520, and the NIB master list 2575. The CM instance list 2560 is a list of all active CM instances, and this list is maintained by CM Instance tracker 2555. The NOS instance list 2540 is a list of all active NOS instances and this list is maintained by the NOS tracker 2535.

The switch element and the NIB master lists 2520 and 2575 are maintained by the master tracker 2515. In some embodiments, the switching element master list identifies a master controller instance for each switching element, and one or more back-up controller instances for each master controller in case the master controller fails. The CM 2500 designates one controller instance within the control system as the master of any given switching element, in order to distribute the workload and to avoid conflicting operations from different controller instances. By distributing the control of these operations over several instances, the system can more easily scale up to handle additional switching elements.

In some embodiments, the NIB master list 2575 identifies (1) a master for each portion (e.g., each record or set of records) of the NIB, (2) one or more back up controller instances for each identified master to use in case the master fails, and (3) access and/or modification rights for each controller instance with respect to each portion of NIB. Even with one master controller as master of a portion of the NIB, different controller instances can request a change to the portion controlled by the master. If allowed, the master instance effectuates this change, which is subsequently written to the switching element by the switch element master. Otherwise, the master rejects the request.

Some embodiments use the access and/or modification rights in the NIB master list to restrict changes to different portions of the NIB to different subsets of the controller instances. Each subset might only include in some embodiments the master controller instance that can modify the NIB portion or the switching element record that corresponds to the NIB portion that is subject to the requested change. Alternatively, in some embodiments, a subset might include one or more controller instances in addition to the master controller instance for the NIB portion.

In some embodiments, a first controller instance can be master of a switch and a second controller instance can be master of a corresponding record for that switch in the NIB. In such a case, the second controller instance would determine whether a requested change to the NIB is allowed (e.g., from a control application of any of the controller instances), while the first controller instance would modify the switch records if the second controller instance modifies the NIB in response to the requested change. If a request to change the NIB is not allowed, the NIB master controller (e.g., the second instance in the example above) would reject the request. Different embodiments use different techniques to propagate NIB modification requests through a control system, and some of these techniques are described below.

In some embodiments, each controller instance queries its CM 2500 to determine whether it is the master of the NIB portion for which it receives a NIB change, or whether it is the master of the switching element for which it has detected a change in the NIB. The CM 2500 then examines its NIB master list 2575 (e.g., through the CM processor 2530 and master tracker 2515) or its switch master list 2520 (e.g., through the CM processor 2530 and master tracker 2515) to determine whether the instance is the master of the switching element.

By allowing rights to be specified for accessing and/or modifying NIB records, the CM 2500 allows the control system 2100 to partition management of logical datapath sets (also referred to as serialized management of logical datapath sets). Each logical datapath set includes one or more logical datapaths that are specified for a single user of the control system. Partitioning management of the logical datapath sets involves specifying for each particular logical datapath set only one controller instance as the instance responsible for changing NIB records associated with that particular logical datapath set. For instance, when the control system uses three switching elements to specify five logical datapath sets for five different users with two different controller instances, one controller instance can be the master for NIB records relating to two of the logical datapath sets while the other controller instance can be the master for the NIB records for the other three logical datapath sets. Portioning management of logical datapath sets ensures that conflicting values for the same logical datapath sets are not written to the NIB by two different controller instances, and thereby alleviates the applications running on top of the NOS from guarding against the writing of such conflicting values.

Irrespective of whether the control system partitions management of logical datapath sets, the control system of some embodiments allows one control application that operates on controller instance to request that the control system lock down or otherwise restrict access to one or more NIB records for an entire logical datapath set or a portion of it, even when that controller instance is not the master of that logical datapath set. In some embodiments, this request is propagated through the system (e.g., by any propagation mechanism, including NIB/PTD replication, etc.) until it reaches the controller instance that is the master of the NIB portion. In some embodiments, the system allows each lock down operation to be specified in terms of one or more tasks that can be performed on one or more data records in the NIB.

The CM 2500 of the master controller determines whether a request to lock down or otherwise restrict access to a set of NIB records is allowed. If so, it will modify the records in its NIB master list so that subsequent requests for modifying the affected set of NIB records by other controller instances will be appropriately restricted.

In some embodiments, the CMs across all of the controller instances perform unified coordination activity management in a distributed manner. This coordination is facilitated by the CM processor 2530 and the procedures that it follows. In some embodiments, some or all of the modules of the CM 2500 are implemented by using available coordination management applications. For instance, some embodiments employ the Apache Zookeeper application to implement some or all of the modules of the CM 2500.

As mentioned above, the CMs of some embodiments facilitate intra-controller communication related to fault tolerance of controller instances. As such, some embodiments of the CM-to-CM interface 2505 pass these fault tolerance communications between the different CMs of the different controller instances. In some of these embodiments, the CM processor 2530 executes Apache Zookeeper, which implements the Paxos protocols, for determining whether a controller instance has failed. In addition, the CM processor 2530 of some such embodiments defines a timeout for determining that a controller instance is non-responsive and thus has failed. In other such embodiments, the timeout may be predefined. Furthermore, upon failure of a controller instance, some embodiments of the CM processor 2530 may be responsible for performing a master election process(es) to elect a new master controller instance (e.g., for logical datapath sets and switching elements of which the failed controller instance was a master) to replace the failed controller instance.

IV. Controller Instance

A. Architecture

FIG. 26 conceptually illustrates a single NOS instance 2600 of some embodiments. This instance can be used as a single NOS instance in the distributed control system 2100 that employs multiple NOS instances in multiple controller instances. Alternatively, with slight modifications, this instance can be used as a single NOS instance in a centralized control system that utilizes only a single controller instance with a single NOS instance. The NOS instance 2600 supports a wide range of control scenarios. For instance, in some embodiments, this instance allows an application running on top of it (e.g., a control or virtualization application) to customize the NIB data model and have control over the placement and consistency of each element of the network infrastructure.

Also, in some embodiments, the NOS instance 2600 provides multiple methods for applications to gain access to network entities. For instance, in some embodiments, it maintains an index of all of its entities based on the entity identifier, allowing for direct querying of a specific entity. The NOS instance of some embodiments also supports registration for notifications on state changes or the addition/deletion of an entity. In some embodiments, the applications may further extend the querying capabilities by listening for notifications of entity arrival and maintaining their own indices. In some embodiments, the control for a typical application is fairly straightforward. It can register to be notified on some state change (e.g., the addition of new switches and ports), and once notified, it can manipulate the network state by modifying the NIB data tuple(s) (e.g., key-value pairs) of the affected entities.

As shown in FIG. 26, the NOS 2600 includes an application interface 2605, a notification processor 2610, a notification registry 2615, a NIB 2620, a hash table 2624, a NOS controller 2622, a switch controller 2625, transfer modules 2630, a CM 2635, a PTD 2640, a CM interface 2642, a PNTD 2645, a DHT instance 2650, switch interface 2655, and a NIB request list 2660.

The application interface 2605 is a conceptual illustration of the interface between the NOS and the applications (e.g., control and virtualization applications) that can run on top of the NOS. The interface 2605 includes the NOS APIs that the applications (e.g., control or virtualization application) running on top of the NOS use to communicate with the NOS. In some embodiments, these communications include registrations for receiving notifications of certain changes in the NIB 2620, queries to read certain NIB attributes, queries to write to certain NIB attributes, requests to create or destroy NIB entities, instructions for configuring the NOS instance (e.g., instructions regarding how to import or export state), requests to import or export entities on demand, and requests to synchronize NIB entities with switching elements or other NOS instances.

The switch interface 2655 is a conceptual illustration of the interface between the NOS and the switching elements that run below the NOS instance 2600. In some embodiments, the NOS accesses the switching elements by using the OpenFlow or OVS APIs provided by the switching elements. Accordingly, in some embodiments, the switch interface 2655 includes the set of APIs provided by the OpenFlow and/or OVS protocols.

The NIB 2620 is the data storage structure that stores data regarding the switching elements that the NOS instance 2600 is controlling. In some embodiments, the NIB just stores data attributes regarding these switching elements, while in other embodiments, the NIB also stores data attributes for the logical datapath sets defined by the user. Also, in some embodiments, the NIB is a hierarchical object data structure (such as the ones described above) in which some or all of the NIB objects not only include data attributes (e.g., data tuples regarding the switching elements) but also include functions to perform certain functionalities of the NIB. For these embodiments, one or more of the NOS functionalities that are shown in modular form in FIG. 26 are conceptual representations of the functions performed by the NIB objects. Several examples of these conceptual representations are provided below.

The hash table 2624 is a table that stores a hash value for each NIB object and a reference to each NIB object. Specifically, each time an object is created in the NIB, the object's identifier is hashed to generate a hash value, and this hash value is stored in the hash table along with a reference (e.g., a pointer) to the object. The hash table 2624 is used to quickly access an object in the NIB each time a data attribute or function of the object is requested (e.g., by an application or secondary storage). Upon receiving such requests, the NIB hashes the identifier of the requested object to generate a hash value, and then uses that hash value to quickly identify in the hash table a reference to the object in the NIB. In some cases, a request for a NIB object might not provide the identity of the NIB object but instead might be based on non-entity name keys (e.g., might be a request for all entities that have a particular port). For these cases, the NIB includes an iterator that iterates through all entities looking for the key specified in the request.

The notification processor 2610 interacts with the application interface 2605 to receive NIB notification registrations from applications running on top of the NOS and other modules of the NOS (e.g., such as an export module within the transfer modules 2630). Upon receiving these registrations, the notification processor 2610 stores notification requests in the notification registry 2615 that identifies each requesting party and the NIB data tuple(s) that the requesting party is tracking.

As mentioned above, the system of some embodiments embeds in each NIB object a function for handling notification registrations for changes in the value(s) of that NIB object. For these embodiments, the notification processor 2610 is a conceptual illustration of the amalgamation of all the NIB object notification functions. Other embodiments, however, do not provide notification functions in some or all of the NIB objects. The NOS of some of these embodiments therefore provides an actual separate module to serve as the notification processor for some or all of the NIB objects.

When some or all of the NIB objects have notification functions in some embodiments, the notification registry for such NIB objects are typically kept with the objects themselves. Accordingly, for some of these embodiments, the notification registry 2615 is a conceptual illustration of the amalgamation of the different sets of registered requestors maintained by the NIB objects. Alternatively, when some or all of the NIB objects do not have notification functions and notification services are needed for these objects, some embodiments use a separate notification registry 2615 for the notification processing module 2610 to use to keep track of the notification requests for such objects.

The notification process serves as only one manner for accessing the data in the NIB. Other mechanisms are needed in some embodiments for accessing the NIB. For instance, the secondary storage structures (e.g., the PTD 2640 and the DHT instance 2650) also need to be able to import data from and export data to the NIB. For these operations, the NOS 2600 uses the transfer modules 2630 to exchange data between the NIB and the secondary storage structure.

In some embodiments, the transfer modules include a NIB import module and a NIB export module. These two modules in some embodiments are configured through the NOS controller 2622, which processes configuration instructions that it receives through the interfaces 2605 from the applications above the NOS. The NOS controller 2622 also performs several other operations. As with the notification processor, some or all of the operations performed by the NOS controller are performed by one or more functions of NIB objects, in some of the embodiments that implement one or more of the NOS 2600 operations through the NIB object functions. Accordingly, for these embodiments, the NOS controller 2622 is a conceptual amalgamation of several NOS operations, some of which are performed by NIB object functions.

Other than configuration requests, the NOS controller 2622 of some embodiments handles some of the other types of requests directed at the NOS instance 2600. Examples of such other requests include queries to read certain NIB attributes, queries to write to certain NIB attributes, requests to create or destroy NIB entities, requests to import or export entities on demand, and requests to synchronize NIB entities with switching elements or other NOS instances.

In some embodiments, the NOS controller stores requests to change the NIB on the NIB request list 2660. Like the notification registry, the NIB request list in some embodiments is a conceptual representation of a set of distributed requests that are stored in a distributed manner with the objects in the NIB. Alternatively, for embodiments in which some or all of the NIB objects do not maintain their modification requests locally, the request list is a separate list maintained by the NOS 2600. The system of some of these embodiments that maintains the request list as a separate list, stores this list in the NIB in order to allow for its replication across the different controller instances through the PTD storage layer. As further described below, this replication allows the distributed controller instances to process in a uniform manner a request that is received from an application operating on one of the controller instances.

Synchronization requests are used to maintain consistency in NIB data in some embodiments that employ multiple NIB instances in a distributed control system. For instance, in some embodiments, the NIB of some embodiments provides a mechanism to request and release exclusive access to the NIB data structure of the local instance. As such, an application running on top of the NOS instance(s) is only assured that no other thread is updating the NIB within the same controller instance; the application therefore needs to implement mechanisms external to the NIB to coordinate an effort with other controller instances to control access to the NIB. In some embodiments, this coordination is static and requires control logic involvement during failure conditions.

Also, in some embodiments, all NIB operations are asynchronous, meaning that updating a network entity only guarantees that the update will eventually be pushed to the corresponding switching element and/or other NOS instances. While this has the potential to simplify the application logic and make multiple modifications more efficient, often it is useful to know when an update has successfully completed. For instance, to minimize disruption to network traffic, the application logic of some embodiments requires the updating of forwarding state on multiple switches to happen in a particular order (to minimize, for example, packet drops). For this purpose, the API of some embodiments provides the synchronization request primitive that calls back one or more applications running on top of the NOS once the state has been pushed for an entity. After receiving the callback, the control application of some embodiments will then inspect the content of the NIB and determine whether its state is still as originally intended. Alternatively, in some embodiments, the control application can simply rely on NIB notifications to react to failures in modifications as they would react to any other network state changes.

The NOS controller 2622 is also responsible for pushing the changes in its corresponding NIB to switching elements for which the NOS 2600 is the master. To facilitate writing such data to the switching element, the NOS controller 2622 uses the switch controller 2625. It also uses the switch controller 2625 to read values from a switching element. To access a switching element, the switch controller 2625 uses the switch interface 2655, which, as mentioned above, uses OpenFlow or OVS, or other known sets of APIs in some embodiments.

Like the PTD and DHT storage structures 2145 and 2150 of the control system 2100 of FIG. 21, the PTD and DHT storage structures 2640 and 2650 of FIG. 26 interface with the NIB and not the application layer. In other words, some embodiments only limit PTD and DHT layers to communicate between the NIB layer and these two storage layers, and to communicate between the PTD/DHT storages of one instance and PTD/DHT storages of other instances. Other embodiments, however, allow the application layer (e.g., the control application) within one instance to access the PTD and DHT storages directly or through the transfer modules 2630. These embodiments might provide PTD and DHT access handles (e.g., APIs to DHT, PTD or CM interface) as part of the application interface 2605, or might provide handles to the transfer modules that interact with the PTD layer (e.g., the CM interface 2642) and DHT layers, so that the applications can directly interact with the PTD and DHT storage layers.

Also, like structures 2145 and 2150, the PTD 2640 and DHT instance 2650 have corresponding lists of triggers that are respectively maintained in the CM interface 2642 and the DHT instance 2650. The use of these triggers will be further described below. Also, like the PNTD 2155 of the control system 2100, the PNTD 2645 of FIG. 26 does not interface with the NIB 2620. Instead, it interfaces with the application layer through the application interface 2605. Through this interface, the applications running on top of the NOS can store data in and retrieve data from the PNTD. Also, applications of other controller instances can access the PNTD 2645, as shown in FIG. 26.

The process for applications registering for NIB notifications will next be described in sub-section IV.B. After this discussion, the process for interacting with the DHT and/or PTD upon modification of the NIB will be described in sub-section IV.C. Next, the process for handling NIB change requests from the application will be described in sub-section IV.D.

B. Application Registering for NIB Notification

Figure 27:
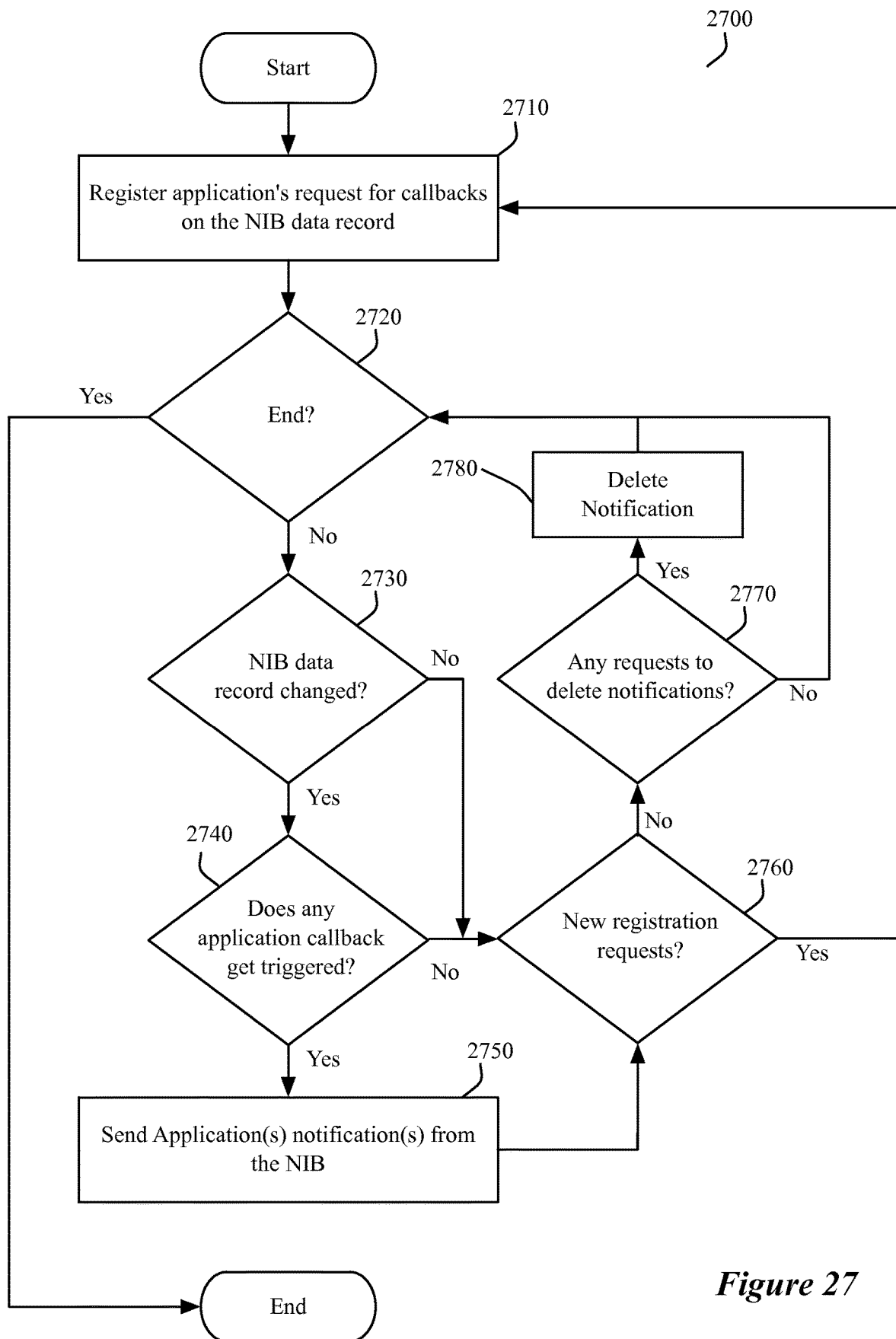
FIG. 27 conceptually illustrates a process of some embodiments that registers NIB notifications for applications running above a NOS and that calls these applications upon change of NIB records.

FIG. 27 illustrates a process 2700 that registers NIB notifications for applications running above the NOS and calls these applications upon the change of NIB records. In some embodiments, this process is performed by the notification function of each NIB object that can receive NIB notification registrations. Alternatively, this process can be performed by the notification processor 2610 for each NIB data record for which it can register a notification request.

As shown in FIG. 27, the process 2700 initially registers (at 2710) a notification request for one application for a particular NIB data record. This request is recorded in the NIB data record's corresponding notification list in some embodiments, or in combined notification list for several NIB data records in other embodiments. After 2710, the process 2700 determines (at 2720) whether it should end. The process ends in some embodiments when it does not have any notifications left on its list of notifications for the particular NIB data record.

When the process determines (at 2720) that it should not end, the process determines (at 2730) whether the particular NIB data has changed. If not, the process transitions to 2760, which will be further described below. When the process determines (at 2730) that the particular NIB data has changed, the process determines (at 2740) whether any application callbacks were triggered by the NIB data change. Such callbacks would be triggered always in embodiments that call back one or more applications when one or more callback notifications are on the notification lists. For such embodiments, the determination (at 2740) is not needed. Other embodiments, however, allow the callbacks to be set conditionally (e.g., based on the value of the changed record). In these embodiments, the determination (at 2740) entails determining whether the condition for triggering the callback has been met.

When the process determines (at 2740) that it needs to call back one or more applications and notify them of the changes to the NIB records, the process sends (at 2750) the notification of the NIB record change along with the new value for the changed NIB record to each application that it needs to notify (i.e., to each application that is on the notification list and that needs to be notified). From 2750, the process transitions to 2760. The process also transitions to 2760 from 2740 when it determines that no application callbacks were triggered by the NIB record change.

At 2760, the process determines whether any new notification requests need to be registered on the callback notification list. If so, the process transitions to 2710, which was described above. Otherwise, the process transitions to 2770, where it determines whether any request to delete notification requests from the notification list has been received. If not, the process transitions to 2720, which was described above. However, when the process determines (at 2770) that it needs to delete a notification request, it transitions to 2780 to delete the desired notification request from the notification list. From 2780, the process transitions to 2720, which was described above.

C. Secondary Storage Records and Callbacks

Figure 28:
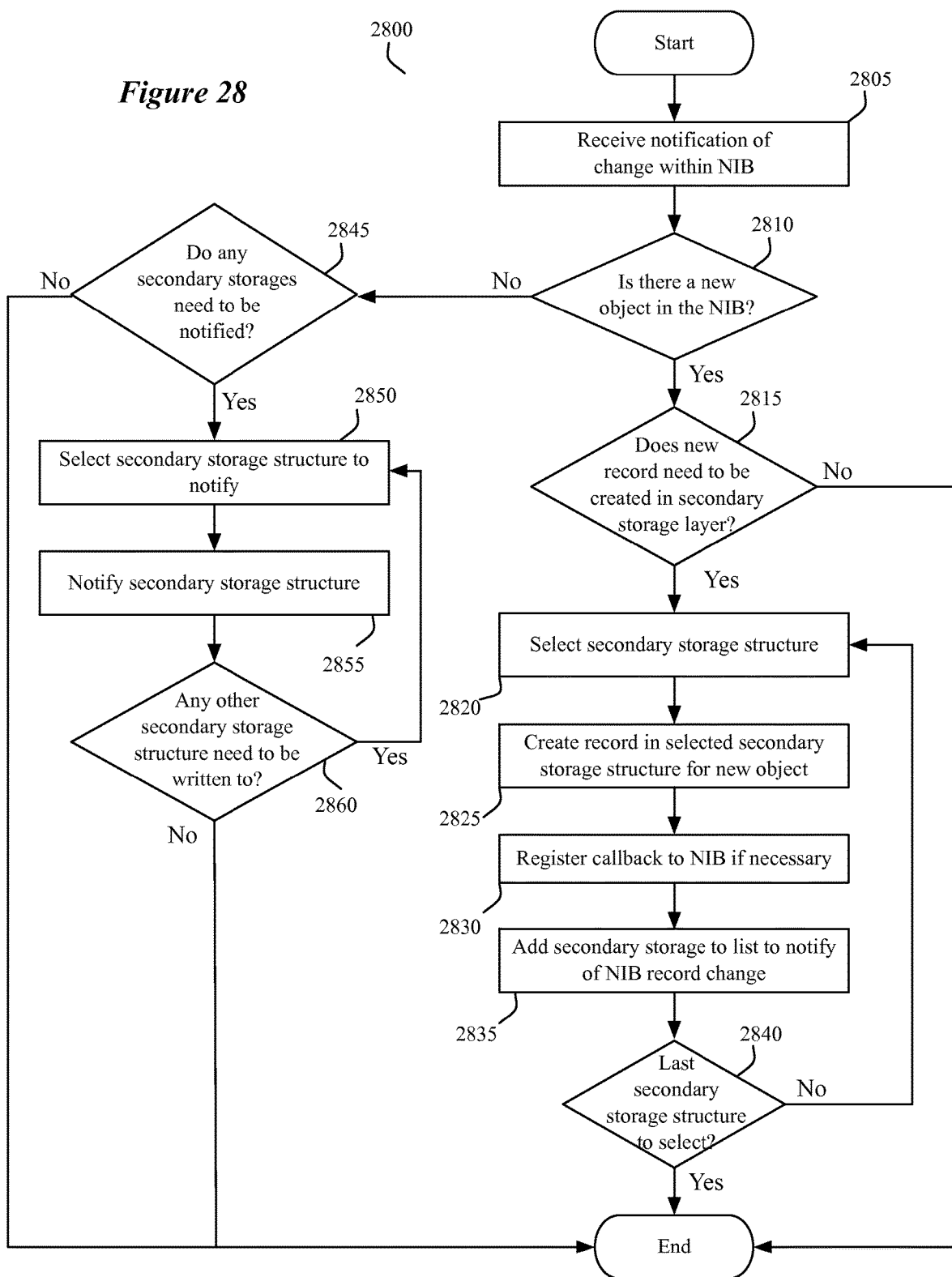
FIG. 28 conceptually illustrates a process of some embodiments that a NIB export module of a set of transfer modules performs.

FIG. 28 conceptually illustrates a process 2800 that the NIB export module of the transfer modules 2630 performs in some embodiments. In some embodiments, the export module performs this process each time it receives a notification of a NIB record change, which may require the export module to create one or more new data records in one or more of the secondary storages or to update previously created data records in the secondary storages. The secondary storages that are at issue in some embodiments are the PTD 2640 and the DHT instance 2650. However, in other embodiments, the process 2800 may interact with other secondary storages.

As shown in FIG. 28, the process 2800 initially receives (at 2805) a notification of a change of a record within the NIB. The process 2800 receives such notification in some embodiments because it previously registered for such notifications with the NIB (e.g., with a notification processor 2610 of the NIB, or with the notification function of the NIB record that was changed).

After 2805, the process determines (at 2810) whether the notification relates to creation of a new object in the NIB. If the notification does not correspond to a new NIB object, the process transitions to 2845, which will be described further below. Otherwise, the process determines (at 2815) whether it needs to direct one or more secondary storages to create one or more records to correspond to the newly created NIB record. When the process determines (at 2815) that it does not need to direct any secondary storages to create any new records, the process ends. Otherwise, the process selects (at 2820) a secondary storage structure and directs (at 2825) this secondary storage structure to create a record that would correspond to the newly created NIB object. In the case of the DHT, the process 2800 directly interfaces with a query manager of the DHT to make this request for a new record. In the case of the PTD, however, this request is routed to the master PTD through the CM(s) and CM interface(s) that serve as the interface between the PTD and the NIB layers.

After 2825, the process, if necessary, registers (at 2830) for a callback from the selected secondary storage structure to the import module of the transfer modules 2630. This callback is triggered in some embodiments whenever the newly created record in the selected secondary storage structure changes. In some embodiments, this callback notifies the import module that a record has changed in the secondary storage structure.

In the case of the PTD 2640, the process 2800 in some embodiments directs the CM interface 2642 of the master PTD to create a trigger for the newly created PTD record and to identify the import module as the module to call back when the newly created PTD record has changed. As mentioned above, the CM processor then receives this request and directs the PTD trigger tracker of the master PTD to create such a trigger record in its PTD trigger list for the newly created PTD record.

Figure 29:
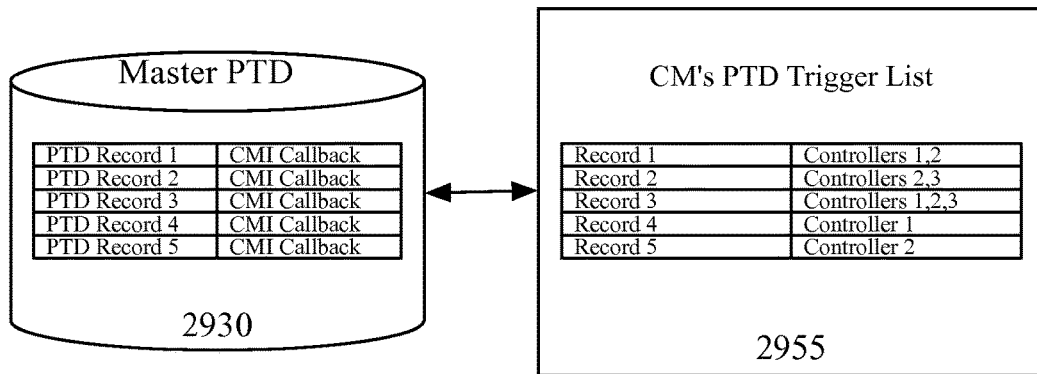
FIG. 29 illustrates trigger records that are maintained for different PTD records in a PTD trigger list according to some embodiments of the invention.

FIG. 29 illustrates an example of such trigger records that are maintained for different PTD records in a PTD trigger list 2955. As shown in this figure, this list stores a set of zero or more import modules of zero or more controller instances to callback when the newly PTD record is changed. Also, this figure shows that the PTD in some embodiments stores a callback to a CM module (e.g., to the CM processor or to the PTD tracker) for each PTD record. A callback is made for a record from the PTD whenever that PTD record is modified. Whenever such a callback is received for a PTD record, the PTD trigger list is checked for that record to determine whether the import module of any controller instance needs to be notified.

Figure 30:
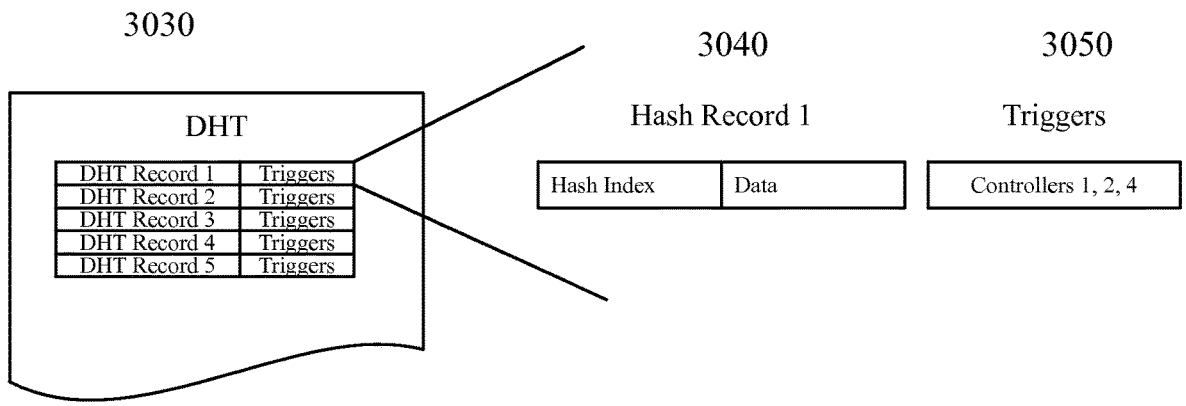
FIG. 30 conceptually illustrates a DHT record trigger that is stored with a newly created record according to some embodiments of the invention.

In the case of the DHT, the process in some embodiments directs the DHT query manager to register a trigger for the newly created DHT record and to identify the import module of the NIB that originated the change as the module to call back, when the newly created DHT record has changed. FIG. 30 illustrates that the DHT record trigger is stored with the newly created record in some embodiments. Specifically, it shows that each DHT record has a hash index, a data value and the identity of one or more NIB import modules (of controller instances) to call back. More than one NIB import modules will be in the callback list because, in some embodiments, each time one controller instance's NIB does a DHT query, it records a NIB callback registration that identifies its NIB's corresponding import module. As further described below, the newly created DHT record will not necessarily be in the same instance as the NIB that originated the change received at 2805.

Instead of registering for a callback at 2830 upon creation of a new NIB record, the process 2800 of other embodiments uses other techniques for registering callbacks to the NIB from one or more of the secondary storage structures. For instance, in some embodiments, the NIB import module of a controller instance registers for callbacks from the master PTD when the NIB and the import module are instantiated. In some embodiments, such callbacks are registered with the CM interface of the master PTD, and the CM interface performs these callbacks when the master PTD notifies it that one of its records has changed. Some embodiments use a similar approach to register for callbacks from the DHT, while other embodiments use the process 2800 (or similar process) to register callbacks (e.g., at 2830) for the DHT.

After 2830, the process adds (at 2835) the selected secondary storage structure to the list of modules that it needs to notify when the newly created NIB record has changed. The process then determines (at 2840) whether it has to select another secondary storage structure in which it has to create a new record to correspond to the newly created NIB record. In some embodiments, the process 2800 can at most create a new record in the master PTD and a new record in one DHT instance. In other embodiments, however, the process can create more than these two records in more than two secondary storages of the controller instances of the control system.

When the process determines (at 2840) that it does not need to create a record in any other secondary storage structure, it ends. However, when the process determines (at 2840) that it needs to create a new record in another secondary storage structure, it returns to 2820 to select another secondary storage structure and repeat its operations 2825 to 2840 for this structure.

When the process determines (at 2810) that the NIB change notification that it has received does not correspond to a new NIB object, the process transitions to 2845. At 2845, the process determines whether any secondary storages need to be notified of this NIB change. If not, the process ends. Otherwise, the process selects (at 2850) a secondary storage to notify and then notifies (at 2855) the selected secondary storage. In some embodiments, the notification of the selected secondary storage always or at times entails generating a write command to the secondary storage to direct it to modify a value of its record that corresponds to the NIB record which has been modified (i.e., which was the NIB record identified at 2805).

After 2855, the process determines (at 2860) whether it needs to notify any other secondary storage of the NIB change. If so, the process returns to 2850 to select another secondary storage structure to notify. Otherwise, the process ends.

Figure 31:
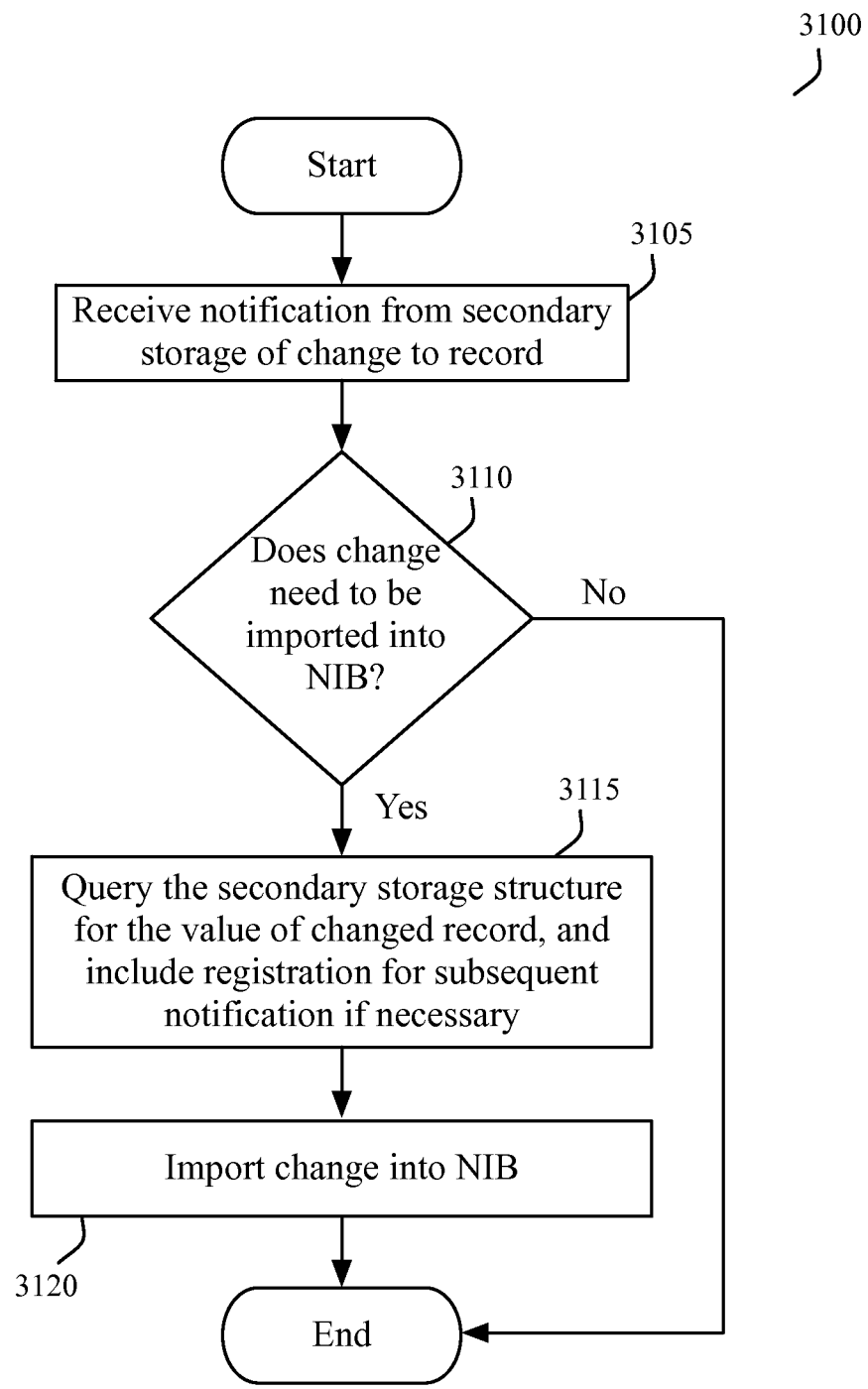
FIG. 31 conceptually illustrates a process of some embodiments that a NIB import module of a set of transfer modules performs.

FIG. 31 illustrates a process 3100 that the NIB import module of the transfer modules 2630 performs in some embodiments. In some embodiments, the import module performs this process each time it receives a notification of a record change in a secondary storage structure, which may require the import module to update previously created data records in the secondary storages. The secondary storages that are at issue in some embodiments are the PTD 2640 and the DHT instance 2650. However, in other embodiments, the process 2800 may interact with other secondary storages.

As shown in FIG. 31, the process 3100 initially receives (at 3105) a notification of a change of a record within the secondary storage structure. The process 3100 receives such notification in some embodiments because the process 2800 previously registered for such notifications at 2830. After 3105, the process determines (at 3110) whether the notification relates to a change that needs to be imported into the NIB. If not, the process ends. Otherwise, the process queries (at 3115) the secondary storage structure (e.g., queries the PTD query manager through the CM interface, or queries the DHT query manager) for the new value of the changed record. At 3115, the process also registers another notification in the secondary storage structure for the record for which it receives the notification at 3105, if such a registration is desired and necessary. After 3115, the process imports (at 3120) the received changed value into the NIB and then ends.

Figure 32:
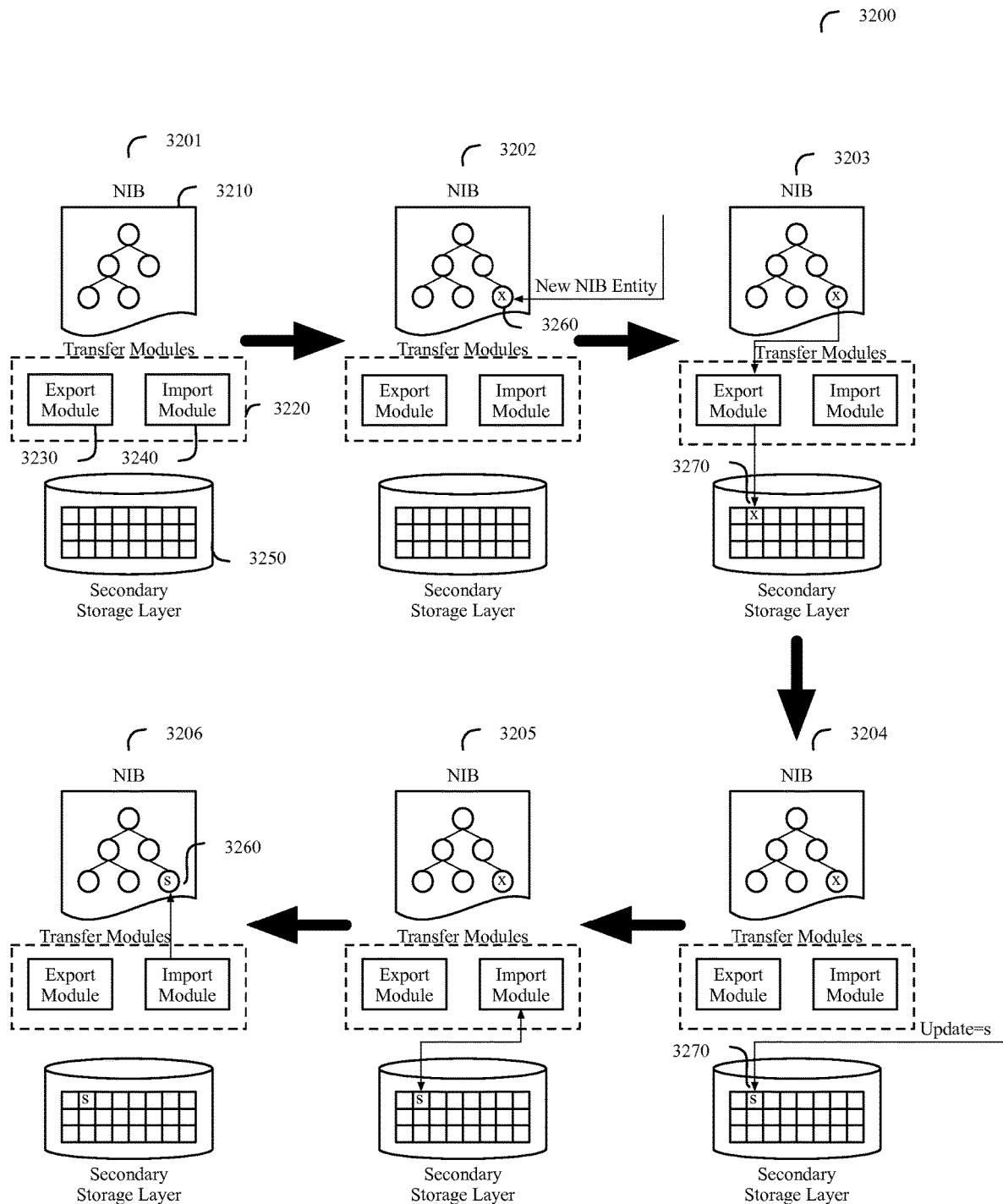
FIG. 32 conceptually illustrates a data flow diagram that shows the combined operations of export and import processes illustrated in FIGS. 28 and 31 according to some embodiments of the invention.

FIG. 32 presents a data flow diagram 3200 that shows the combined operations of the export and import processes 2800 and 3100. Specifically, it shows the creation of a record in the secondary storage layer upon creation of a new record in the NIB, and a subsequent modification of the newly created NIB record in the secondary storage layer. In this example, the secondary storage layer could be either a PTD or a DHT. If the illustrated operation involved the PTD, then the interaction would have to pass through the master PTD. If the illustrated operation involved the DHT, then the newly created DHT record could be stored on a NOS controller's DHT instance that is remote from the NIB that has a newly created record. However, to keep the illustration simple, FIG. 32 does not show any of the interactions with the remote controller instances. Accordingly, this illustration is only meant to be a conceptualization of some of the sequence of operations, but not necessarily representative of the exact sequence of operations involved otherwise.

FIG. 32 illustrates in six stages the creation of a NIB record and the updating of that NIB record after its corresponding record in the secondary storage layer is changed. In the first stage 3201, the system is shown at steady state. This first stage illustrates a NIB 3210 and a secondary storage layer 3250, which may be in the same controller instance or may be in different controller instances. The first stage 3201 also shows an export module 3230 and import module 3240 between the NIB 3210 and the secondary storage layer 3250. These two modules collectively form a set of transfer modules 3220 that facilitate the exchange of data between the NIB 3210 and secondary storage layer 3250.

In the second stage 3202, the NIB 3210 adds a new NIB entity, which is illustrated by an arrow pointing to a new NIB node 3260. The value of this new NIB record 3260 is "X" in this example. Next, in the third stage 3203, the export module 3230 in the set of transfer modules receives notification of the newly created entity 3260 in the NIB. Upon receipt of this notification, the export module 3230 creates a new record 3270 in the secondary storage layer as illustrated by the arrow starting at the export module and ending at the box 3270 in the secondary storage layer 3250. The third stage 3203 shows that the value "X" is stored in the newly created record 3270 in the secondary storage layer 3250. In the third stage, the export module 3230 also directs the secondary storage layer to create a trigger in the secondary storage layer (e.g., to create a DHT trigger in the DHT, or to create a PTD trigger in the CM) and register the identity of the import module 3240 as a module to call back in case the new record 3270 changes subsequently.

The fourth stage 3204 illustrates the updating of the record 3270 in the secondary storage at a subsequent point in time. This updating results in a new value "S" being stored in this record 3270. This updating results in the identification of the notification trigger stored at the direction of the export module 3230, and the subsequent identification of the import module 3240 as a module to notify of the NIB change.

The fifth stage 3205 illustrates that after the identification of the import module 3240, this module 3240 receives notification of the change to the record 3270 that occurred in the fourth stage 3204. With the double arrow connection between the import module 3240 and the record 3270, the fifth stage 3205 also shows that the import module queries the secondary storage structure to receive the new value "S" once it determines that it needs to import this new value into the NIB. In the sixth, and final stage 3206, the import module 3240 imports the new value "S" into the NIB record 3260 to reflect the change that occurred to the corresponding record 3270 in the secondary storage layer in the fourth stage 3204. This process shows how the transfer modules maintain consistency between the NIB and the secondary storage layer through use of export and import modules.

D. Application Requesting NIB Changes

The discussion above describes how the applications and export modules register notifications with the NIB and how the import modules import data into the NIB, in some embodiments of the invention. Another NIB layer interaction involves the applications requesting through the application interface 2605 changes in the NIB. Some embodiments allow all applications to make such requests, but only make changes based on some of the application requests.

As further described below, in some embodiments, the system replicates the PTDs and NIBs across multiple controller instances. In some embodiments, the system takes advantage of this replication to distribute a request by one application to modify the NIB. For instance, in some embodiments, a request to modify the NIB from one controller instance's application is stored in a NIB request list 2660 within the NIB 2620. As this list is part of the NIB, additions to it are propagated to the NIBs of the other controller instances through the NIB/PTD replication process, which will be further described below.

Each controller instance then subsequently retrieves the request from its NIB's request list and determines whether it should process the NIB change. The controller instance that should process the received NIB modification request and change the NIB then determines whether this change should be made, and if it determines that it should, it then modifies its NIB based on the request. If this controller instance determines that it should not grant this request, it rejects the request. In some embodiments, the NOS controller 2622 of the NOS 2600 is the module of the controller instance that decides whether it should process the request, and if so, whether it should make the desired change based on the request or deny this request. As mentioned above, the NOS controller 2622 in some embodiments is a conceptual amalgamation of several different functions in several different NIB objects that process NIB modification requests from the application layer.

In some embodiments, the NOS controller 2622, which makes or denies the requested NIB modification, records a response to the specified request in a response list in the NIB. This response list is part of the request list in some embodiments. Alternatively, this response list is a conceptual amalgamation of various response fields or attributes in various NIB objects. This response list is propagated to the other NIBs through the NIB/PTD replication process. Each NOS controller 2622 of each controller instance examines the response list to determine whether there are any responses that it needs to process. Accordingly, the NOS controller 2622 of the controller instance that originated the NIB request modification removes the response added to the list by the controller that made or denied the NIB modification. Based on this response, this NOS controller then supplies an acknowledgment or a denial of the change to the application that originated the request.

Figure 33:
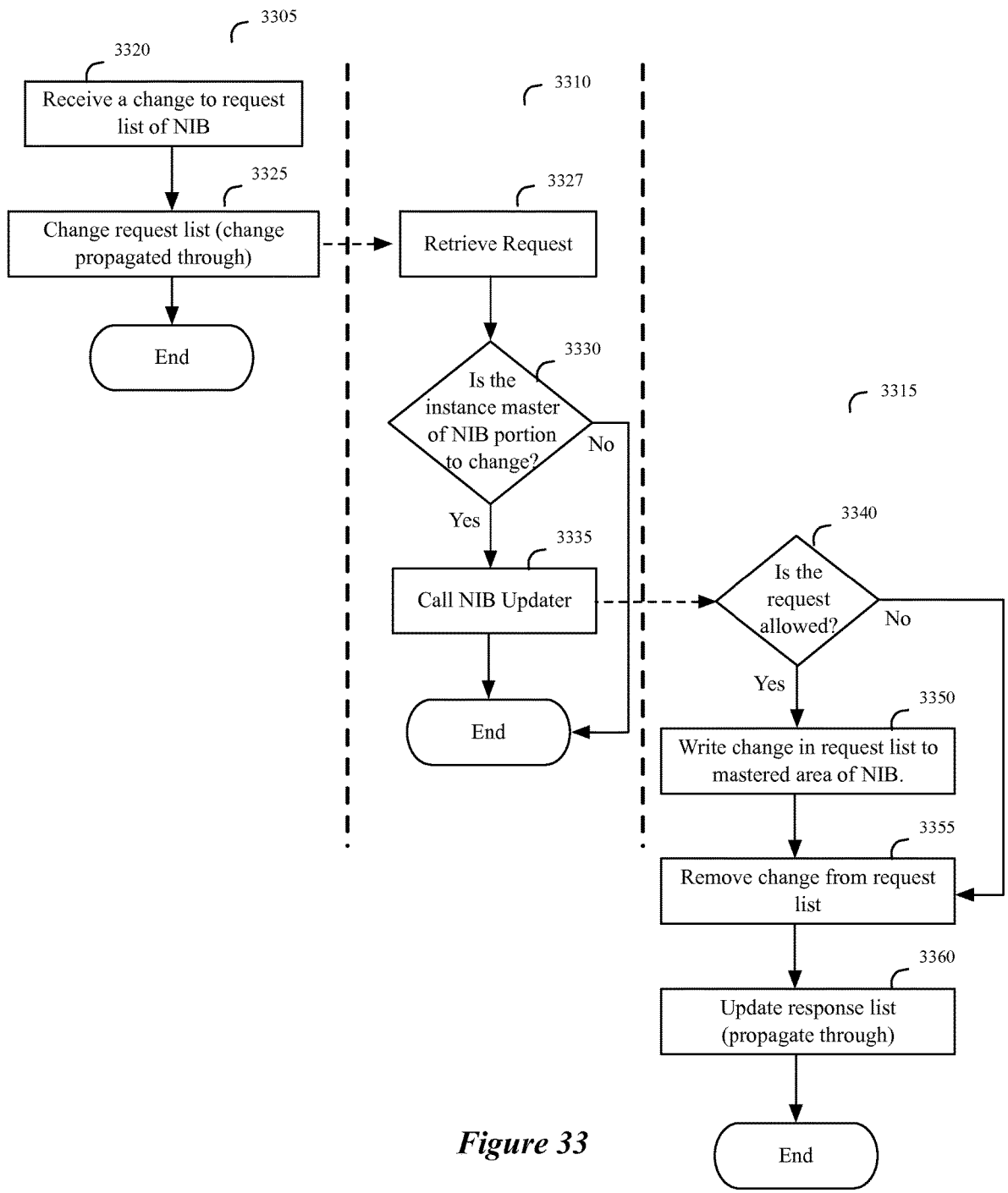
FIG. 33 conceptually illustrates three processes of some embodiments for dealing with a NIB modification request from an application running on top of a NOS of a controller instance.

For some embodiments of the invention, FIG. 33 illustrates three processes 3305, 3310, and 3315 for dealing with a NIB modification request from an application (e.g., a control application) running on top of a NOS on one controller instance. Two of these processes 3305 and 3315 are performed by one controller instance, while the third 3310 is performed by each controller instances. Specifically, the first process 3305 is performed by the controller instance that receives the NIB modification request from an application that runs within that instance. This process starts (at 3320) when the NIB modification request is received. Next, the process 3305 changes (at 3325) the request list in the NIB to reflect this new request. As this list is part of the NIB, additions to it are propagated to the NIBs of the other controller instances through the NIB/PTD replication process that replicates the NIBs and PTDs across all the controller instances. After 3325, the process 3305 ends.

Process 3310 is a process that each controller instance subsequently performs when it receives notification of the change to the request list. In some embodiments, this process previously registered to be notified of NIB modifications (e.g., with the notification processor 2610) whenever the request list is modified. As shown in FIG. 33, the process 3310 initially retrieves (at 3327) the newly received request from the request list. It then determines (at 3330) whether its controller instance is the master of the portion of the NIB being changed. In some embodiments, the process 3310 makes this determination by querying the CM interface 2642 to inquire whether its controller instance is the master of the portion of the NIB being changed. As mentioned above, some embodiments have a one-to-one correlation between an instance being the master of a NIB data record and the instance being the master of the corresponding record in the switching element, while other embodiments allow one instance to be the master of a NIB data record and another instance be the master of the corresponding record in the switching element.

When the process 3310 determines (at 3330) that its controller instance is not the master of the NIB portion being changed, it ends. Otherwise, the process calls (at 3335) the NIB updater process 3315, and then ends.

Process 3315 is the process that is performed by the controller instance that should process the received NIB modification request (i.e., by the controller instance that is the master of the NIB portion being changed). As shown in FIG. 33, this process initially determines (at 3340) whether it should make the requested change. The process 3315 denies this request if it determines (at 3340) that the requesting application does not have authority to change the identified NIB portion. This might be the case if the application simply does not have this authority, if another application or instance locked the identified NIB portion from being modified by some or all other applications and/or instances, or if the state has changed significantly since the request was made.

When the process determines (at 3340) the requested NIB modification should not be made, it transitions to 3355, which will be described further below. Otherwise, when the process determines (at 3340) that it should perform the requested NIB modification, it makes (at 3350) this modification in the NIB and then transitions to 3355.

At 3355, the process removes the modification request from the request list. After 3355, the process transitions to 3360, at which point it updates the response list in the NIB to reflect an acknowledgment that it has made the desired modification. After 3360, the process ends.

The response list is propagated to the other NIBs through the NIB/PTD replication process. The NOS controller of the controller instance that originated the NIB request modification removes the response added to the list by the controller that made or denied the NIB modification. Based on this response, this NOS controller then supplies an acknowledgment or a denial of the change to the application that originated the request.

Some embodiments perform variations of the processes 3305-3315. For instance, in some embodiments, the process 3305 that handles the incoming NIB modification request from an application of its controller instance, initially determines whether the NIB modification needs a master controller to perform the modification. If not, the process 3305 implements this change in some embodiments. Also, while some embodiments propagate the NIB modification request through the PTD storage layer, other embodiments propagate the NIB modifications through the DHT storage layer.

As described above, FIG. 33 illustrates that in some embodiments requests to modify the NIB from one controller instance are propagated through NIB request lists to the controller instance that is responsible for managing the portion of the NIB that the request identifies for the modification. In such a case, the NIB of some embodiments is used as a medium for communication between different controller instances and between the processing layers of the controller instances (e.g., a control application, a virtualization application, and a NOS). Other examples of the NIB as a communication layer between controller instances exist. For example, one controller instance might generate physical control plane data for a particular managed switching element. This update is then transmitted through the secondary storage layer to the NIB of another controller instance that is the master of the particular managed switching element. This other controller instance then pushes the physical control plane data to the particular managed switching element. Also, the NIB may be used as a communication layer between different applications of one controller instance. For instance, a control application can store logical forwarding plane data in the NIB and a virtualization application may retrieve the logical forwarding plane data from the NIB, which the virtualization application then converts to physical control plane data and stores in the NIB.

V. Secondary Storage

A. DHT

Figure 34:
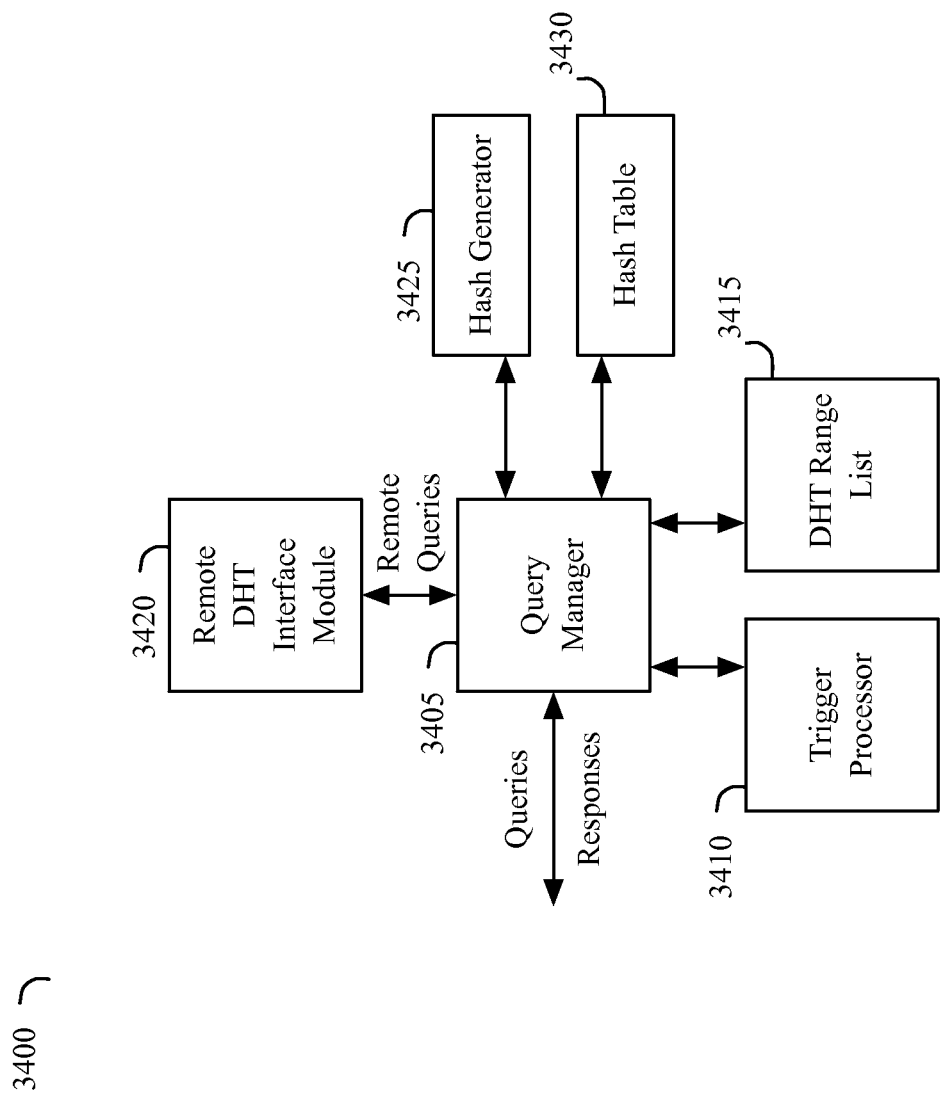
FIG. 34 conceptually illustrates a DHT storage structure of a NOS instance of some embodiments.

FIG. 34 illustrates a DHT storage structure 3400 of a single NOS instance for some embodiments of the invention. The DHT storage structure 3400 enables controller instances to share information efficiently and enables system administrators to expand controller instance data storage capabilities in a scalable manner. As shown in FIG. 34, a DHT storage structure includes a query manager 3405, a trigger processor 3410, a DHT range list 3415, a remote DHT interface module 3420, a hash generator 3425, and a hash table 3430.

In several embodiments described below, the query manager 3405 receives queries only from other DHT storage structures and from the import and export modules of the controller instance that includes the DHT storage structure 3400. In other embodiments, the query manager 3405 also receives queries from applications running on top of the NOS instances.

The query manager 3405 interacts with the other software modules contained inside of the DHT storage structure 3400 in order to process queries. In some embodiments, the query manager 3405 can handle "put" and "get" queries. When the query manager 3405 receives a "put" query, it adds or changes a data record in the hash table 3430. When the query manager 3405 receives a "get" query, the query manager 3405 retrieves a data record from the hash table 3430 and returns this data record to the querying entity.

The query manager in some embodiments can receive a query with a key value for a record in the hash table. In some of these embodiments, the query in some cases can also include a hash value that corresponds to the hash of the key value, whereas the query in other cases does not include a hash value.

The hash generator 3425 is used by the query manager 3405 to generate a hash value for a received key value. For instance, when query manager receives a query that does not specify a hash value, it sends the query along with the received key value. The hash generator 3425 contains and executes one or more hash functions on the received key value to generate a hash value. The hash generator 3425 sends hash values that it generates to the query manager 3405.

The DHT range list 3415 contains a list of hash value ranges, with different ranges being associated with different DHT instances of different controller instances. The CM (e.g., CM 2635) periodically updates the DHT range list 3415, as described above and further described below. The query manager 3405 uses the DHT range list to identify the DHT instance that contains a DHT record associated with a hash value that it receives from the hash generator 3425 or receives with the query. For a particular hash value, the DHT range list 3415 might specify the current DHT instance (i.e., the DHT instance whose query manager is currently processing the DHT query) as the location of the corresponding DHT record, or alternatively, it can specify another DHT instance that runs in another controller instance as the location of the desired DHT record.

When the DHT range list 3415 shows that the hash value falls within a range of another DHT instance, the query manger 3405 uses its remote DHT module interface to pass the query to the remote DHT that contains the desired DHT record. In some embodiments, the query manager 3405 also sends the hash value the local hash generator 3425 so that the remote hash generator does not need to re-compute this hash value. After processing the query, the remote DHT data structure will send the requested data record to the requesting query manager 3405 through its remote DHT interface module 3420. Thus, the remote DHT interface module 3420 serves two functions. First, the remote DHT interface module 3420 sends queries, data records, and hash values to remote DHT storage structures. Second, the remote DHT interface module 3420 receives queries, data records, and hash values from remote DHT storage structures. The remote DHT interface module 3420 enables the query managers of all the DHT storage structures in the network to share the information stored in their local hash tables.

When the DHT range list 3415 shows that a hash value is stored locally, the query manager 3405 will use the hash value to access its local hash table 3430 for the hash record associated with the hash value. The hash table 3430 contains several data records and a hash value for each data record. When this table receives a hash value, it returns the data record associated with the hash value.

The trigger processor 3410 handles trigger notifications when the query manager modifies a record in the local hash table 3430. Whenever the query manager writes a new value in the hash table, the hash table in some embodiments returns a set of identities for a set of modules to notify in the same or different controller instances. The trigger processor receives this set of identities. It then notifies the associated modules of the change to the DHT record. If needed, the modules then query the DHT instance to retrieve the new value for the DHT record.

Other embodiments may implement the triggering process differently. For instance, in conjunction with or instead of triggering based on writes to the hash table, the triggering in some embodiments is performed based on deletes from the hash table. Also, instead of just calling back modules to notify them that a DHT record value has changed, some embodiments send the new value of the DHT record along with the notification to the modules that are called back.

Figure 35:
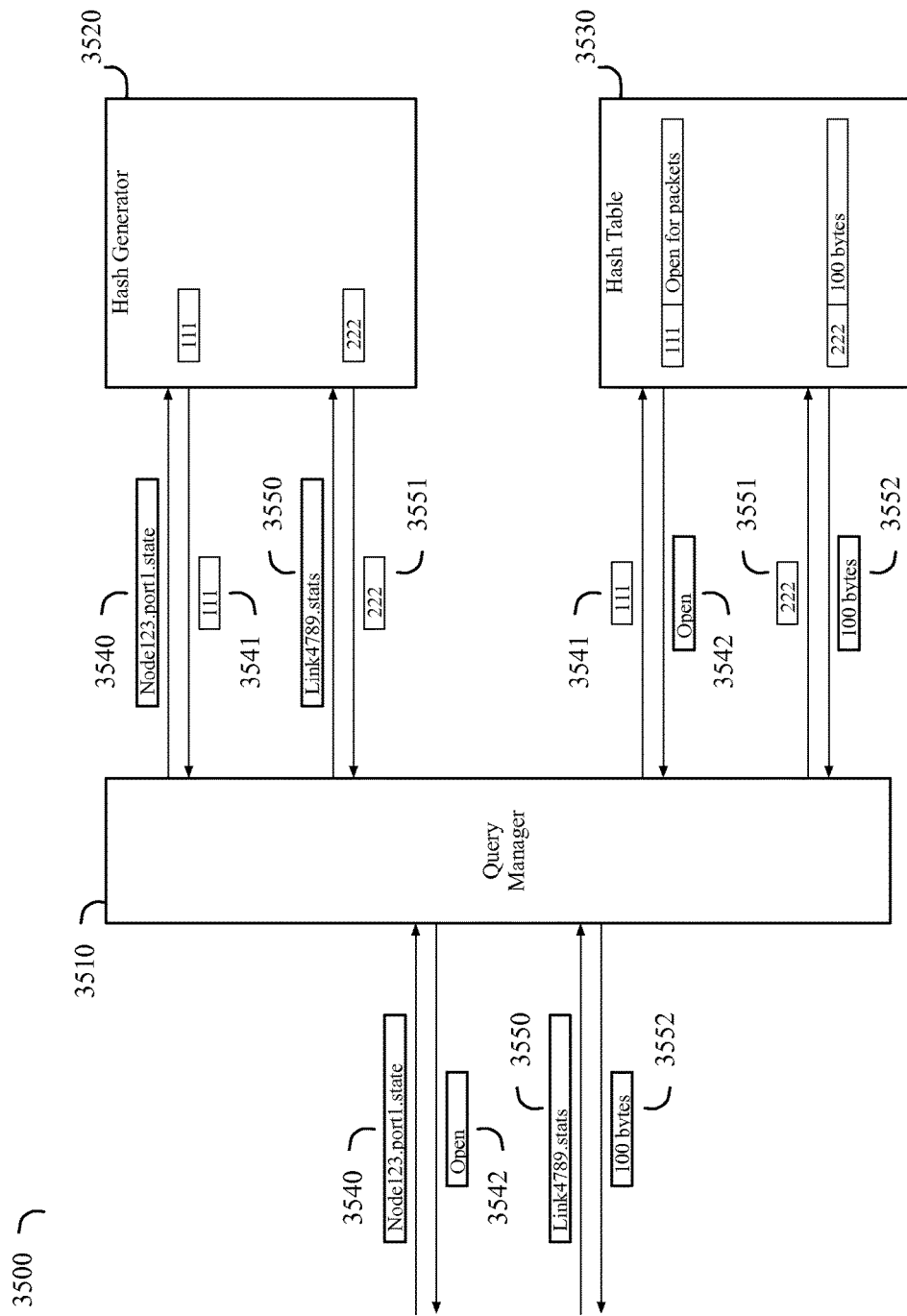
FIG. 35 conceptually illustrates operation of a DHT storage structure according to some embodiments of the invention.
Figure 36:
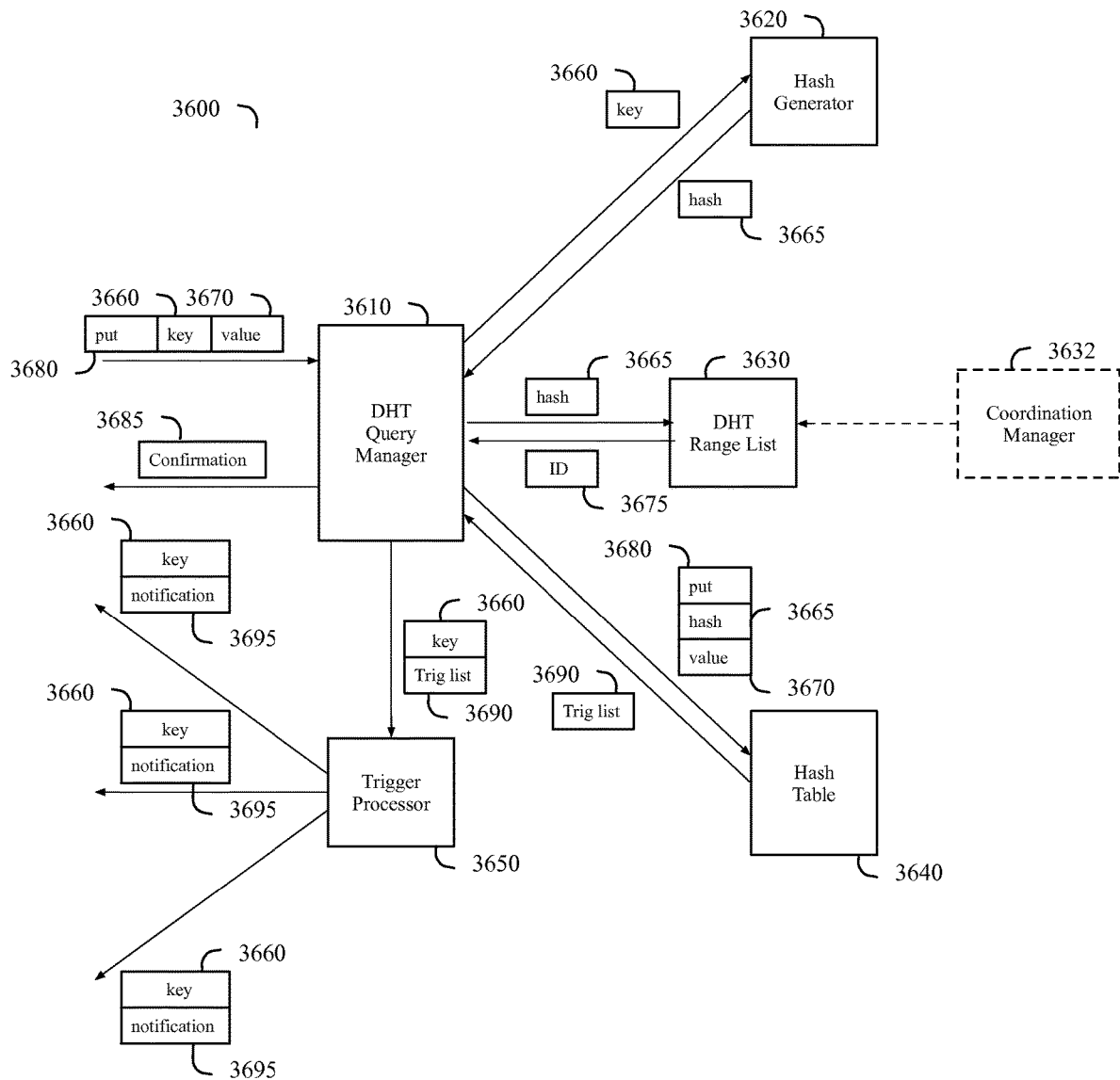
FIGS. 36 and 37 illustrate examples of accessing a DHT range list and processing triggers.
Figure 37:
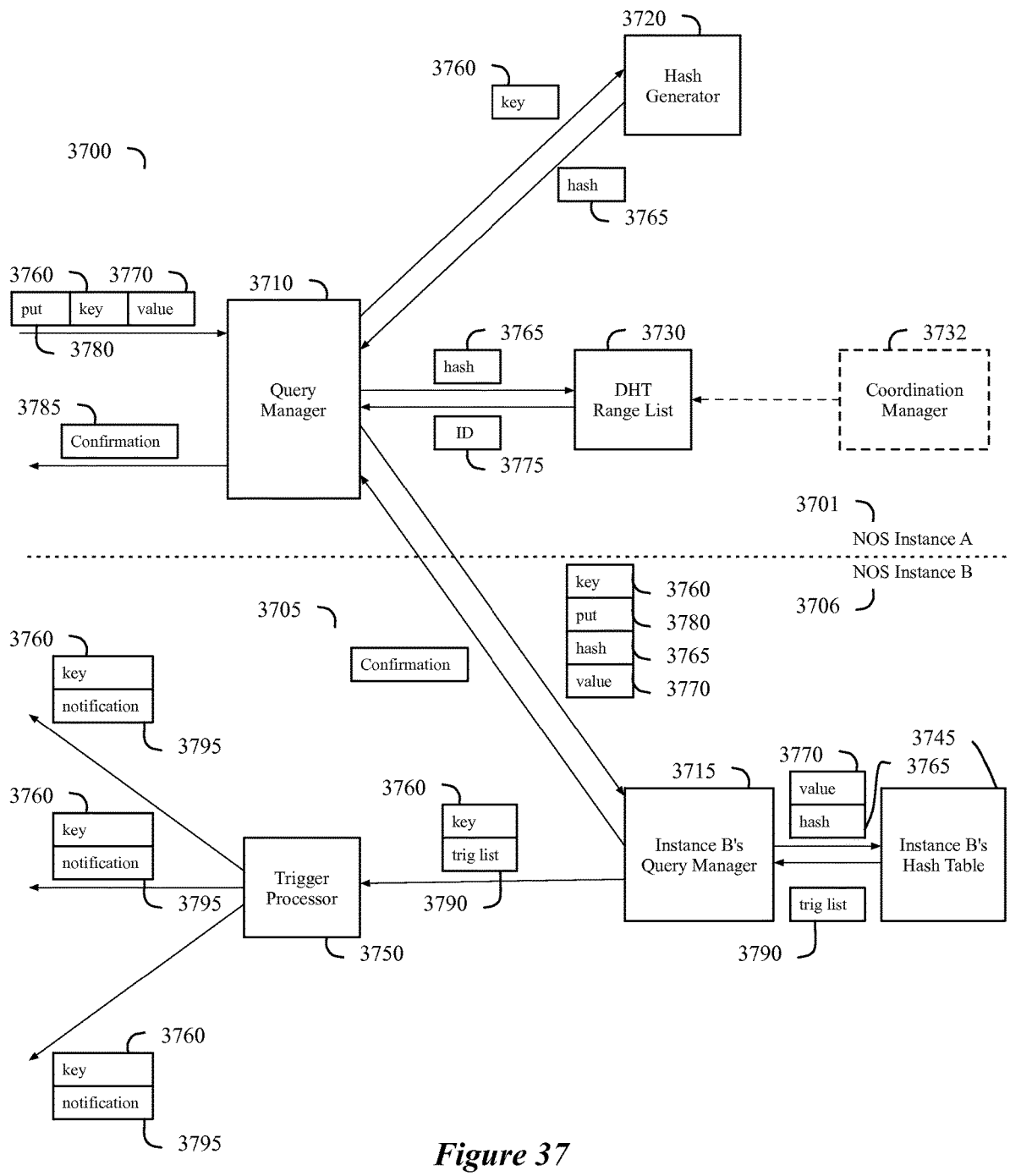

The description of the operation of the DHT storage structure 3400 will now be described in reference to FIGS. 35, 36, and 37. FIG. 35 illustrates a simple example of the operation of the DHT storage structure 3400 for the case where the DHT record being retrieved is stored locally within the DHT storage structure. This example is further simplified by ignoring access to the DHT range list and the handling of triggers. FIGS. 36 and 37 subsequently provide more elaborate examples that show how the DHT range list is accessed and how the triggers are processed.

FIG. 35 shows examples of accessing two records. The example DHT retrieval operation 3500 shown in FIG. 35 contains the modules query manager 3510, hash generator 3520, and hash table 3530. In this example, the query manager 3510 receives two "get" queries that include keys Node123.port1.state 3540 and Link4789.stats 3550 from one or two different requesting modules at two different instances in time. The query manager 3510 sends each of the keys, Node123.port1.state 3540 and Link4789.stats 3550, to the hash generator 3520. The hash generator 3520 generates hash value 3541 (which is 111) for the key Node123.port1.state 3540, and generates hash value 3551 (which is 222) for the key Link4789.stats 3550. The hash generator 3520 sends each hash value 3541 or 3551 to the query manager 3510. Using each received hash value, the query manager 3510 queries the hash table 3530. The hash table 3530 looks up the data records at hash indexes 111 and 222. The hash table 3530 then returns data record Open 3542 for hash index 111, and data record 100 bytes for hash index 222. The query manager 3510 finishes each query operation by returning the data record (i.e., Open 3542 or 100 bytes 3552) to the respective requesting module.

FIG. 36 illustrates an example of a "put" operation by a DHT storage structure 3600. To keep this example simple, the put operation will entail modifying a record in the local hash table of the DHT storage 3600. To illustrate this example, this figure shows DHT query manager 3610, hash generator 3620, DHT range list 3630, coordination manager 3632, hash tables 3640, and trigger processor 3650.

In this example, the query manager 3610 initially receives from a querying entity a put query 3680 includes a key 3660 and a value 3670. The query manager 3610 then sends the key 3660 to the hash generator 3620, which generates hash 3665 and returns this hash to the query manager 3610. The query manager 3610 then provides the hash 3665 to the DHT range list 3630. The DHT range list 3630 then identifies a range of hash values in which the hash 3665 falls. FIG. 36 illustrates that the CM 3632 periodically updates the DHT range list. The CM is shown with dashed lines in this example as it is not one of the components of the DHT and its operation is not in the same sequence as the other operations illustrated in FIG. 36.

Based on the range that the DHT range list 3630 identifies, it identifies a corresponding controller instance whose DHT instance contains the desired DHT record (i.e., the record corresponding to the generated hash value). The DHT range list 3630 returns the identification 3675 of this controller instance to the query manager 3610. In this case, the identified controller instance is the local controller instance.

Hence, the query manager 3610 next performs a put query on its local hash table 3640. With this query, the query manager 3610 sends the hash 3665, and the value 3670 to write in the corresponding DHT record in the hash table 3640. Because the put query 3680 is a put command, the hash table 3640 writes the value 3670 in the hash table. If the accessed DHT record did not exist before this put query, the hash table generates a DHT record based on this query and stores in this record the hash 3665 along with the value 3670.

In this example, the modified DHT record has a set of notification triggers (i.e., a set of identities of modules that need to be notified). Accordingly, after modifying its DHT record, the hash tables 3640 sends the list 3690 of modules that need to be notified of the DHT record modification. The query manager 3610 then sends the key 3660 that identifies the modified record along with the trigger list 3690 to the trigger processor 3650. The trigger processor 3650 processes the triggers in the trigger list 3690 by sending a notification 3695 to all entities that have registered triggers (i.e., all modules on the trigger list 3690) that the DHT record (with the key 3660) has been modified. The three arrows exiting the trigger processor 3650 represent the key 3660 and notification 3695 are being sent to three registered modules in this example. In addition to sending the key and trigger list to the trigger processor, the query manager also sends a confirmation 3685 of the completion of the Put request to the source that sent it the Put query.

FIG. 37 illustrates another example of a "put" operation by a DHT storage structure 3700. In this example, the put operation will entail modifying a record in a remote hash table of the DHT storage 3700. DHT storage structure 3700 is a component of the NOS instance A 3701, and this DHT storage structure will communicate with DHT storage structure 3705, which is a component of the NOS instance B 3706. To illustrate this example, this figure shows a first query manager 3710, a second query manager 3715, a hash generator 3720, a DHT range list 3730, a CM 3732, a hash table 3745 and a trigger processor 3750.

The example begins when the query manager 3710 receives a put query 3780 that includes key 3760 and value 3770. The query manager 3710 then sends the key 3760 to the hash generator 3720. The hash generator 3720 generates hash 3765 and sends the hash 3765 to the query manager 3710.

The query manager 3710 then sends the hash 3765 to the DHT range list 3730. As was the case in FIG. 36, the DHT range list 3730 is periodically updated by the CM 3732. The DHT range list 3730 identifies a range of hash values in which the hash 3765 falls. Based on the range that the DHT range list 3730 identifies, it identifies a corresponding controller instance whose DHT instance contains the desired DHT record (i.e., the record corresponding to the generated hash value). The DHT range list 3730 returns the identification 3775 of this controller instance to the query manager 3710. In this case, the identified controller instance is the remote controller instance 3706.

Because instance 3706 manages the desired DHT record, the query manager 3710 relays the key 3760, put query 3780, hash 3765, and value 3770 to the query manager 3715 of the instance 3706. The query manager 3715 then sends the value 3770 and the hash 3765 to the hash table 3745, which then writes value 3770 to its record at hash 3765.

In this example, the modified DHT record has a set of notification triggers. Accordingly, after modifying its DHT record, the hash tables 3745 sends to the query manager 3715 the trigger list 3790 of modules that need to be notified of the DHT record modification. The query manager 3715 then sends key 3760 and trigger list 3790 to the trigger processor 3750. The trigger processor 3750 processes the triggers 3790 by sending a notification 3795 to all entities that have registered triggers (i.e., all modules on the trigger list 3790) that the DHT record (with key 3760) has been modified. The three arrows exiting the trigger processor 3750 represent the key 3760 and notification 3795 are being sent to three registered modules in this example.

In addition to sending the key and trigger list to the trigger processor, the query manager of instance B also sends a confirmation 3705 of the completion of the Put request to the query manager 3710 of the instance A. The query manager 3710 then relays this confirmation 3785 to the source that sent it the Put query.

Figure 38:
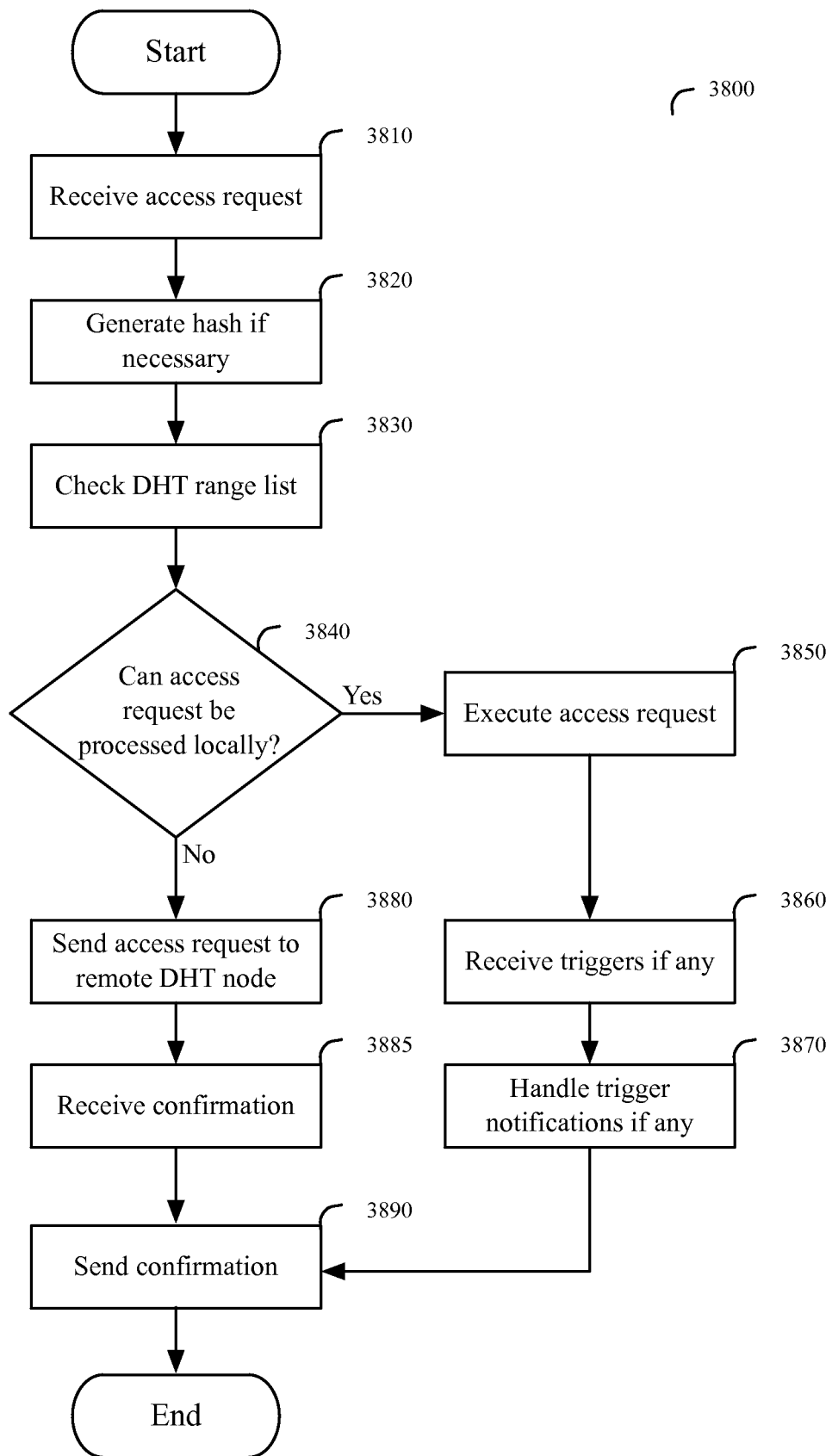
FIG. 38 conceptually illustrates a process of some embodiments that a DHT query manager performs.

FIG. 38 conceptually illustrates a process 3800 that the DHT query manager 3405 performs in some embodiments of the invention. In some embodiments, the query manager performs this process each time it receives a DHT record access request. An access request may require the query manager to create, retrieve, or update records or triggers inside the DHT storage structure.

As shown in FIG. 38, the process 3800 initially receives (at 3810) an access request for a record within the DHT. In some embodiments, the process 3800 receives an access request from an import module 3240 or an export module 3230 of the transfer modules 3220. In some embodiments, the process receives an access request from another query manager on a remote NOS instance's DHT as shown in FIG. 37. After 3810, the process generates (at 3820) a hash value for the access request if necessary. In some embodiments, the hash value does not need to be generated when it is provided in the access request in some embodiments, but when the access request does not include a hash value, it is necessary for the process to generate a hash value. The process generates the hash value from information contained in the access request. In some embodiments, the process hashes the key that identifies the data to be accessed.

The process 3800 then uses the hash value it generated (at 3820) or received (at 3810) with the access request to check (at 3830) the DHT range list. The DHT range list contains a list of hash ranges associated with DHT instances and is locally cached by the query manager 3405. If a hash value is within a DHT range for a DHT instance on the DHT range list, then that DHT instance can process an access request for said hash value.

After referencing the DHT range list (at 3830), the process determines (at 3840) whether the access request can be processed locally. If so, the process executes (at 3850) the access request. In some embodiments, the execution of the access request consists of the process performing a "put" function or a "get" function on the records requested by the access request. After executing the access request 3850, the process receives (at 3860) triggers from the local DHT records on data that the access request operated on, if any. A trigger is list of entities that the query manager must notify if the query manager accesses the record associated with the trigger. In some embodiments, the entities that could have triggers on DHT data are the notification processors 2610, the transfer modules 2630, or the application interface 2605. In some embodiments, the triggers are stored with the local DHT records as shown in FIG. 30. After 3860, the process handles (at 3870) trigger notifications, if the process received (at 3860) any triggers. The process handles (at 3870) the trigger notifications by sending notifications to any entities on the triggers. After 3870, the process transitions to 3890, which will be explained below.

When the process determines (at 3840) that the access request cannot be processed locally, the process sends (at 3880) the access request to the remote DHT node identified (at 3830) on the DHT range list. The process sends (at 3880) the access request to the remote DHT node including any hash values received (at 3810) or generated (at 3820). After sending the access request to a remote DHT node 3880, the process transitions to 3885 to wait for a confirmation from the remote DHT node. Once the process receives (at 3885) confirmation from the remote DHT node, the process transitions to 3890.

At 3890, the process sends a confirmation to the source that sent it the query. When the query is a Put query, the confirmation confirms the completion of the query. However, when the query is a Get query, the confirmation relays the data retrieved from the DHT. Also, in cases that the remote DHT node does not return a confirmation (at 3885) within a timely manner, the process 3800 has an error handling procedure to address the failure to receive the confirmation. Different embodiments employ different error handling procedures. In some embodiments, the error handler has the DHT node re-transmit the query several times to the remote node, and in case of repeated failures, generate an error to the source of the query and/or an error for a system administrator to address the failure. Other embodiments, on the other hand, do not re-transmit the query several times, and instead generate an error to the source of the query and/or an error for a system administrator to address upon failure to receive confirmation.

B. PTD

Figure 39:
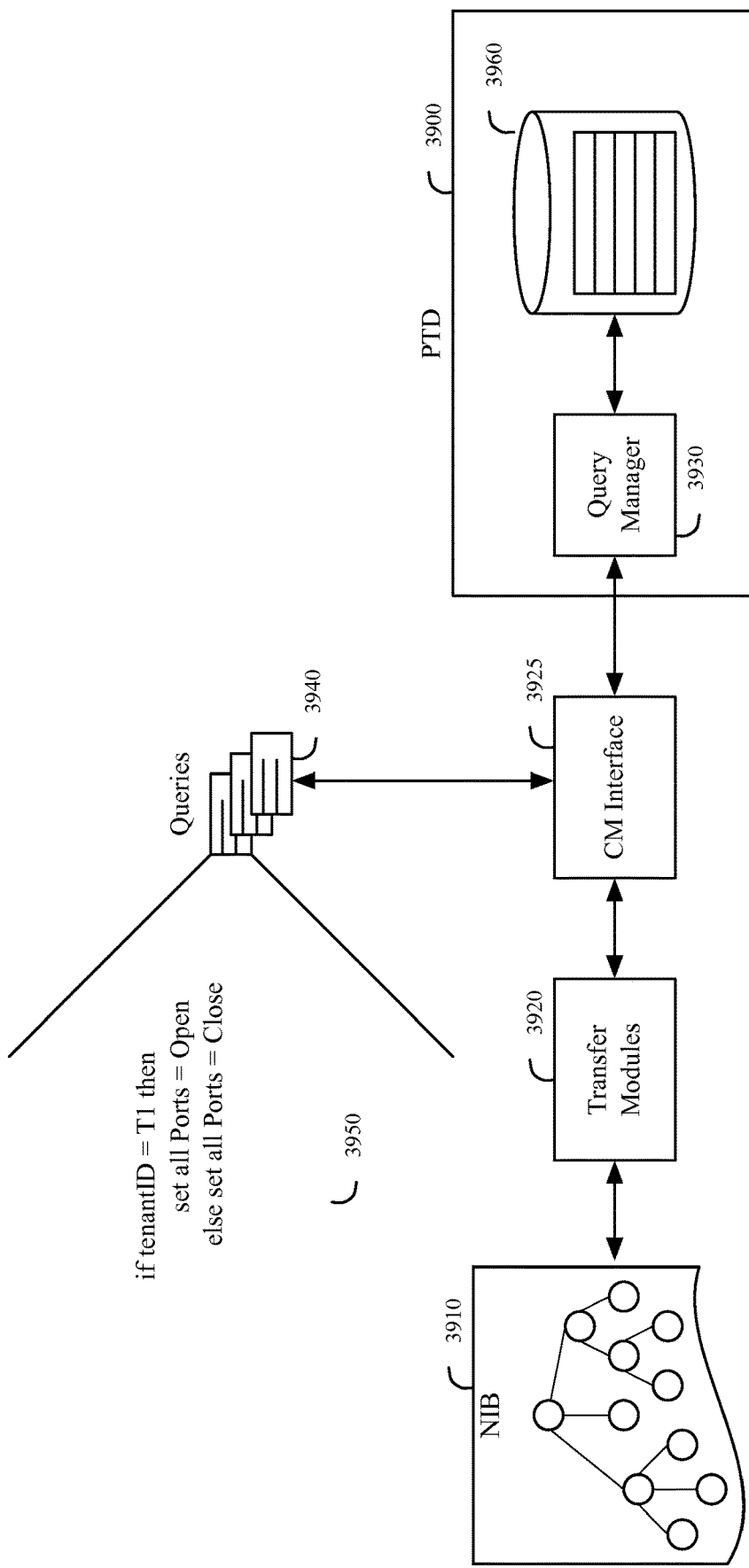
FIG. 39 conceptually illustrates a PTD storage structure of some embodiments.

FIG. 39 conceptually illustrates an example of a PTD storage structure 3900 for some embodiments of the invention. As described above, the PTD is a software database stored on a non-volatile storage medium (e.g., disk or a non-volatile memory) in some embodiments of the invention. In some embodiments, the PTD is a commonly available database, such as MySQL or SQLite.

As described above and as illustrated in FIG. 39, data is exchanged between a NIB 3910 and the PTD 3900 through transfer modules 3920 and CM interface 3925. In some embodiments, the NIB 3910 and the PTD 3900 that exchange data through these intermediate modules can be in the same controller instance (e.g., the NIB and PTD are part of the master PTD controller instance), or the NIB and PTD can be part of two different controller instances. When the NIB and PTD are part of two different controller instances, the CM interface 3925 is an amalgamation of the CM interface of the two controller instances.

As further illustrated in FIG. 39, the PTD 3900 includes a query manager 3930 and a set of database tables 3960. In some embodiments, the query manager 3930 receives queries 3940 from the CM interface 3925 and provides responses to these queries through the CM interface. In some embodiments, the PTD 3900 and its query manager 3930 can handle complex transactional queries from the CM interface 3925. As a transactional database, the PTD can undo a series of prior query operations that it has performed as part of a transaction when one of the subsequent query operations of the transaction fails.

Some embodiments define a transactional guard processing (TGP) layer before the PTD in order to allow the PTD to execute conditional sets of database transactions. In some embodiments, this TGP layer is built as part of the CM interface 3925 or the query manager 3930 and it allows the transfer modules 3920 to send conditional transactions to the PTD. FIG. 39 illustrates an example of a simple conditional transaction statement 3950 that the query manager 3930 can receive. In this example, all the ports of a tenant "T1" in a multi-tenant server hosting system are set to "open" if the Tenant ID is that of tenant T1. Otherwise, all ports are set to close.

In some embodiments, the controller instances maintain identical data records in the NIBs and PTDs of all controller instances. In other embodiments, only a portion of the NIB data is replicated in the PTD. In some embodiments, the portion of NIB data that is replicated in the PTD is replicated in the NIBs and PTDs of all controller instances.

Figure 40:
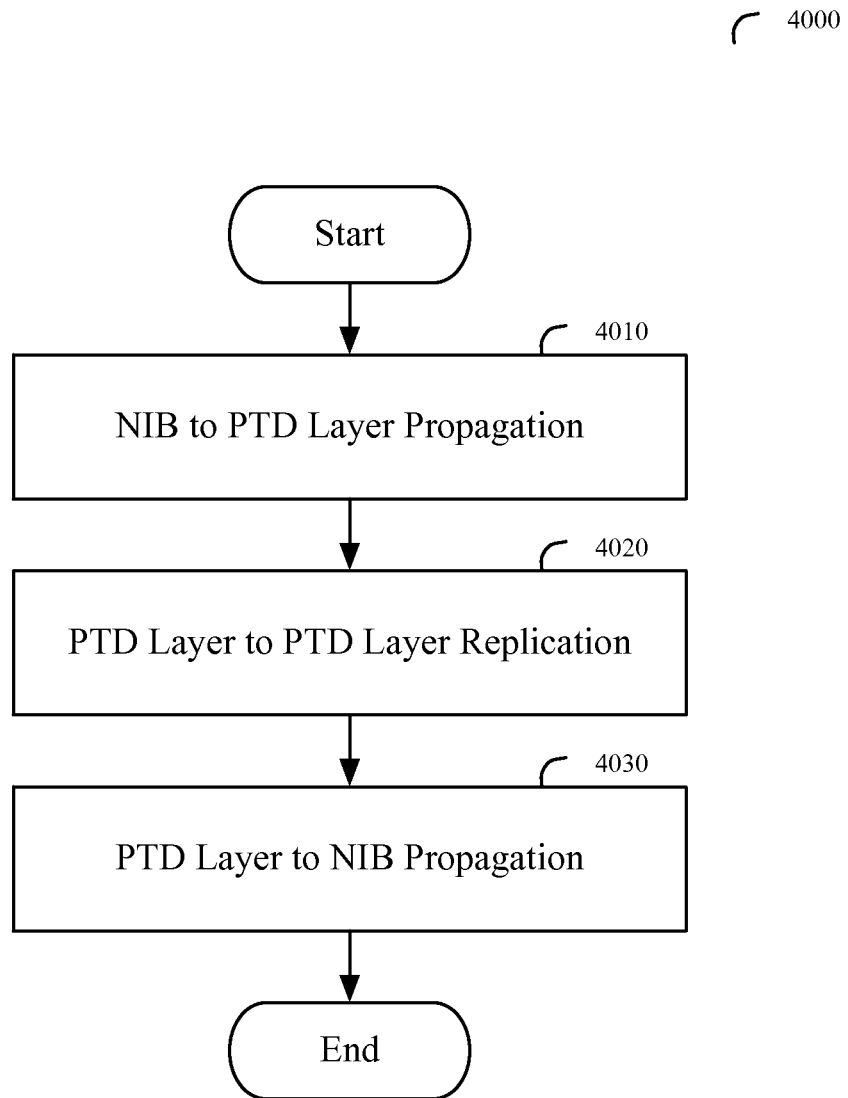
FIG. 40 conceptually illustrates a NIB/PTD replication process of some embodiments.

FIG. 40 conceptually illustrates a NIB/PTD replication process that some embodiments perform in order to ensure data consistency amongst all the NIBs and PTDs of all controller instances for the portion of the NIB storage layer that is replicated in the PTD storage layer. The process 4000 is performed each time a modification is made to a replicated portion of a NIB of one controller instance.

As shown in FIG. 40 the process 4000 initially propagates (4010) any changes made to the NIB layer to the PTD layer.

In some embodiments, the data is translated, transformed, or otherwise modified when it is transferred from the NIB layer to the PTD layer, while in other embodiments the data is transferred from the NIB layer to the PTD layer in the same format. Also, in some embodiments, the change to the NIB is propagated to the PTD in the same controller instance as the NIB. However, as described below, some embodiments propagate the NIB change first to a master PTD instance.

After 4010, the process replicates (at 4020) the change across the PTDs of the PTD layer. In some embodiments, the change is replicated across all PTDs by having the PTD of the instance that received the NIB change notify the other PTDs. However, as described below, the process 4000 of some embodiments employs the master PTD to notify all other slave PTDs to replicate the change in their PTDs.

After the process completes the PTD replication operation 4020, the process propagates (at 4030) the NIB change to all the NIBs of all other controller instances. In some embodiments, this process is performed by each controller instance's transfer modules retrieving the modified PTD record from its local PTD after being locally notified by its PTD storage layer (e.g., by the local CM interface of that instance) of the local PTD change. However, as mentioned above, the process 4000 in some embodiments replicates the NIB change in all the NIBs by having the master PTD notify each instance's transfer module of the PTD layer change, and then supplying each instance's NIB with the modified record. As further described above, the master PTD supplies the modified record with the notification of PTD layer change to each NIB instance in some embodiments, while in other embodiments, the master PTD supplies the modified record to each NIB instance after it notifies the NIB instance and the NIB instance in response queries the master PTD for the modified record. After 4030, the process ends.

Figure 41:
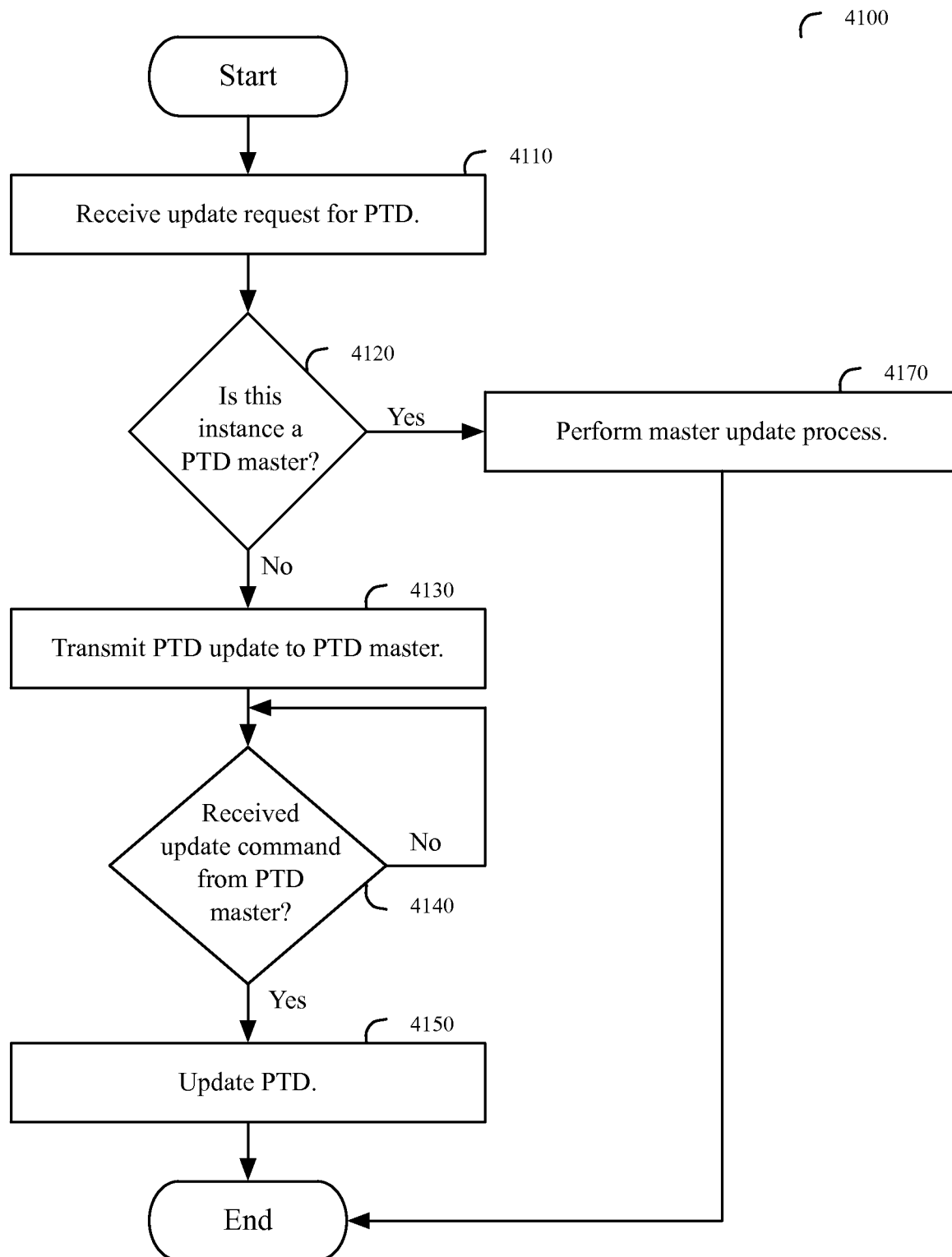
FIG. 41 conceptually illustrates a process of some embodiments that a PTD instance performs.

FIG. 41 conceptually illustrates a process 4100 that a PTD instance performs in some embodiments when it receives a request to update one of its PTD records. This process is partly performed by the PTD instance's CM interface and partly by its query manager. As shown in FIG. 41, the process 4100 starts (at 4110) when it receives a PTD update request. In some embodiments, the update request comes (at 4110) from the NIB export module of the PTD's controller instance. The update request contains a request to add, modify, or delete PTD records.

After 4110, the process determines (at 4120) whether this instance is the master PTD instance. A slave PTD instance is PTD without the authority to write to that PTD without direction from a master PTD instance, while a master PTD instance is a PTD that has the authority to make updates to its PTD and distributes updates to the PTDs of the slave PTD instances.

When the process 4100 determines that it is the master PTD, it initiates (at 4170) the master update process, and then terminates. The master update process will be described below by reference to FIG. 42. When the process determines (at 4120) that it is not the master PTD, the process transmits (at 4130) the PTD update request to the CM interface of the master PTD instances. The process then waits (at 4140) until the process receives an update command from the master PTD instance. When the process receives (at 4140) an update command from the master PTD instance, the process sends (at 4150) to its controller instance's NIB import module a PTD update notification, which then causes this module to update its NIB based on the change in the PTD. In some embodiments, this PTD update notification is accompanied with the updated record, while in other embodiments, this notification causes the import module to query the master PTD to retrieve the updated record. After 4150, the process ends.

For some embodiments, the wait state 4140 in FIG. 41 is a conceptual representation that is meant to convey the notion that the slave PTD does nothing further for a PTD update request after it notifies the master PTD and before it receives a PTD update request from the master. This wait state is not meant to indicate that the PTD slave instance has to receive a PTD update request from the master. In some embodiments, the PTD slave instance sends to the master a PTD update request if it does not hear from the master PTD to make sure that the master PTD receives the PTD update request. If for some reason, the PTD master determines that it should not make such a change, it will notify the slave PTD instance in some embodiments, while in other embodiments the slave PTD instance will stop notifying the master of the particular PTD update request after a set number of re-transmissions of this request.

Figure 42:
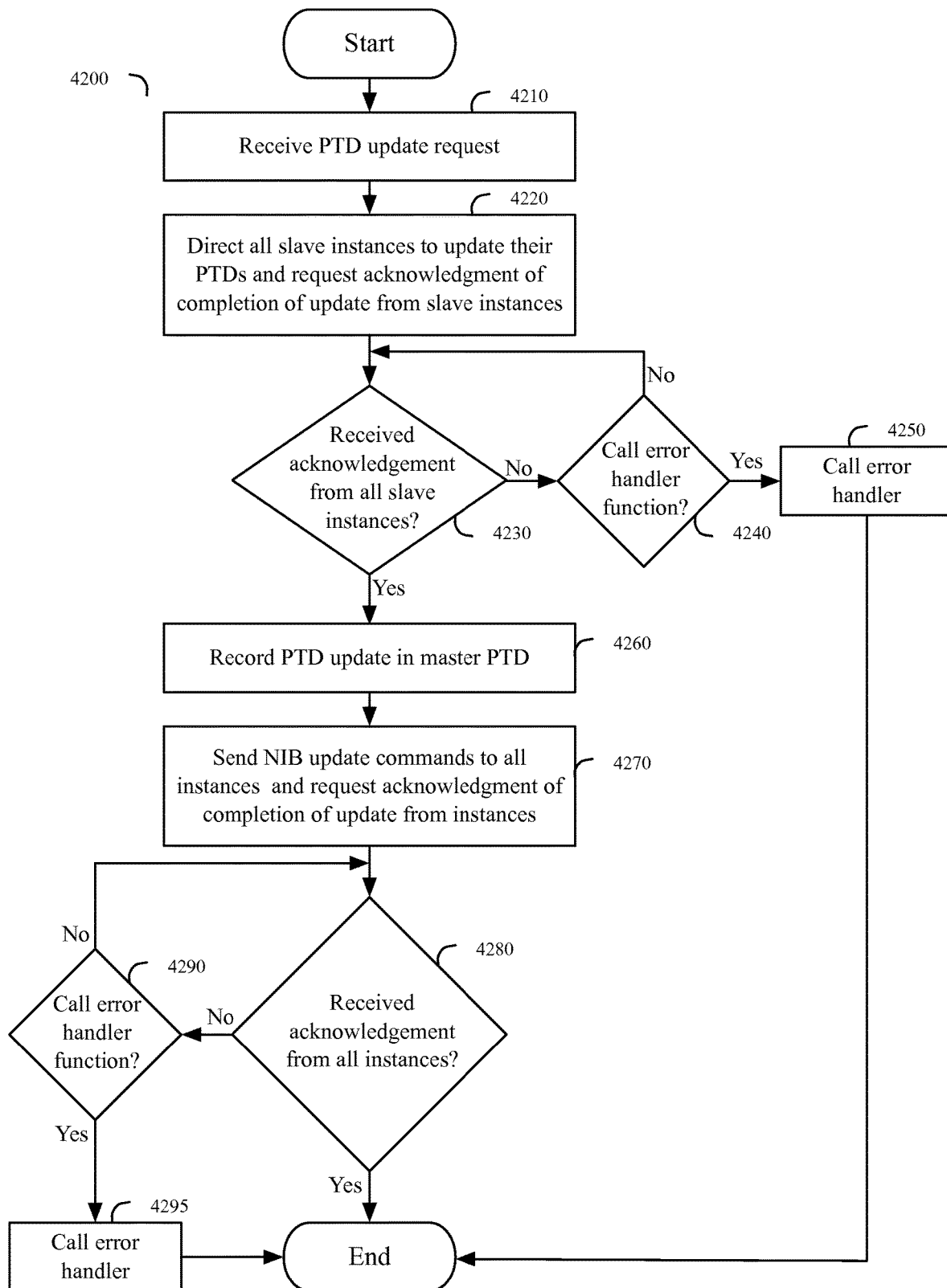
FIG. 42 conceptually illustrates a master update process of some embodiments that a master PTD instance performs.

FIG. 42 conceptually illustrates a master update process 4200 that a master PTD instance performs when updating the PTDs of the master PTD instance and the slave PTD instances. This process is partly performed by the master PTD instance's CM interface and partly by its query manager. This process ensures that all PTDs are consistent by channeling PTD updates through the master PTD instance's CM interface.

As shown in FIG. 42, the process 4200 initially receives (at 4210) a PTD update request. The PTD update request can come from the process 4100 of the master PTD instance or of another slave PTD instance. The PTD update request can comprise a request to add, modify, or delete PTD records. In some embodiments, the PTD is a database (e.g., SQLite) that supports complex, transactional queries. Where the PTD is a database, the PTD update request can comprise a complex, transactional database query.

After 4210, the process directs (at 4220) the slave PTD instances to update their PTDs and the process requests acknowledgment of completion of the PTD update from all slave PTD instances. In some embodiments, the direction to update PTDs is sent from the master PTD instance's CM interface to the CM interfaces of the slave PTD instances, and the master PTD instance's CM interface will receive acknowledgment of the completion of the PTD update from the slave PTD instances' CM interfaces.

After 4220, the process in some embodiments determines (at 4230) whether it has received acknowledgement from all slave instances of completion of the PTD update process. Instead of requiring acknowledgments from all slave instances, the process 4200 of some embodiments only requires (at 4230) acknowledgments from a majority of slave instances.

When the process determines (at 4230) that it has not yet received acknowledgement from a sufficient number of slave instances (e.g., from all slave instances or a majority of slave instances), the process determines (at 4240) whether to call an error handler. If not, the process returns to 4230 to wait for acknowledgements from the slave instances. Otherwise, the process calls (at 4250) the error handler to address the lack of acknowledgement from the slave PTDs. In some embodiments, the error handler flags the unresponsive slave PTDs for a system administrator to examine to determine the reason for their lack of response. In some embodiments, the process 4200 re-transmits the PTD update command a set number of times to each unresponsive slave instance, before calling the error handler to address these unresponsive slave instances. After calling the error handler (at 4250), the process ends.

When the process determines (at 4230) that it has received acknowledgement from a sufficient number of slave instances (e.g., from all slave instances or a majority of slave instances), the process transitions to 4260. At 4260, the process records the PTD update in its master PTD. It then sends (at 4270) a PTD update notification to all NIB import modules (including the import module of the master PTD controller) to update their NIBs based on the received NIB modification and requests acknowledgement of completion of those NIB update from a sufficient number instances. This PTD update notification causes each NIB import module to update its NIB based on the change in the PTD. In some embodiments, this PTD update notification is accompanied with the updated record, while in other embodiments, this notification causes the import module to query the master PTD to retrieve the updated record. In some embodiments, the process also sends the NIB import module of its controller instance a PTD update notification, in order to cause this import module to update its NIB. Alternatively, the process 4200 makes the modifications to its NIB at 4220 instead of at 4270 in some embodiments.

At 4280, the process determines whether it has received acknowledgement from all slave instances of the completion of the NIB update process. If so, the process ends. Otherwise, the process determines (at 4290) whether to call an error handler. If not, the process returns to 4280 to wait for acknowledgements from the slave instances. When the process determines (at 4290) that it should call the error handler (e.g., that sufficient time has passed for it to call an error handler), the process calls (at 4295) the error handler to address the lack of acknowledgement from the slave instances. In some embodiments, the error handler flags the unresponsive slave instances for a system administrator to examine to determine the reason for their lack of response. In some embodiments, the process 4200 re-transmits the NIB update command a set number of times to each unresponsive slave instance, before calling the error handler to address these unresponsive slave instances. Also, in some embodiments, the process 4200 does not request acknowledgments at 4270 or wait for such acknowledgments at 4280. In some of these embodiments, the process 4200 simply ends after sending the PTD update notification at 4270.

FIG. 43 presents a data flow diagram that shows the PTD replication process of some embodiments in eight stages. This process serves to ensure complete consistency in the PTD layer by channeling all PTD changes through the master PTD instance. In this example, each stage shows four PTD instances, which include a first slave PTD instance 4350, a master PTD instance 4360, a PTD-less instance 4370, and a second slave PTD instance 4380. Each instance contains a NIB 4361, a transfer module layer 4362, a coordination manager 4363, and a CM interface 4364. The master instance 4360 also has a master PTD 4365. Each slave instance has a slave PTD 4351. The PTD-less instance 4370 has no PTD.

As shown in FIG. 43, the first stage 4305 shows four PTD instances at steady state. In the second stage 4310, the slave instance's transfer module 4362 detects a change in the NIB and transfers 4392 that change to the slave instance's CM interface 4364. In the third stage 4315, the CM interface 4364 of the slave instance 4350 sends notification 4393 to the CM interface 4364 of the master instance 4360 of the change the slave is trying to push to the PTD layer. In some embodiments, the slave instance's transfer module 4362 directly contacts the master instance's CM interface 4364 when it detects a change in the NIB during the second stage. In such a case, the third stage 4315 would not be needed as the master's CM interface would be notified directly during the second stage 4310.

In the fourth stage 4320, the CM interface 4364 of the master instance 4360 pushes the requested change to the master PTD 4394. In this case the master instance 4360 approved the change and wrote it to the master PTD. However, in other cases, the master could have refused the change and sent an error message back to the slave controller instance 4350.

The fifth stage 4325 shows the CM interface 4364 of the master instance 4360 sending notification 4395 to the CM interfaces of the slave instances 4350 and 4380 of the change that the master has made to the master PTD. In some embodiments, the master PTD sends the updated PTD record with its notification 4395 to the CM interfaces of the slave instances, while in other embodiments, the slave CM interfaces retrieve the updated PTD record from the master after receiving notification of the change from the master.

In the sixth stage 4330, the CM interfaces of the slave instances 4350 and 4380 write an update 4396 to change to their slave PTDs. In the seventh stage 4335, the CM interface 4364 of the master instance 4360 receives acknowledgements 4397 from the slave instances 4350 and 4380 that the slaves have performed the PTD change the master instance pushed to the slave instances during the fifth stage.

In the eighth stage 4340, the CM interface 4364 of the master instance pushes the change made to the PTD by sending a PTD update notification to the NIB import modules inside the transfer modules 4362 of all the controller instances 4250, 4260, 4270, and 4280. In some embodiments, the PTD update notification causes each NIB import module to update its NIB based on the change in the PTD. In some embodiments, this PTD update notification is accompanied with the updated record, while in other embodiments, this notification causes the import module to query the master PTD to retrieve the updated record. Also, in some embodiments, the master PTD does not send a PTD update notification to the NIB import module of the slave controller instance 4350 that detected the NIB change for some or all NIB changes detected by this slave controller instance.

C. NIB Replication Through DHT

As mentioned above, the controller instances replicate data records in the NIBs of all controller instances. In some embodiments, some of this replication is done through the PTD storage layer (e.g., by using the processes described in Section V.B. above, or similar processes) while the rest of this replication is done through the DHT storage layer.

Figure 44:
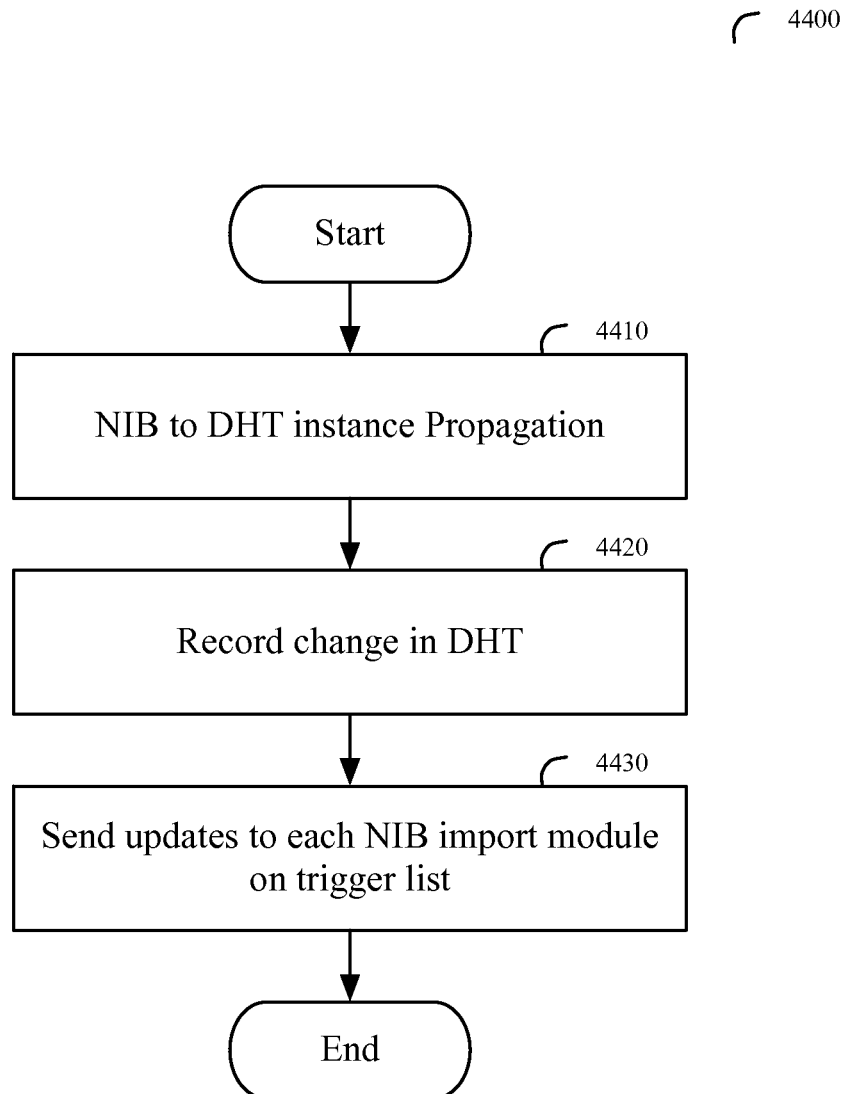
FIG. 44 conceptually illustrates a process of some embodiments that is used to propagate a change in a NIB instance to another NIB instances through a DHT instance.

FIG. 44 illustrates a process 4400 that is used in some embodiments to propagate a change in one NIB instance to the other NIB instances through a DHT instance. This process is performed by the DHT instance that receives a notification of a change in a NIB instance. As shown in FIG. 44, this process starts (at 4410) when this DHT instance receives notification that a NIB instance has changed a NIB record that has a corresponding record in the DHT instance. This notification can come from the export module of the NIB instance or from another DHT instance. This notification comes from the export module of the NIB instance that made the change, when the DHT instance that stores the corresponding record is the DHT instance that is within the same controller instance as the NIB instance that made the change. Alternatively, this notification come from another DHT instance, when the DHT instance that stores the corresponding record is not the DHT instance that is within the same controller instance as the NIB instance that made the change. In this latter scenario, the DHT instance within the same controller instance (1) receives the notification from its corresponding NIB export module, (2) determines that the notification is for a record containing in another DHT instance, and (3) relays this notification to the other DHT instance.

After 4410, the DHT instance then modifies (at 4420) according to the update notification its record that corresponds to the updated NIB record. Next, at 4430, the DHT instance retrieves for the updated DHT record a list of all modules to call back in response to the updating of the DHT record. As mentioned above, one such list is stored with each DHT record in some embodiments. Also, to effectuate NIB replication through the DHT storage layer, this list includes the identity of the import modules of all NIB instances in some embodiments. Accordingly, at 4430, the process 4400 retrieves the list of all NIB import modules and sends to each of these modules a notification of the DHT record update. In response to this update notification, each of the other NIB instances (i.e., the NIB instances other than the one that made the original modification that resulted in the start of the process 4400) update their records to reflect this modification. After 4430, the process 4400 ends.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 45:
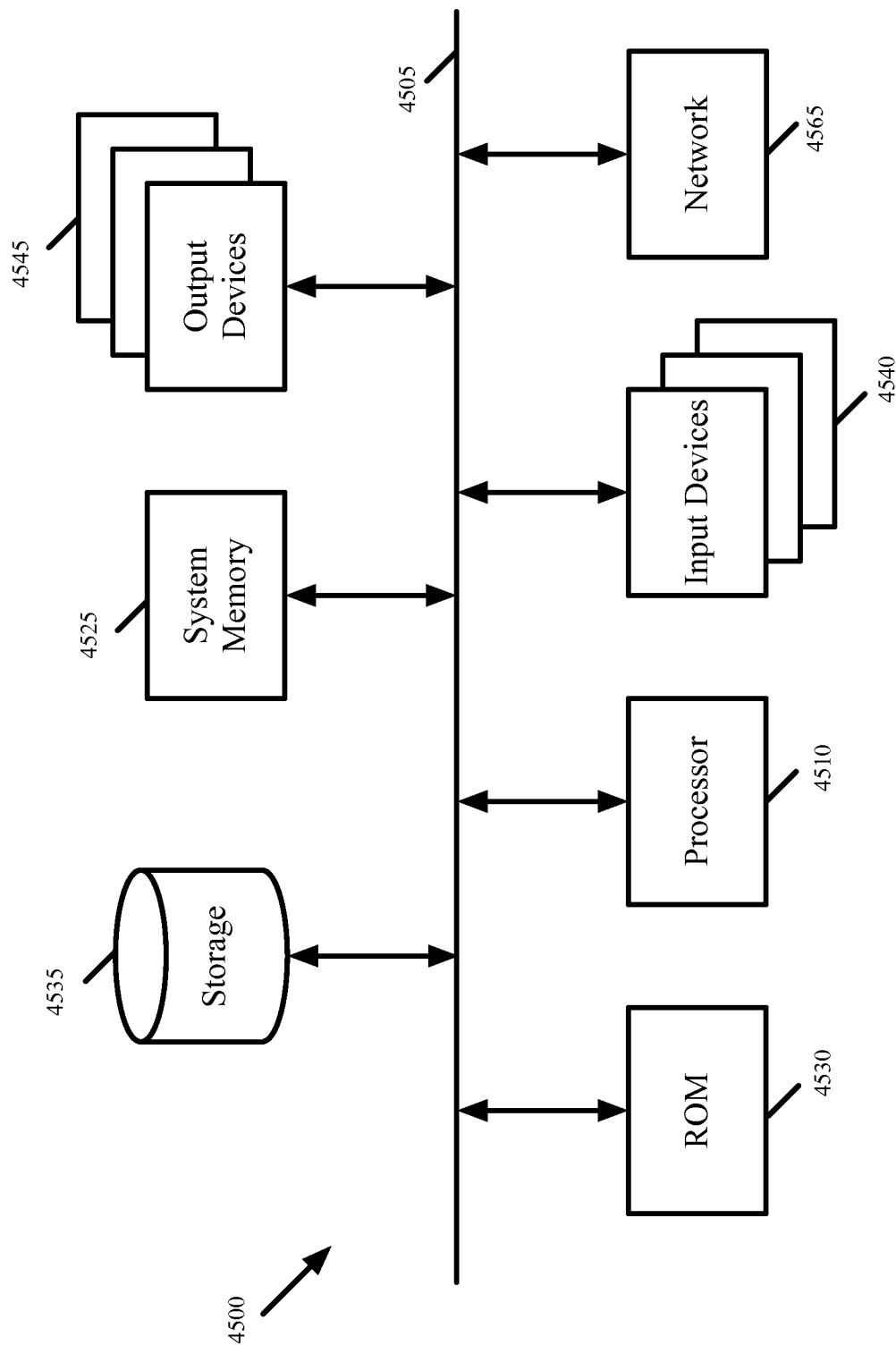
FIG. 45 conceptually illustrates an electronic system with which some embodiments of the invention are implemented.

FIG. 45 conceptually illustrates an electronic system 4500 with which some embodiments of the invention are implemented. The electronic system 4500 can be used to execute any of the control, virtualization, or operating system applications described above. The electronic system 4500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 4500 includes a bus 4505, processing unit(s) 4510, a system memory 4525, a read-only memory 4530, a permanent storage device 4535, input devices 4540, and output devices 4545.

The bus 4505 collectively represents all system, peripheral, and chipset buses that communicatively connect the numerous internal devices of the electronic system 4500. For instance, the bus 4505 communicatively connects the processing unit(s) 4510 with the read-only memory 4530, the system memory 4525, and the permanent storage device 4535.

From these various memory units, the processing unit(s) 4510 retrieve instructions to execute and data to process in order to execute the processes of the invention. The processing unit(s) may be a single processor or a multi-core processor in different embodiments.

The read-only-memory (ROM) 4530 stores static data and instructions that are needed by the processing unit(s) 4510 and other modules of the electronic system. The permanent storage device 4535, on the other hand, is a read-and-write memory device. This device is a non-volatile memory unit that stores instructions and data even when the electronic system 4500 is off. Some embodiments of the invention use a mass-storage device (such as a magnetic or optical disk and its corresponding disk drive) as the permanent storage device 4535.

Other embodiments use a removable storage device (such as a floppy disk, flash drive, etc.) as the permanent storage device. Like the permanent storage device 4535, the system memory 4525 is a read-and-write memory device. However, unlike storage device 4535, the system memory is a volatile read-and-write memory, such a random access memory. The system memory stores some of the instructions and data that the processor needs at runtime. In some embodiments, the invention's processes are stored in the system memory 4525, the permanent storage device 4535, and/or the read-only memory 4530. 2655 From these various memory units, the processing unit(s) 4510 retrieve instructions to execute and data to process in order to execute the processes of some embodiments.

The bus 4505 also connects to the input and output devices 4540 and 4545. The input devices enable the user to communicate information and select commands to the electronic system. The input devices 4540 include alphanumeric keyboards and pointing devices (also called "cursor control devices"). The output devices 4545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 45, bus 4505 also couples electronic system 4500 to a network 4565 through a network adapter (not shown). In this manner, the computer can be a part of a network of computers (such as a local area network ("LAN"), a wide area network ("WAN"), or an Intranet, or a network of networks, such as the Internet. Any or all components of electronic system 4500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 27, 28, 31, 33, 38, 40, 41, 42 and 44) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provide logical datapath sets in terms of logical control plane data. In other embodiments, however, a user may provide logical datapath sets in terms of logical forwarding plane data. In addition, several embodiments were described above in which a controller instance provide physical control plane data to a switching element in order to manage the switching element. In other embodiments, however, the controller instance may provide the switching elements with physical forwarding plane data. In such embodiments, the NIB would store physical forwarding plane data and the virtualization application would generate such data.

Furthermore, in several examples above, a user specifies one or more logic switches. In some embodiments, the user can provide physical switch configurations along with such logic switch configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations. Thus, one of ordinary skill in the art would understand that the invention is not to be limited by the foregoing illustrative details. Thus, one of ordinary skill in the art would understand that the invention is not to be limited by the foregoing illustrative details.

What is claimed is:

1. A method for implementing a logical switching element (LSE), the method comprising:
at a first controller,
receiving a definition of the LSE that spans at least first and second host computers and is implemented by first and second physical switching elements (PSEs) executing on the first and second host computers;
based on the received definition, generating first and second configuration data sets for configuring the first and second PSEs, respectively, to implement the LSE;
supplying the generated first configuration data set to the first PSE to configure the first PSE to process network traffic to implement the LSE; and
supplying the generated second configuration data set to a second controller for the second controller to supply the generated second configuration data set to the second PSE to configure the second PSE to process network traffic to implement the LSE, wherein the second controller does not generate additional configuration data to implement the LSE on the second PSE.

2. The method of claim 1, wherein the first controller is a master controller for the LSE and a master controller for the first PSE, while the second controller is a master controller for the second PSE.

3. The method of claim 1, wherein the generated first and second configuration data sets configure the first and second PSEs to process network traffic passed between machines executing on the first and second host computers according to forwarding operations of the LSE.

4. The method of claim 2, wherein the LSE is a first LSE, the method further comprising:
receiving a third configuration data set from the second controller, the third configuration data set for configuring the first PSE to implement a second LSE; and
supplying the received data to the first PSE to configure the first PSE to implement the second LSE and to process network traffic associated with the second LSE separately from network traffic of the first LSE.

5. The method of claim 2, wherein the master controller for a particular LSE is the only controller to generate a configuration data set to implement the particular LSE and the master controller for a particular PSE is the only controller to supply the generated data set to the particular PSE.

6. The method of claim 1, wherein the LSE comprises at least one of a logical switch and a logical router.

7. The method of claim 1, wherein the generated first and second configuration data sets comprise physical control plane data for configuring the first and second PSEs to implement the LSE.

8. A non-transitory machine readable medium storing a program which when executed by a set of processing units of a first controller implements a logical switching element (LSE), the program comprising sets of instructions for:
receiving a definition of the LSE that spans at least first and second host computers and is implemented by first and second physical switching elements (PSEs) executing on the first and second host computers;

based on the received definition, generating first and second configuration data sets for configuring the first and second PSEs, respectively, to implement the LSE;

supplying the generated first configuration data set to the first PSE to configure the first PSE to process network traffic to implement the LSE; and supplying the generated second configuration data set to a second controller for the second controller to supply the generated second configuration data set to the second PSE to configure the second PSE to process network traffic to implement the LSE, wherein the second controller does not generate additional configuration data to implement the LSE on the second PSE.

9. The non-transitory machine readable medium of claim 8, wherein the first controller is a master controller for the LSE and a master controller for the first PSE, while the second controller is a master controller for the second PSE.

10. The non-transitory machine readable medium of claim 8, wherein the generated first and second configuration data sets configure the first and second PSEs to process network traffic passed between machines executing on the first and second host computers according to forwarding operations of the LSE.

11. The non-transitory machine readable medium of claim 9, wherein the LSE is a first LSE, the program further comprising sets of instructions for:

receiving a third configuration data set from the second controller, the third configuration data set for configuring the first PSE to implement a second LSE; and supplying the received data to the first PSE to configure the first PSE to implement the second LSE and to process network traffic associated with the second LSE separately from network traffic of the first LSE.

12. The non-transitory machine readable medium of claim 9, wherein the master controller for a particular LSE is the only controller to generate a configuration data set to implement the particular LSE and the master controller for a particular PSE is the only controller to supply the generated data set to the particular PSE.

13. The non-transitory machine readable medium of claim 8, wherein the LSE comprises at least one of a logical switch and a logical router.

14. The non-transitory machine readable medium of claim 8, wherein the generated first and second configuration data sets comprise physical control plane data for configuring the first and second PSEs to implement the LSE.

15. A first controller comprising:
a set of processing units; and
a non-transitory machine readable medium storing a program which when executed by the set of processing units implements a logical switching element (LSE), the program comprising sets of instructions for:

receiving a definition of the LSE that spans at least first and second host computers and is implemented by first and second physical switching elements (PSEs) executing on the first and second host computers;

based on the received definition, generating first and second configuration data sets for configuring the first and second PSEs, respectively, to implement the LSE;

supplying the generated first configuration data set to the first PSE to configure the first PSE to process network traffic to implement the LSE; and supplying the generated second configuration data set to a second controller for the second controller to supply the generated second configuration data set to the second PSE to configure the second PSE to process network traffic to implement the LSE, wherein the second controller does not generate additional configuration data to implement the LSE on the second PSE.

16. The first controller of claim 15, wherein the first controller is a master controller for the LSE and a master controller for the first PSE, while the second controller is a master controller for the second PSE.

17. The first controller of claim 15, wherein the generated first and second configuration data sets configure the first and second PSEs to process network traffic passed between machines executing on the first and second host computers according to forwarding operations of the LSE.

18. The first controller of claim 16, wherein the LSE is a first LSE, the program further comprising sets of instructions for:

receiving a third configuration data set from the second controller, the third configuration data set for configuring the first PSE to implement a second LSE; and supplying the received data to the first PSE to configure the first PSE to implement the second LSE and to process network traffic associated with the second LSE separately from network traffic of the first LSE.

19. The first controller of claim 16, wherein the master controller for a particular LSE is the only controller to generate a configuration data set to implement the particular LSE and the master controller for a particular PSE is the only controller to supply the generated data set to the particular PSE.

20. The first controller of claim 15, wherein the LSE comprises at least one of a logical switch and a logical router.

* * * * *